US011909424B2

(12) United States Patent
Galli et al.

(10) Patent No.: US 11,909,424 B2
(45) Date of Patent: Feb. 20, 2024

(54) APPARATUS AND METHODS FOR RECEIVING SIGNALS USING OPTICAL LENS AS A BEAMFORMER

(71) Applicants: Futurewei Technologies, Inc., Plano, TX (US); Phase Sensitive Innovations, Inc., Newark, DE (US)

(72) Inventors: Stefano Galli, New York, NY (US); Munawar Kermalli, Morris Plains, NJ (US); Xiao-Feng Qi, Westfield, NJ (US); Shouyuan Shi, Newark, DE (US); Dennis Prather, Newark, DE (US); Janusz Murakowski, Bear, DE (US); Garrett Schneider, New Castle, DE (US)

(73) Assignees: Futurewei Technologies, Inc., Plano, TX (US); Phase Sensitive Innovations, Inc., Newark, DE (US)

( * ) Notice: Subject to any disclaimer, the term of this patent is extended or adjusted under 35 U.S.C. 154(b) by 161 days.

(21) Appl. No.: 17/457,519

(22) Filed: Dec. 3, 2021

(65) Prior Publication Data
US 2022/0094374 A1    Mar. 24, 2022

Related U.S. Application Data

(63) Continuation of application No. PCT/US2020/034041, filed on May 21, 2020.
(Continued)

(51) Int. Cl.
*H04B 1/00* (2006.01)
*H04B 10/40* (2013.01)
(Continued)

(52) U.S. Cl.
CPC ........... *H04B 1/0064* (2013.01); *H04B 10/40* (2013.01); *H04J 14/0205* (2013.01);
(Continued)

(58) Field of Classification Search
CPC ............................ H04B 1/0064; H04B 10/40; H04B 2210/006; H04J 14/0205; H04Q 11/0071; H04Q 2011/0088
See application file for complete search history.

(56) References Cited

U.S. PATENT DOCUMENTS 5,677,697 A    10/1997  Lee et al.
6,442,148 B1 *  8/2002  Adams ................. H04B 7/2041
                                                               342/356

(Continued)

FOREIGN PATENT DOCUMENTS

EP        0793291 A2     9/1997
JP     2010081550 A      4/2010
(Continued)

OTHER PUBLICATIONS

Elisa Sbarra, et al., "A Novel Rotman Lens in SIW Technology," Proceedings of the 4th European Radar Conference, Oct. 2007, 4 pages, IEEE.
(Continued)

*Primary Examiner* — Mina M Shalaby
(74) *Attorney, Agent, or Firm* — Slater Matsil, LLP

(57) ABSTRACT

In certain embodiments, an apparatus includes a switch matrix and frequency band isolation circuitry. The switch matrix is configured to receive, at an input port, an electrical signal, which corresponds to a transmission signal received at antennas of an antenna array. The transmission signal corresponds to a transmission spatial sector of the array. The electrical signal includes first and second signal portions in first and second frequency bands, respectively, the electrical
(Continued)

signal having been generated from an optical signal that corresponds to the transmission signal. The switch matrix is configured to direct, via an output port and in accordance with a control signal, the electrical signal to a first of multiple signal conversion paths.

24 Claims, 17 Drawing Sheets

Related U.S. Application Data

(60) Provisional application No. 62/856,480, filed on Jun. 3, 2019.

(51) Int. Cl.
*H04J 14/02* (2006.01)
*H04Q 11/00* (2006.01)

(52) U.S. Cl.
CPC ... *H04Q 11/0071* (2013.01); *H04B 2210/006* (2013.01); *H04Q 2011/0088* (2013.01)

(56) References Cited

U.S. PATENT DOCUMENTS

| | | | | |
|---|---|---|---|---|
| 7,084,811 B1* | 8/2006 | Yap | ...................... | H01Q 3/2676 342/373 |
| 2002/0181874 A1* | 12/2002 | Tulchinsky | .......... | H01Q 3/2676 385/24 |
| 2012/0328298 A1* | 12/2012 | Yi | ........................ | H01Q 3/2676 398/79 |
| 2020/0220752 A1* | 7/2020 | Shi | ........................ | H04L 5/0051 |
| 2021/0058954 A1* | 2/2021 | Li | ...................... | H04W 72/1273 |
| 2021/0127351 A1* | 4/2021 | Stojanovski | .......... | H04W 48/16 |
| 2021/0211940 A1* | 7/2021 | Berg | ...................... | H04W 16/10 |
| 2021/0352743 A1* | 11/2021 | You | ...................... | H04W 74/008 |
| 2022/0094374 A1* | 3/2022 | Galli | .................... | H04B 10/00 |
| 2022/0166137 A1* | 5/2022 | Galli | .................. | H04Q 11/0005 |
| 2022/0174602 A1* | 6/2022 | Zhang | ........................ | H04L 1/08 |
| 2022/0377573 A1* | 11/2022 | Ashworth | ............. | H04W 16/26 |
| 2023/0224953 A1* | 7/2023 | Xiong | ................... | H04L 5/0044 370/329 |
| 2023/0305151 A1* | 9/2023 | Aoki | ..................... | G01S 7/4914 356/4.01 |
| 2023/0308853 A1* | 9/2023 | Ding | ........................ | H04W 8/18 455/418 |

FOREIGN PATENT DOCUMENTS

| | | |
|---|---|---|
| WO | 2017117584 A1 | 7/2010 |
| WO | 2018109840 A1 | 6/2018 |

OTHER PUBLICATIONS

Elizabeth, et al., "Performance analysis and comparison of optical signal processing beamforming networks: a survey," Photonic Network Communications, vol. 37, No. 1, Oct. 9, 2018, pp. 38-52.

* cited by examiner

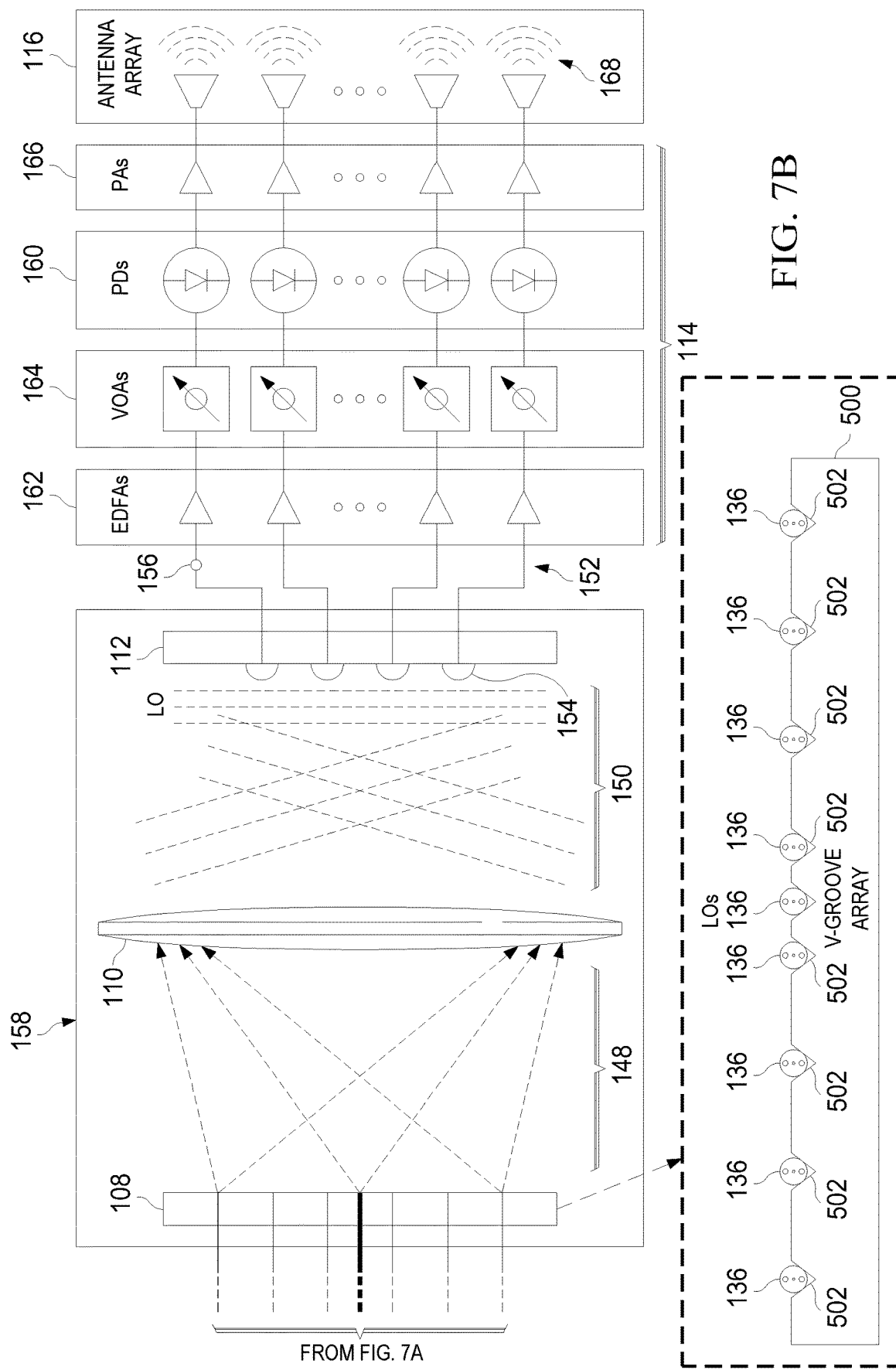

FIG. 8B

APPARATUS AND METHODS FOR RECEIVING SIGNALS USING OPTICAL LENS AS A BEAMFORMER

CROSS-REFERENCE TO RELATED APPLICATIONS

This application is a continuation of PCT Application Number PCT/US2020/034041 filed on May 21, 2020, entitled "Apparatus and Methods for Receiving Signals Using Optical Lens as a Beamformer," which claims the benefit of U.S. Provisional Application No. 62/856,480 filed on Jun. 3, 2019, entitled "Receiving Signals Using Optical Lens as a Beamformer," applications of which are hereby incorporated herein by reference.

TECHNICAL FIELD

This disclosure relates generally to wireless communications, and, in particular embodiments, to transmitting and receiving signals using an optical lens as a beamformer.

BACKGROUND

Elements of a wireless communication network often include one or more antennas to send and/or receive wireless signals to and from other equipment. For example, base stations, such as NodeBs (NBs), evolved NBs (eNBs), or next generation NBs (gNBs), include one or more antennas that are used to send and receive signals to and from other equipment, such as user devices (e.g., user equipment (UE)) or other network elements. In fact, any transmitter or receiver may include one or more antennas that are used to send and receive signals to and from other equipment. These antennas send and receive signals at an appropriate frequency, and may include, for example, radio frequency (RF) signals. In some implementations, signals transmitted from antennas are beamformed or otherwise directed to or received from one or more transmission spatial sectors of the antennas.

SUMMARY

According to a first aspect of this disclosure, a method includes receiving, at a first input port of a plurality of input ports of an optical switch matrix, a first optical signal generated from a first data signal for transmission in a first transmission spatial sector of an antenna array. The method further includes directing, via a first output port of a plurality of output ports of the optical switch matrix and in accordance with a first control signal, the first optical signal to a first optical fiber of a first optical fiber array that comprises a plurality of optical fibers. The first optical fiber is coupled to the first output port and corresponding to the first transmission spatial sector of the antenna array. The method further includes outputting, via the first output port to the first optical fiber, a second optical signal that is based at least in part on the first optical signal. The method further includes transforming the second optical signal of the first optical fiber from a first wave format to a second wave format. The method further includes providing, by optical fibers of a second optical fiber array that comprises a plurality of optical fibers, respective third optical signals to signal conversion circuitry. The respective third optical signals are based at least in part on the second optical signal and an optical reference signal. The signal conversion circuitry is configured to convert the third optical signals to first transmission signals for transmission, in the first transmission spatial sector, by antennas of the antenna array.

Optionally, in any of the preceding aspects of the first aspect, the first data signal is an electrical signal.

Optionally, in any of the preceding aspects of the first aspect, the first optical signal includes data for a plurality of users in the first transmission spatial sector.

Optionally, in any of the preceding aspects of the first aspect, the method further includes receiving data for each of a plurality of users and encoding the data for each of the plurality of users, the first data signal from which the first optical signal is generated including the data for each of the plurality of users.

Optionally, in any of the preceding aspects of the first aspect, the method further includes generating, by a first optical source generator, a first optical source signal having a first wavelength, the first optical signal having been formed by modulating the first optical source signal with the first data signal.

Optionally, in any of the preceding aspects of the first aspect, the method further includes generating a first optical reference signal having a second wavelength, the first optical source signal and the first optical reference signal being phase locked to one another. The method further includes transmitting the first optical reference signal to a second optical fiber of the first optical fiber array and transforming the first optical reference signal from the first wave format to the second wave format. The optical reference signal is received by the plurality of optical fibers of the second optical fiber array and corresponds at least in part to the first optical reference signal in the second wave format.

Optionally, in any of the preceding aspects of the first aspect, the first optical source generator is one of a plurality of optical source generators and each optical source generator of the plurality of optical source generators is configured to generate a respective optical source signal having a corresponding wavelength and a respective optical reference signal having a corresponding wavelength. The respective optical source signal and the respective optical reference signal for an optical source generator of the plurality of optical source generators are phase locked to one another and different than the respective optical source signals and respective optical reference signals generated by other optical source generators of the plurality of optical source generators.

Optionally, in any of the preceding aspects of the first aspect, the method further includes receiving, at a second input port of the plurality of input ports of the optical switch matrix, a fourth optical signal generated from a second data signal.

Optionally, in any of the preceding aspects of the first aspect, the first optical signal is associated with a first frequency band, and the fourth optical signal is associated with a second frequency band. The first optical signal was formed by modulating a first optical source signal having a first wavelength with the first data signal. The fourth optical signal was formed by modulating a second optical source signal having a second wavelength with the second data signal for transmission in the first transmission spatial sector of the antenna array.

Optionally, in any of the preceding aspects of the first aspect, the method further includes directing, via the first output port of the plurality of output ports of the optical switch matrix, the fourth optical signal to the first optical fiber.

Optionally, in any of the preceding aspects of the first aspect, the second optical signal is based at least in part on both the first optical signal and the fourth optical signal.

Optionally, in any of the preceding aspects of the first aspect, the first optical signal is associated with a first frequency band, and the fourth optical signal is associated with a second frequency band. The first optical signal was formed by modulating a first optical source signal having a first wavelength with the first data signal. The fourth optical signal was formed by modulating a second optical source signal having a second wavelength with the second data signal for transmission in a second transmission spatial sector of the antenna array. The method further includes directing, via a second output port of the plurality of output ports and in accordance with a second control signal, the fourth optical signal to a second optical fiber of the first optical fiber array. The second optical fiber is coupled to the second output port and corresponding to the second transmission spatial sector of the antenna array. The method further includes outputting, via the second output port to the second optical fiber, a fifth optical signal that is based at least in part on the fourth optical signal. The method further includes transforming the fifth optical signal of the second optical fiber from the first wave format to the second wave format. The method further includes providing, by the optical fibers of the second optical fiber array, respective sixth optical signals to the signal conversion circuitry. The respective sixth optical signals are based at least in part on the fifth optical signal and the optical reference signal. The signal conversion circuitry is configured to convert the sixth optical signals to second transmission signals for transmission, in the second transmission spatial sector, by antennas of the antenna array.

Optionally, in any of the preceding aspects of the first aspect, the method further includes receiving, at the first input port, a fourth optical signal generated from a second data signal for transmission in a second transmission spatial sector of the antenna array, the first optical signal and the fourth optical signal being associated with a same frequency band. The method further includes directing, via a second output port of the plurality of output ports and in accordance with a second control signal, the fourth optical signal to a second optical fiber of the first optical fiber array. The second optical fiber is coupled to the second output port and corresponding to the second transmission spatial sector of the antenna array.

Optionally, in any of the preceding aspects of the first aspect, the method further includes modulating, by a first data modulator, a first optical source signal having a first wavelength with the first data signal.

Optionally, in any of the preceding aspects of the first aspect, the first data modulator is one of a plurality of data modulators for a first frequency band, each data modulator corresponding to a respective user.

Optionally, in any of the preceding aspects of the first aspect, the first data modulator is one of a plurality of data modulators for a first frequency band, and each data modulator corresponds to a respective transmission spatial sector of a plurality of transmission spatial sectors of the antenna array.

Optionally, in any of the preceding aspects of the first aspect, the first optical signal is associated with a first frequency band, and the method further includes receiving, at a second input port of the plurality of input ports, a fourth optical signal. The fourth optical signal is associated with a second frequency band that is different than the first frequency band.

Optionally, in any of the preceding aspects of the first aspect, the optical switch matrix, the first optical fiber array, the second optical fiber array, and the antenna array are located in a remote receiver unit (RRU), the first optical signal being received by the optical switch matrix from a baseband unit (BBU) via an optical fiber.

Optionally, in any of the preceding aspects of the first aspect, the optical switch matrix, the first optical fiber array, and the second optical fiber array are located in a baseband unit (BBU), and the signal conversion circuitry and the antenna array are located in a remote receiver unit (RRU).

Optionally, in any of the preceding aspects of the first aspect, the second optical signal is the same as the first optical signal.

Optionally, in any of the preceding aspects of the first aspect, the first wave format is a spherical wave format, and the second wave format is a plane wave format.

Optionally, in any of the preceding aspects of the first aspect, the optical switch matrix is a non-blocking optical switch matrix.

Optionally, in any of the preceding aspects of the first aspect, the plurality of input ports of the optical switch matrix is the same in quantity as the plurality of output ports.

Optionally, in any of the preceding aspects of the first aspect, the plurality of input ports of the optical switch matrix is greater in quantity than the plurality of output ports.

Optionally, in any of the preceding aspects of the first aspect, the plurality of optical fibers of the second optical fiber array are associated with respective lenslets adapted to receive the second optical signal in the second wave format.

Optionally, in any of the preceding aspects of the first aspect, the signal conversion circuitry includes one or more photodiodes configured to convert the third optical signal to the transmission signal for transmission, in the first transmission spatial sector, by the antennas of the antenna array, the transmission signal comprising one or more radio frequency (RF) signals.

According to a second aspect of this disclosure, an apparatus is provided that includes a first switch matrix, a second switch matrix, an optical lens, and an optical switch matrix, and is configured to perform the method in any of the preceding aspects of the first aspect.

According to a third aspect of this disclosure, a non-transitory computer-readable media stores computer instructions that, when executed by one or more processors, cause the one or more processors to perform the method in any of the preceding aspects of the first aspect.

According to a fourth aspect of this disclosure, an apparatus includes means for receiving, at a first input port of a plurality of input ports of an optical switch matrix, a first optical signal generated from a first data signal for transmission in a first transmission spatial sector of an antenna array. The apparatus further includes means for directing, via a first output port of a plurality of output ports of the optical switch matrix and in accordance with a first control signal, the first optical signal to a first optical fiber of a first optical fiber array that comprises a plurality of optical fibers. The first optical fiber is coupled to the first output port and corresponding to the first transmission spatial sector of the antenna array. The apparatus further includes means for outputting, via the first output port to the first optical fiber, a second optical signal that is based at least in part on the first optical signal. The apparatus further includes means for transforming the second optical signal of the first optical fiber from a first wave format to a second wave format. The apparatus further includes means for providing, by optical fibers of a second optical fiber array that comprises a plurality of optical fibers, respective third optical signals to signal conversion circuitry. The respective third optical signals are based at least in part on the second optical signal and an optical reference signal. The signal conversion circuitry is configured to convert the third optical signals to first transmission signals for transmission, in the first transmission spatial sector, by antennas of the antenna array.

According to a fifth aspect of this disclosure, a method includes receiving, at a first input port of a plurality of input ports of a switch matrix, a first electrical signal. The first electrical signal corresponds to a transmission signal received at antennas of an antenna array, and the transmission signal corresponds to a first transmission spatial sector of the antenna array. The first electrical signal includes a first signal portion in a first frequency band and a second signal portion in a second frequency band. The first electrical signal was generated from a first optical signal that corresponds to the transmission signal received at the antennas of the antenna array. The method further includes directing, via a first output port of a plurality of output ports of the switch matrix and in accordance with a first control signal, the first electrical signal to a first signal conversion path of a plurality of signal conversion paths. The method further includes separating, by frequency band isolation circuitry in the first signal conversion path, the first electrical signal into the first signal portion in the first frequency band and the second signal portion in the second frequency band. The method further includes modulating, by the frequency band isolation circuitry in the first signal conversion path, a reference signal with the second signal portion to generate a frequency-shifted second signal portion. The method further includes combining, by the frequency band isolation circuitry in the first signal conversion path, the first signal portion and the frequency-shifted second signal portion to generate a modified first electrical signal that corresponds to the transmission signal received at the antennas of the antenna array.

Optionally, in any of the preceding aspects of the fifth aspect, the method further includes separating, by a first filter of the frequency band isolation circuitry, the first signal portion in the first frequency band from the first electrical signal, and further includes separating, by a second filter of the frequency band isolation circuitry, the second signal portion in the second frequency band from the first electrical signal.

Optionally, in any of the preceding aspects of the fifth aspect, the method further includes modulating, by a modulator of the frequency band isolation circuitry, the reference signal with the second signal portion to generate the frequency-shifted second signal portion, and further includes combining, by a summer of the frequency band isolation circuitry, the first signal portion and the frequency-shifted second signal portion to generate the modified first electrical signal by adding the first signal portion and the frequency-shifted second signal portion.

Optionally, in any of the preceding aspects of the fifth aspect, the method further includes converting, by an analog-to-digital converter in the first signal conversion path, the modified first electrical signal to a digital format.

Optionally, in any of the preceding aspects of the fifth aspect, the method further includes transforming a plurality of second optical signals from a first wave format to a second wave format. Each second optical signal corresponds to a respective antenna of the antenna array. The first optical signal results from the plurality of second optical signals in the second wave format and comprises a combination of the plurality of second optical signals.

Optionally, in any of the preceding aspects of the fifth aspect, the plurality of second optical signals are emitted in the first wave format by respective first optical fibers of a first plurality of optical fibers, and each optical fiber of the first plurality of optical fibers corresponds to a respective antenna of the antenna array.

Optionally, in any of the preceding aspects of the fifth aspect, the method further includes receiving, by a first optical fiber of a second plurality of optical fibers, the plurality of second optical signals in the second wave format as a portion of the first optical signal.

Optionally, in any of the preceding aspects of the fifth aspect, the method further includes receiving, by a signal conversion circuit, the first optical signal via the first optical fiber of the second plurality of optical fibers, and converting, by the signal conversion circuit, the first optical signal into the first electrical signal.

Optionally, in any of the preceding aspects of the fifth aspect, the signal conversion circuit includes a photodiode.

Optionally, in any of the preceding aspects of the fifth aspect, a quantity of the first plurality of optical fibers is the same as a quantity of the second plurality of optical fibers.

Optionally, in any of the preceding aspects of the fifth aspect, the method further includes modulating, by each of a plurality of modulators that each correspond to a respective antenna of the antenna array, an optical source signal with the transmission signal received by the antenna corresponding to the modulator to generate the second optical signal.

Optionally, in any of the preceding aspects of the fifth aspect, the method further includes performing processing on the transmission signal prior to the modulator modulating the transmission signal with the optical source signal to generate the second optical signal.

Optionally, in any of the preceding aspects of the fifth aspect, the processing that is performed on the transmission signal includes filtering the transmission signal, amplifying the transmission signal, or filtering and amplifying the transmission signal.

Optionally, in any of the preceding aspects of the fifth aspect, the switch matrix and the frequency band isolation circuitry are located in a baseband unit (BBU), and the antenna array is located in a remote receiver unit (RRU).

Optionally, in any of the preceding aspects of the fifth aspect, second optical signals are communicated from the RRU to the BBU via respective optical fibers, the second optical signals corresponding to respective antennas of the antenna array.

Optionally, in any of the preceding aspects of the fifth aspect, the transmission signal includes a radio frequency (RF) signal.

Optionally, in any of the preceding aspects of the fifth aspect, the transmission signal includes data for a plurality of users in the first transmission spatial sector, and the first electrical signal includes the data for the plurality of users in the first transmission spatial sector.

Optionally, in any of the preceding aspects of the fifth aspect, the method further includes comparing, by the switch matrix, a signal strength of the first electrical signal to a signal threshold and directing, by the switch matrix via the first output port of the plurality of output ports, the first electrical signal to the first signal conversion path at least in part in response to the signal strength of the first electrical signal exceeding the signal threshold.

Optionally, in any of the preceding aspects of the fifth aspect, the method further includes receiving, by a grid modulator, a plurality of electrical signals. Each electrical signal in the plurality of electrical signals corresponds to a respective antenna of the antenna array. The first electrical signal is one of the plurality of electrical signals. The method further includes modulating, by the grid modulator, each of the plurality of electrical signals to generate a corresponding plurality of optical signals and multiplexing, by a first arrayed waveguide grating element, the plurality optical signals into a multiplexed optical signal for transmission via one or more optical fibers. A quantity of the one or more optical fibers is less than a quantity of the plurality of optical signals.

Optionally, in any of the preceding aspects of the fifth aspect, the method further includes receiving, by a second arrayed waveguide grating element, via the one or more optical fibers, the multiplexed optical signal and demultiplexing, by the second arrayed waveguide grating element, the multiplexed optical signal into the plurality of optical signals for conversion, by respective signal conversion circuits, into the plurality electrical signals to which the plurality of optical signals correspond. The first electrical signal is one of the plurality of electrical signals.

Optionally, in any of the preceding aspects of the fifth aspect, a quantity of the one or more first optical fibers is one.

Optionally, in any of the preceding aspects of the fifth aspect, the grid modulator and the first arrayed waveguide grating element are located in a remote receiver unit (RRU) and the second arrayed waveguide grating element is located in a baseband unit (BBU).

According to a sixth aspect of this disclosure, an apparatus is provided that includes a switch matrix and frequency band isolation circuitry, and is configured to perform the method in any of the preceding aspects of the fifth aspect.

According to a seventh aspect of this disclosure, a non-transitory computer-readable media stores computer instructions that, when executed by one or more processors, cause the one or more processors to perform the method in any of the preceding aspects of the fifth aspect.

According to an eighth aspect of this disclosure, an apparatus includes means for receiving, at a first input port of a plurality of input ports of a switch matrix, a first electrical signal. The first electrical signal corresponds to a transmission signal received at antennas of an antenna array, and the transmission signal corresponds to a first transmission spatial sector of the antenna array. The first electrical signal includes a first signal portion in a first frequency band and a second signal portion in a second frequency band. The first electrical signal was generated from a first optical signal that corresponds to the transmission signal received at the antennas of the antenna array. The apparatus further includes means for directing, via a first output port of a plurality of output ports of the switch matrix and in accordance with a first control signal, the first electrical signal to a first signal conversion path of a plurality of signal conversion paths. The apparatus further includes means for separating, by frequency band isolation circuitry in the first signal conversion path, the first electrical signal into the first signal portion in the first frequency band and the second signal portion in the second frequency band. The method further includes means for modulating, by the frequency band isolation circuitry in the first signal conversion path, a reference signal with the second signal portion to generate a frequency-shifted second signal portion. The method further includes means for combining, by the frequency band isolation circuitry in the first signal conversion path, the first signal portion and the frequency-shifted second signal portion to generate a modified first electrical signal that corresponds to the transmission signal received at the antennas of the antenna array.

Embodiments of this disclosure may provide one or more technical advantages. For example, certain embodiments provide a combined electrical-optical architecture that allows performing analog, hybrid, and/or digital beamforming, possibly while decoupling the beamforming from the specific frequency bands supported. Additionally or alternatively, certain embodiments provide multi-band, multi-sector, and multi-beam capabilities. Certain embodiments provide a photonically-enabled simultaneous multiband, multisector, multiple input, multiple output (MIMO) system using an optical lens as a beamformer.

In certain embodiments, adding an optical intermediate portion allows more degrees of freedom, which may support additional features through the use of optical processing. In certain embodiments, the optical portion of the architecture remains constant while an antenna array can be modified to accommodate the desired frequency bands to be supported. This may allow base transceiver station (BTS) construction to be more modular, as a core optical portion is the same regardless of frequency band. In contrast, all-RF solutions have components that are very much tuned to the frequency bands of operations, making it difficult and/or costly to support multiple bands and multiple sectors as a number of antennas to be used increases (e.g., with MIMO, Massive MIMO, etc.).

Certain embodiments apply to cellular communications (e.g., 4G, 5G, etc.), point-to-multipoint (PMP) backhauling, fixed wireless broadband access, passive electromagnetic sensing, and other suitable communication technologies. Certain embodiments provide a relatively cost-effective way of maintaining coherence, particularly for a large number of antennas, and reducing or eliminating random phase fluctuations induced by mechanical and thermal effects. This coherence and low phase noise may facilitate accurate beamforming.

Certain embodiments of this disclosure provide for simplified implementation and large scalability. For example, a lens-based transmission system may support multiple simultaneous beams by having multiple active input signals, each beamformed to its corresponding sector by the antenna array after down-conversion. As another example, the data modulators are relatively efficient to implement, potentially leveraging chip-level photonic integration technologies, for example. The data modulators can be scaled to a large phased antenna array with large channel counts.

Certain embodiments of this disclosure provide for reduced system cost and complexity. For example, certain embodiments reduce or eliminate using separate optical source generators for each spatial sector. As another example, certain embodiments may be implemented without an optical switching network in a simplest embodiment where each optical fiber is served by a separate data modulator. In such an embodiment, the electronic signal fed to each of the data modulators may serve the UEs in the corresponding sector.

Certain embodiments of this disclosure provide for improved reliability. For example, the loss of a data modulator, or associated electronic/optical functionality serving a particular sector, might be compensated for by designing the transmission antenna array such that there is overlap between the beams produced by the array. If a beam, serving a particular sector, were lost, adjacent beams may still be able to partially or completely cover the sector served by the lost beam. In certain embodiments, providing this overlap would involve appropriately spacing the antennas and the optical fibers in their respective arrays.

Certain embodiments of this disclosure provide for reconfigurability and enhanced signal redundancy. For example, an appropriately-located optical switch matrix may provide redundancy in case of a data modulator loss. As a particular example, the output of a "spare" data modulator, or a data modulator not presently serving another sector, may be optically switched/routed into the position fed by the faulty data modulator. The electronic data signal provided as input to the faulty data modulator may be appropriately re-routed (in the electronic/digital domain) to feed the substitute data modulator.

Certain embodiments of this disclosure provide for enhanced radiation power and system linearity. The number of the transmitting optical fibers (e.g., a first optical fiber array) providing input signals (e.g., serving as point source) to the optical lens may, in certain embodiments, be different than the number of optical fibers (e.g., a second optical fiber array) receiving optical signals that have been passed through (e.g., and transformed by) the optical lens. As a particular example, by increasing the number optical fibers (e.g., the second optical fiber array) receiving optical signals that have been passed through the optical lens, optical power may be spread over a larger number of photo-diodes. This may allow increasing the total optical power, and thereby the total radiated RF power, while maintaining or reducing the RF gain of the individual RF power amplifiers serving the antenna array. In certain embodiments, this may lead to improved linearity of the transmitted signals. Such an approach may provide redundancy in case of a loss of an amplifier or a transmission antenna because the antenna array may be over-sampled, potentially by a large factor. Furthermore, in certain embodiments, the amount of optical power delivered to the (potentially large number of) photo-diodes may be sufficiently high to consider the elimination of RF power amplifiers, thereby simplifying the system architecture and possibly improving linear performance.

Certain embodiments of this disclosure provide a receiver that is able to receive and simultaneously process wireless (e.g., RF) signals in multiple frequency bands, and to reduce a number of signal conversion circuits (e.g., analog-to-digital converters) that are used by the receiver. In a distributed implementation of the receiver, certain embodiments provide an ability to reduce a number of optical fibers used to communicate signals between the distributed components of the receiver.

Certain embodiments of this disclosure may provide some, all, or none of the above advantages. Certain embodiments may provide one or more other technical advantages, one or more of which may be readily apparent to those skilled in the art from the figures, descriptions, and claims included in this disclosure.

BRIEF DESCRIPTION OF THE DRAWINGS

For a more complete understanding of this disclosure, and the advantages thereof, reference is now made to the following descriptions taken in conjunction with the accompanying drawings, in which:

FIGS. 7A-7B illustrate an example embodiment of system for transmitting signals using an optical lens as a beamformer, according to certain embodiments of this disclosure;

FIGS. 8A-8B illustrate an example receiver system, according to certain embodiments of this disclosure;

DETAILED DESCRIPTION OF ILLUSTRATIVE EMBODIMENTS

Figure 1A:
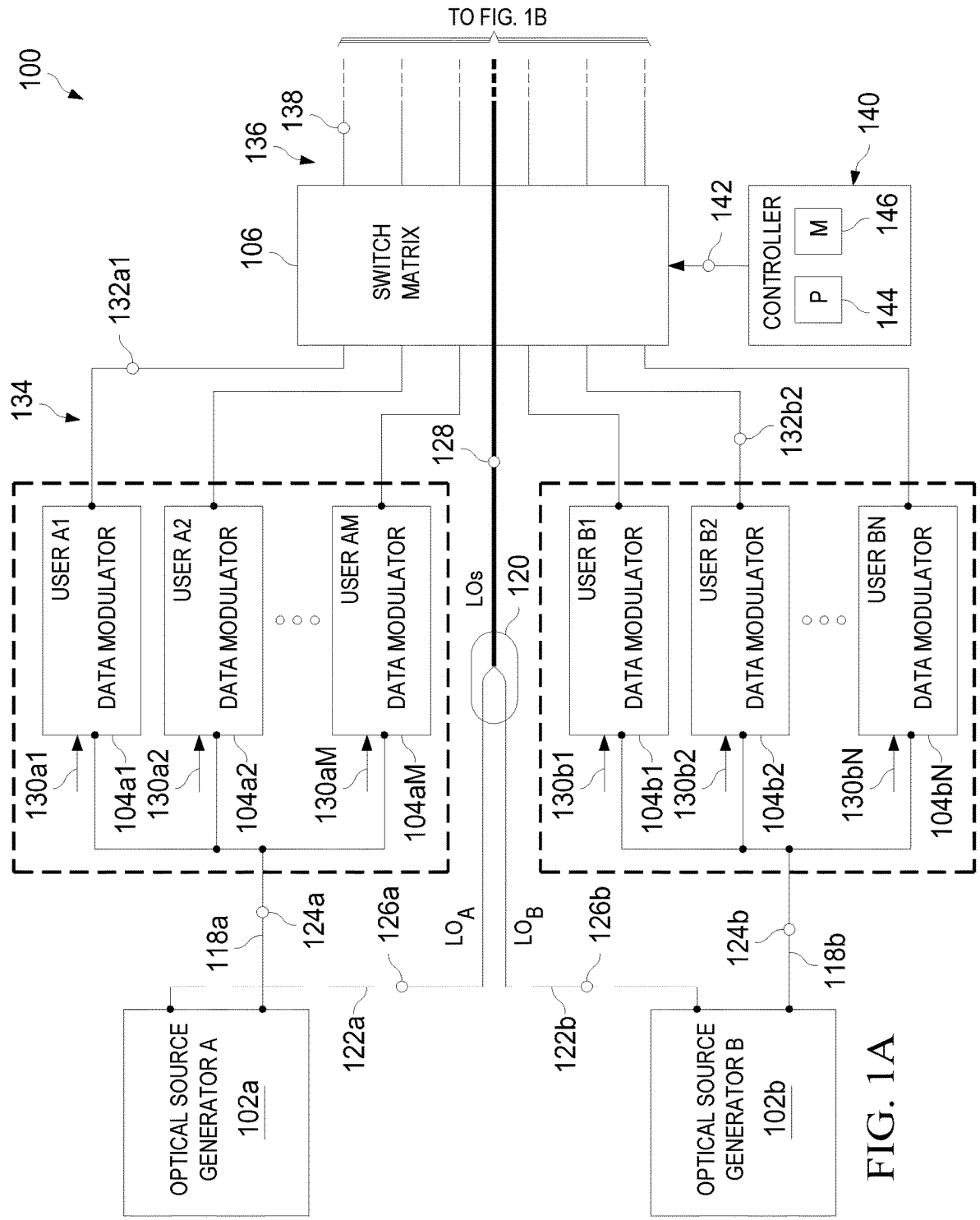
FIGS. 1A-1B illustrate an example system for transmitting signals using an optical lens as a beamformer, according to certain embodiments of this disclosure.

In general, beamforming refers to techniques for directing transmission signals to or receiving transmission signals from particular transmission spatial sectors of antennas (e.g., of an antenna array). In transmitters and receivers that process signals to be transmitted or received in RF format from start to finish for purposes of beamforming, limitations arise as the number of antennas increases (e.g., in a MIMO or Massive MIMO implementation). In such all-RF systems, the processing components are finely tuned to the frequency bands being supported by the transmitter or receiver. Thus, supporting additional frequency bands, users, and/or spatial sectors (e.g., of an antenna array) in such all-RF systems is costly and inflexible due in part to the addition of further finely-tuned components.

Embodiments of this disclosure provide a transmitter and a receiver that convert transmission signals to optical signals to provide greater flexibility in processing the transmission signals, partially due to the additional bandwidth available in the optical signal format. For a transmitter, embodiments of this disclosure convert transmission signals from an electrical domain (e.g., from an RF signal, a baseband signal, or another suitable signal in the electrical domain) to an optical domain to perform beamforming using the optical signals and a lens, and then convert the optical signals back to RF signals for transmission by appropriate antennas of an antenna array according to the beamforming performed in the optical domain. Embodiments of this disclosure provide an optical switch matrix to facilitate the beamforming in the optical domain, which allows greater flexibility in combining signals for transmission to the desired spatial sector. Embodiments of this disclosure support transmission of signals associated with multiple frequency bands, multiple users, and multiple sectors using the optically-facilitated transmitter. In a distributed implementation of the transmitter, certain embodiments provide an ability to reduce a number of optical fibers used to communicate signals between the distributed components of the transmitter.

Certain embodiments of this disclosure provide a receiver that is able to receive and simultaneously process wireless (e.g., RF) signals in multiple frequency bands, and to reduce a number of signal conversion circuits (e.g., analog-to-digital converters) that are used by the receiver. In a distributed implementation of the receiver, certain embodiments provide an ability to reduce a number of optical fibers used to communicate signals between the distributed components of the receiver.

Certain embodiments may be implemented in a base station or repeater for cellular communications (e.g., 4G, 5G, etc.), point-to-multipoint (PMP) backhauling, fixed wireless broadband access, passive electromagnetic sensing, and other suitable communication technologies. Although certain advantages associated with the systems and techniques described in this disclosure may be particularly applicable to large-scale implementations (such as in connection MIMO or massive MIMO antenna arrays), this disclosure contemplates the described systems and techniques being used in any wireless signal transmitter or receiver context.

Figure 1B:
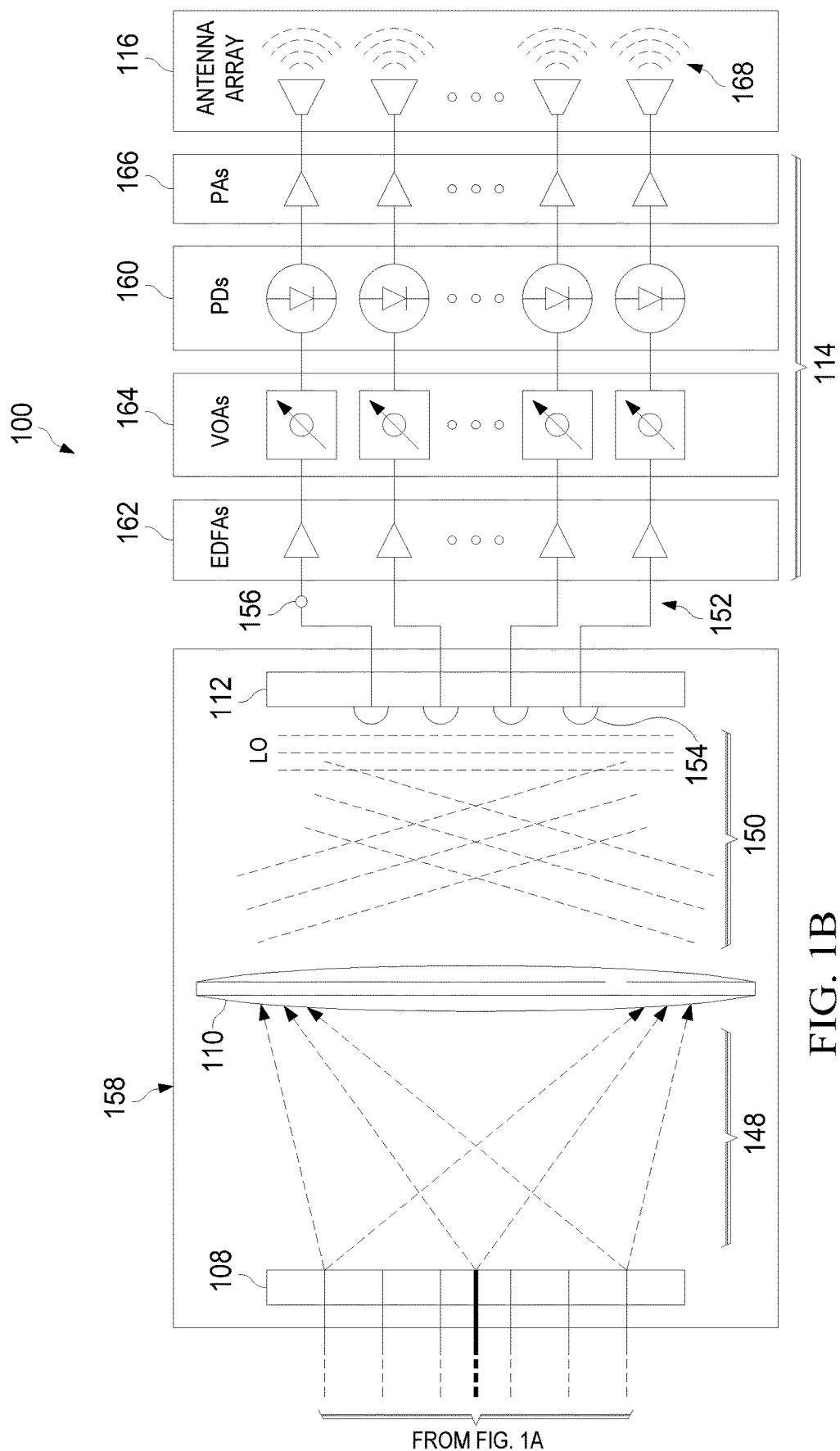

FIGS. 1A-1B illustrate an example system 100 for transmitting signals using an optical lens as a beamformer, according to certain embodiments of this disclosure. In the illustrated example, system 100 includes optical source generators 102, data modulators 104, a switch matrix 106, a first optical fiber array 108, an optical lens 110, a second optical fiber array 112, signal conversion circuitry 114, and antenna array 116. Throughout this disclosure, system 100, or any sub-portions or variants of system 100, also may be referred to as a communication apparatus.

In general, optical switch matrix 106 receives, at an input port, a first optical signal that is generated from a data signal, for transmission in a transmission spatial sector of antenna array 106. Optical switch matrix 106 directs, via an output port and in accordance with a control signal, a second optical signal, which is based on the first optical signal, to an optical fiber of the first optical fiber array 108 that corresponds to the transmission spatial sector. Optical lens 110 transforms the second optical signal from a first wave format to a second wave format. Optical fibers of second optical fiber array 112 receive the second optical signal in the second wave format, receive an optical reference signal in the second wave format, and provide respective third optical signals, which are based on the second optical signal and the optical reference signal, both in the second wave format, to signal conversion circuitry 114. Signal conversion circuitry 114 converts the third optical signals to transmission signals for transmission, in the transmission spatial sector, by antennas of antenna array 116. These and other example features of system 100 are described in greater detail below.

System 100 includes optical source generator 102a (also referred to as optical source generator A) and optical source generator 102b (also referred to as optical source generator B). Each optical source generator 102 is coupled to one or more data modulators 104 by one or more optical fibers 118 and to a signal combiner 120 via one or more optical fibers 122. In the illustrated example, optical source generator 102a is coupled to data modulators 104a1 through 104aM and optical source generator 102b is coupled to data modulators 104b1 through 104bN.

Throughout this disclosure, references to optical fibers include any type of connection suitable for communication of optical signals. As just a few examples, optical fibers may include single-mode optical fibers, polarization-maintaining optical fibers, multimode optical fibers, plastic optical fibers, any other suitable type of optical fibers, or any suitable combination of the foregoing.

Each optical source generator 102 generates a pair of optical signals, which will be referred to as an optical source signal 124 and an optical reference signal 126. Each optical source signal 124 is an optical signal that has a corresponding particular wavelength and will be provided to one or more data modulators 104 to be modulated by data signals. In the illustrated example, optical source generator 102a generates optical source signal 124a, which has a wavelength, and provides optical source signal 124a to each of data modulators 104a1 through 104aM via optical fibers 118a. Additionally, in the illustrated example, optical source generator 102b generates optical source signal 124b, which has a wavelength, and provides optical source signal 124b to each of data modulators 104b1 through 104bN via optical fibers 118b. The wavelength of optical signal 124a and the wavelength of optical signal 124b may be the same or different according to particular implementations.

Each optical source generator 102 generates an optical reference signal 126. Each optical reference signal 126 is an optical signal that has a corresponding particular wavelength and will be used as a reference signal by other components of system 100, as described in greater detail below. In the illustrated example, optical source generator 102a generates optical reference signal 126a, which has a wavelength, and provides optical reference signal 126a to signal combiner 120 via optical fiber 122a. Additionally, in the illustrated example, optical source generator 102b generates optical reference signal 126b, which has a second wavelength, and provides optical reference signal 126b to signal combiner 120 via optical fiber 122b. Optical reference signals 126 also may be referred to as local oscillator (LO) signals. For example, optical reference signal 126a may be referred to as LOA and optical reference signal 126b may be referred to as LOB.

In certain embodiments, the wavelength of an optical source signal 124 generated by an optical source generator 102 and the wavelength of an optical reference signal 126 generated by the optical source generator 102 are different, and that difference corresponds to a difference in oscillation frequency. This difference in oscillation frequency may be the carrier RF to be transmitted.

In certain embodiments, the optical source signal 124 and optical reference signal 126 generated by an optical source generator 102 are phase locked to one another. For example, optical source signal 124a and optical reference signal 126a generated by optical source generator 102a may be phase locked to one another. As another example, optical source signal 124b and optical reference signal 126b generated by optical source generator 102b may be phase locked to one another. In certain embodiments, the respective optical source signal 124 and optical reference signal 126 generated by an optical source generator 102 are different than the respective optical source signal 124 and optical reference signal 126 generated by another optical source generator 102. Furthermore, the difference between the wavelength of an optical source signal 124a generated by a first optical source generator 102a and the wavelength of an optical reference signal 126a generated by the first optical source generator 102a may be different that the difference between the wavelength of an optical source signal 124b generated by a second optical source generator 102b and the wavelength of an optical reference signal 126b generated by the second optical source generator 102b.

In the illustrated example, optical source generator 102a and optical source generator 102b provide optical reference signals 126a and 126b, respectively, to signal combiner 120, which in certain embodiments is an optical signal combiner that combines the light of optical reference signals 126a and 126b into a combined optical reference signal 128.

In certain embodiments, each of optical source generators 102 corresponds to a respective frequency band. A frequency band, which also may be referred to as an RF frequency band, refers to a range of RF frequencies. For example, the radio frequency spectrum is divided into multiple bands (e.g., LF, HF, VHF, UHF, etc.). For ease of reference, a first frequency band (e.g., the frequency band associated with optical source generator 102a) will be referred to as frequency band A, and a second frequency band (e.g., the frequency band associated with optical source generator 102b) will be referred to as frequency band B. In certain embodiments, the frequency band (e.g., frequency band A or B) that corresponds to an optical source generator 102 is determined by the difference in frequency between optical source signal 124 and the optical reference signal 126 generated by that optical source generator 102. In certain embodiments, system 100 could support additional bands through the addition of more optical source generators 102, each generating signals with distinct, paired optical wavelengths between them.

Although system 100 is described as including two frequency bands, this disclosure contemplates system 100 being configured to process signals for any suitable number of frequency bands (including 1, 2, 3, or more), according to particular implementations. Furthermore, in certain embodiments, system 100 includes a corresponding optical source generator 102 for each frequency band that system 100 is configured to process. Additionally, or alternatively, optical source generators 102 could be combined or otherwise modified in any suitable manner to facilitate processing of signals associated with the number of frequency bands system 100 is configured to process.

Furthermore, although system 100 is described as including two optical source generators 102, this disclosure contemplates system 100 including any suitable number of optical source generators 102 (including 1, 2, 3, or more). In certain embodiments, each optical source generator 102 is configured to generate a respective optical source signal 124 having a corresponding wavelength and a respective optical reference signal 126 having a corresponding wavelength. In certain embodiments, the respective optical source signal 124 and the respective optical reference signal 126 for an optical source generator 102 are phase locked to one another and different than the respective optical source signals 124 and respective optical reference signals 126 generated by other optical source generators 102 of system 100.

System 100 includes data modulators 104. In the illustrated example, system 100 includes M data modulators 104a (e.g., data modulator 104a1, data modulator 104a2, . . . data modulator 104aM) and N data modulators 104b (e.g., data modulator 104b1, data modulator 104b2, . . . data modulator 104bN). Although different variables, M and N, are used to indicate the number of data modulators 104a and 104b, respectively, this disclosure contemplates system 100 including the number of data modulators 104a as the number of data modulators 104b, or including a different number of data modulators 104a as the number of data modulators 104b. Where different, this disclosure contemplates the number of data modulators 104a being greater than or less than the number of data modulators 104b, depending on the implementation.

Each data modulator 104 is configured to receive a data signal 130. In the illustrated example, each data modulator 104 corresponds to a particular user (e.g., User A1, User A2, . . . , User AM or User B1, User B2, . . . , User BN). Another example is described below with reference to FIGS. 7A-7B in which each data modulator corresponds to a transmission spatial sector of antenna array 116.

Data signal 130 may include any type of information to be transmitted by antenna array 116. Data signal 130 may have any suitable format, according to particular implementations. In certain embodiments, data signal 130 is an RF signal, an intermediate bandwidth signal, a microwave signal, or a signal in some other suitable frequency range. As an example, data signal 130 may at some point be in a format suitable for wireless communication, that some point being possibly prior to reception by data modulator 104 but also possibly at the time of reception of data signal 130 by data modulator 104, if appropriate.

Data signal 130 may be associated with a particular user. For example, data signal 130 may be a wireless signal that is for communication to a particular user. The user may be associated with a particular transmission spatial sector of antenna array and thus data signal 130 may be for transmission of at least a portion of data of data signal 130 to the first transmission spatial sector of antenna array 116.

Data modulator 104 is configured to modulate optical source signal 124 with data signal 130 to convert data signal 130 (or a portion of data signal 130) to an optical signal 132. For example, data modulator 104a1 may receive data signal 130a1 and optical source signal 124a, and modulate optical source signal 124a with data signal 130a1 to produce optical signal 132a1. As another example, data modulator 104b2 may receive data signal 130b2 and optical source signal 124b, and modulate optical source signal 124b with data signal 130b2 to produce optical signal 132b2.

The frequency band of the optical signal 132 generated by a data modulator 104 may depend on the frequency band of the optical source signal 124 that the data modulator 104 modulates with the data signal 130 received by the data modulator 104. For example, in the illustrated example, because data modulator 104a1 modulates optical source signal 124a received from optical source generator 102a with data signal 130a1, and because optical source signal 124a and optical reference signal 126a are associated with (e.g., tuned to) frequency band A, then optical signal 132a1 generated by data modulator 104a1 also is associated with (e.g., tuned to) frequency band A. As another example, in the illustrated example, because data modulator 104b2 modulates optical source signal 124b received from optical source generator 102b with data signal 130b2, and because optical source signal 124b and optical reference signal 126b are associated with (e.g., tuned to) frequency band B, then optical signal 132b2 generated by data modulator 104b2 also is associated with (e.g., tuned to) frequency band B.

Each data modulator 104 is coupled to switch matrix 106 by a respective optical fiber 134, which to avoid cluttering FIGS. 1A-1B are not individually labeled but may be referenced as optical fiber 134a1, optical fiber 134a2, . . . , optical fiber 134aM or optical fiber 134b1, optical fiber 134b2, . . . , optical fiber 134bN. A data modulator 104 transmits the optical signal 132 generated by the data modulator 104 to switch matrix 106 via the optical fiber 134 that couples the data modulator 104 to switch matrix 106. For example, data modulator 104a1 may transmit optical signal 132a1 to switch matrix 106 via optical fiber 134a1, and data modulator 104b2 may transmit optical signal 132b2 to switch matrix 106 via optical fiber 134b2.

Switch matrix 106 is configured to receive optical signals 132 at input ports of switch matrix 106 and direct optical signals to output ports of switch matrix 106. At least some of the input ports of switch matrix 106 are coupled to respective optical fibers 134, and at least some of the output ports of switch matrix 106 are coupled to one or more optical fibers 136 arranged in an optical fiber array 108. In general, switch matrix 106 is configured to reroute optical signals 132 received at an input port of switch matrix 106 to any output port of switch matrix 106 as a mechanism to perform beam switching for communicating signals via antenna array 116 to an appropriate transmission spatial sector.

This disclosure contemplates system 100 including any suitable number of optical fibers 136 of optical fiber array 108. In certain embodiments, the number of optical fibers 136 of optical fiber array 108 corresponds to the number of transmission spatial sectors of antenna array 116, and (as will be described in greater detail below) each optical fiber 136 corresponds to a transmission spatial sector of antenna array 116. Additionally, this disclosure contemplates switch matrix 106 including any suitable number of output ports. In certain embodiments, switch matrix 106 includes at least as many output ports as the number of optical fibers 136 of optical fiber array 108, with each optical fiber 136 corresponding to an output port of switch matrix 106.

Since the output ports of switch matrix 106 correspond to optical fibers 136 that correspond to transmission spatial sectors of antenna array 116, an optical signal 132 (and ultimately a signal derived from the optical signal 132) can be directed to a particular transmission spatial sector by being directed to a particular output port of switch matrix 106. Furthermore, since switch matrix 106 can reroute optical signals 132 received at an input port of switch matrix 106 to any output port of switch matrix 106, system 100 (e.g., switch matrix 106 of system 100) can direct signals for different users and/or for different bands to the same or different transmission spatial sectors, potentially simultaneously.

In certain embodiments, switch matrix 106 may combine optical signals 132 from different data modulators 104 (e.g., for different users) and/or associated with different bands (e.g., band A and band B) into a single signal for transmission via an optical fiber 136 of optical fiber array 108. For example, switch matrix 106 may combine optical signal 132a1 received via optical fiber 134a1 (e.g., at a first input port of switch matrix 106) and optical signal 132b2 received via optical fiber 134b2 (e.g., at a different second input port of switch matrix 106), and the combined optical signal may be output from a particular output port of switch matrix 106 to an optical fiber 136 of optical fiber array 108 as optical signal 138.

In certain embodiments, fiber array 108 includes an optical fiber 136 that receives combined optical reference signal 128. In the illustrated example, this is shown as the central optical fiber 136 of optical fiber array 136; however, this is for example purposes only.

System 100 may include a controller 140, which is configured to provide a control signal 142 to switch matrix 106. Although controller 140 is illustrated separately from switch matrix 106, this disclosure contemplates controller 140 being part of or separate from switch matrix 106, according to particular implementations.

Control signal 142 instructs switch matrix 106 as to which output port of switch matrix 106 an optical signal 132 received on an input port of switch matrix 106 should be directed. The instruction provided by control signal 142 may be based on any suitable information. In certain embodiments, controller 140 has access to information related to a user associated with a particular optical signal 132 (and thereby associated with a data signal 130 from which that optical signal 132 was generated). As a particular example, controller 140 may have access to a location of the user (e.g., of the user equipment) associated with the particular optical signal 132. Knowing the location of the user allows controller 140 to select an appropriate output port of switch matrix 106 for directing an optical signal 132, so that the data of the data signal 130 from which the optical signal 132 was generated is transmitted to the appropriate transmission spatial sector of antenna array 116 for that data signal 130.

Controller 140 may include a processor 144 and a memory 146.

Processor 144 includes any combination of hardware, firmware, and software that operates to control and process information. Processor 144 may be a programmable logic device, a central processing unit, a microcontroller, a microprocessor, a digital signal processor, a field programmable gate array, an application specific integrated circuit, any processing device, or any combination of the preceding. Processor 144 may be configured to read and process instructions stored in memory 146. Although illustrated as a single functional unit, this disclosure contemplates system 100 including any suitable number of processors.

Memory 146 stores, either permanently or temporarily, data, operational instructions (e.g., software), or other information for access and/or execution by processor 144. Memory 146 includes any one or a combination of volatile or non-volatile local or remote devices for storing information. For example, memory 146 may include static or dynamic random access memory (RAM), read-only memory (ROM), magnetic storage devices, optical storage devices, hard disks, subscriber identity module (SIM) cards, memory sticks, secure digital (SD) memory cards, or any other information storage device or a combination of these devices. In certain embodiments, at least a portion of memory 146 is non-transitory. Although a single memory 146 is illustrated, system 100 may include any number of memories 146. Among other potential data, memory 146 stores programming for execution by the processor 144 to cause processor 144 to perform operations associated with switch matrix 106.

As optical signals 138 are emitted from optical fibers 136 of optical fiber array 108, the optical signals 138 have a first wave format 148. In certain embodiments, first wave format 148 is a spherical wave format, although this disclosure contemplates optical signals 138 emitted from optical fibers 136 having any suitable format, according to particular implementations.

Optical lens 110 is adapted to transform optical signal 138 from first wave format 148 to a second wave format 150. In one example, the transformation performed by optical lens 110 on optical signal 138 is a Fourier transform in the optical domain. In certain embodiments, second wave format 150 is a plane wave format. This disclosure, however, contemplates lens 110 transforming optical signals 138 from first wave format 148 to any suitable second wave format, according to particular implementations. In the illustrated example, optical signals 138 in the second wave format are shown as angled lines to the right of optical lens 110. The angle of a plane waves for a particular optical signal 138 in the second wave format 150 may be dictated by the placement, relative to optical lens 110, of the optical fiber 136 that emits the particular optical signal 138.

Combined optical reference signal 128 also may be emitted from an optical fiber 136 of optical fiber array 108. Combined optical reference signal 128 may be emitted from the optical fiber 136 of optical fiber array 108 in first wave format 148. Lens 110 also may transform combined optical reference signal 128 from first wave format 148 to second wave format 150. As with optical signals 138, the angle of a plane waves for combined optical reference signal 128 in the second wave format 150 may be dictated by the placement, relative to optical lens 110, of the optical fiber 136 that emits the combined optical reference signal 128. In the illustrated example, combined optical reference signal 128 in second wave format 150 is shown as vertical lines labeled LO. In certain embodiments, combined optical reference signal 128 is directed (via an appropriate optical fiber 136 of optical fiber array 108) to the focal plane of lens 110.

Optical signals 138 in second wave format 150 and combined optical reference signal 128 in second wave format 150 have certain characteristics, which may be dictated, at least in part, by which optical fiber 136 of optical fiber array 108 emitted the optical signal (e.g., the optical signal 138 or the combined optical reference signal 128). An example will now be described.

As described above, for example, second wave format 150 may be a plane wave format. In such an example, each optical signal (e.g., an optical signal 138 or a combined optical reference signal 128) in second wave format 150 may be represented as one or more plane waves. The plane waves that represent an optical signal (e.g., an optical signal 138 or a combined optical reference signal 128) in the second format have an angle. The angle of the one or more plane waves that represent an optical signal (e.g., an optical signal 138 or a combined optical reference signal 128) may be determined, at least in part, by the location, relative to optical lens 110, of the optical fiber 136 that emitted the optical signal. The location of that optical fiber 136 relative to optical lens 110 determines how the optical signal emitted from that optical fiber 136 encounters optical lens 110, which affects the transformation of that optical signal by optical lens 110 from first wave format 148 to second wave format 150. In this particular example, the location of that optical fiber 136 relative to optical lens 110 affects the angle of the plane waves into which optical lens 110 transforms the optical signal emitted from that optical fiber 136.

Although system 100 is described as including lens 110 to transform optical signals 138 from first wave format 148 to second wave format 150, this disclosure contemplates system 100 transforming optical waves 138 from first wave format 148 to second wave format 150 in any suitable manner, according to particular implementations. Thus, it is possible to implement system 100 with or without lens 110.

System 100 includes optical fibers 152 arranged in optical fiber array 112. Some or all of optical fibers 152 are arranged to receive combined optical reference signal 128 in second wave format 150 and optical signals 138 in second wave format 150. In certain embodiments, system 100 includes lenslets 154, which facilitate receipt of combined optical reference signal 128 in second wave format 150 and optical signals 138 in second wave format 150 by optical fibers 152 of optical fiber array 112.

In certain embodiments, optical fiber array 108 is positioned on a focal plane of optical lens 110, and the optical fibers 136 of optical fiber array 108 provide an array of optical point sources (each optical fiber 136 serving as a respective point source) to optical lens 110. Each point source (and thereby each optical fiber 136) may correspond to a transmission spatial sector of antenna array 116. Using optical lens 110, the point sources emitted from the optical fiber array 108 can be collimated into the second wave format 150 (e.g., plane waves) at corresponding propagation angles. For example, as described above, the location of an optical fiber 136 relative to optical lens 110 affects the angle of the plane waves into which optical lens 110 transforms an optical signal (e.g., an optical signal 138 or a combined optical reference signal 128) emitted from that optical fiber 136. Optical fibers 152 of optical fiber array 112 (possibly via lenslets 154, if included) receive the linearly distributed phase for a given optical source (e.g., optical signal 138 in second wave format 150). In this example, lenslet 154 is used to match the numerical aperture of optical lens 110 to the numerical aperture of optical fiber 152 of the optical fiber array 112. Similar lenslets may be used in combination with optical fibers 136 of the optical fiber array 108 on the left side of lens 110 in FIG. 1B to match the numerical apertures of optical fibers 136 to the numerical aperture of the lens 110.

In certain embodiments, switch matrix 106 directs an optical signal 132 to an optical fiber 136 that will result in optical lens 110 transforming an optical signal 138 (corresponding to that optical signal 132) from first wave format 148 to second wave format 150, such that the plane waves representing the optical signal 138 in second wave format 150 have an angle that corresponds to the desired transmission spatial sector of antenna array 116 for transmission of transmission signals. That is, the position of optical fibers 136 may be such that an optical signal 138 in first wave format 148 is passed through (and converted to second wave format 150 by) optical lens 110 to result in the optical signal 138 having appropriately angled plane waves in second wave format 150. In certain embodiments, the appropriate angle for a particular optical signal 138 in second wave format 150 depends on the transmission spatial sector in which the transmission signals for the optical signal 138 are to be transmitted. This is because the angle of the plane waves for optical signal 138 becomes, or translates to, the transmission spatial sector to which transmission signals 168 determined from the optical signal 138 are transmitted by the antennas of antenna array 116.

Regarding combined optical reference signal 128, switch matrix 106 may or may not be responsible for directing combined optical reference signal 128 to the desired optical fiber 136, serving as a point source for emitting combined optical reference signal 128 in first wave format 148 toward optical lens 110, to result in the desired combined optical signal 128 in second wave format 150. In other words, this disclosure contemplates combined optical reference signal 128 being directed to the desired optical fiber 136 in any suitable manner, whether via switch matrix 106 or otherwise. The desired combined optical signal 128 in second wave format 150 (shown in this example as vertical lines labeled LO) may be one that has the desired plane waves for a reference signal that can be received by optical fibers 152 of optical fiber array 112 and used in connection with optical signals 138 in second wave format 150 to form transmission signals 168 for transmission to the desired transmission spatial sector.

In certain embodiments, some or all of optical fibers 152 of optical fiber array 112 are adapted to receive combined optical reference signal 128 in second wave format 150. Optical fibers 152 of optical fiber array 112 are adapted to combine at least a portion of combined optical reference signal 128 in second wave format 150 with optical signal 138 in second wave format 150 to produce an optical signal 156.

This disclosure contemplates system 100 including any suitable number of optical fibers 152 of optical fiber array 112. In certain embodiments, the number of optical fibers 152 of optical fiber array 112 corresponds to the number of antennas of antenna array 116. Since, in certain embodiments, optical fibers 152 correspond to antennas, and since a particular signal that ultimately is transmitted by antenna array 116 may be transmitted by more than one antenna of antenna array 116 (e.g., to provide that transmitted signal to the appropriate transmission spatial sector), then more than one optical fiber may receive the second optical signal 138 in second wave format 150.

Optical fiber array 112 provides optical signal 156 to signal conversion circuitry 114, where, as described below, optical signal 156 will be converted to an appropriate format for transmission in an appropriate transmission spatial sector of antenna array 116.

Optical fiber array 108, lens 110, and optical fiber array 112 may be referred to collectively as optical wave transformation module 158. In certain embodiments, optical wave transformation module 158 is a chamber or other enclosure, which provides an environment that facilitates emission of optical signals in the first wave format from optical fiber array 108, transformation of optical signal 138 from the first format to the second wave format (e.g., by lens 110), and receipt of optical signal 138 in the second wave format by optical fiber array 112.

Signal conversion circuitry 114 is configured to convert optical signals 156 to a transmission signal for transmission in a suitable transmission spatial sector by antennas of antenna array 116. For example, signal conversion circuitry 114 may be configured to convert optical signals 156 from an optical format to a signal that is suitable for wireless transmission, such as an RF signal, a microwave signal, or another suitable format.

Signal conversion circuitry 114 may include photodiodes 160 that are configured to convert light into electrical energy. For example, photodiodes 160 may be configured to convert optical signals 156 into electrical energy that may be transmitted wirelessly by antennas of antenna array 116. In a particular example, photodiodes 160 convert optical signals 156 into RF signals. In certain embodiments, in addition to carrier frequency, photodiodes 160 capture modulation that may have been performed on the optical signals and convert that modulation into the modulation on the RF signals (or other type of transmission signal) and preserve the phase relations. This may allow system 100 to convert the optical plane wave of the second wave format 150 reflected in optical signals 156 into an RF (or other) plane wave in transmission signals (e.g., transmission signals 168).

This disclosure contemplates system 100 including any suitable number of photodiodes 160, according to particular implementations. In certain embodiments, system 100 includes at least a photodiode 160 for each antenna of antenna array 116.

In certain embodiments, signal conversion circuitry 114 includes one or more signal amplifiers and/or one or more signal attenuators. In the illustrated example, signal conversion circuitry 114 includes optical signal amplifiers 162 (which in the illustrated example are shown as erbium-doped fiber amplifiers (EDFAs), optical attenuators 164 (which in the illustrated example are shown as variable optical attenuators (VOAs), and power amplifiers (PAs) 166.

Optical signal amplifiers 162 amplify optical signals 156. For example, it may be desirable to boost optical signals 156 prior to shining the optical signals 156 on a photodiode 160. This disclosure contemplates system 100 including any suitable number of optical signal amplifiers 162, according to particular implementations. In certain embodiments, system 100 includes at least an optical signal amplifier 162 for each antenna of antenna array 116.

Optical attenuators 164 are used to tune the power level of optical signals 156. For example, an optical attenuator 164 may tune (e.g., reduce the power level of) optical signals 156 as amplified by optical signal amplifiers 164. In certain embodiments, optical attenuators 164 provide a desired amplitude distribution across the array to achieve optimal array gain pattern.

This disclosure contemplates system 100 including any suitable number of optical attenuators 164, according to particular implementations. In certain embodiments, system 100 includes at least an optical attenuator 164 for each antenna of antenna array 116. The attenuated version of optical signals 156 are provided to photodiodes 160 for conversion from an optical signal to an electrical signal by photodiodes 160.

Power amplifiers 166 amplify the electrical signals (e.g., the RF signals) output by photodiodes 160. This amplification may facilitate increasing the power of the electrical signals for transmission as transmission signals 168 by antennas of antenna array 116. In certain embodiments, power amplifiers 166 are RF amplifiers boost the total radiated power of transmission signals 168, if appropriate.

Antennas of antenna array 116 are used to transmit transmission signals 168. The antennas of antenna array 116 that are used to transmit transmission signals 168 are determined by which optical fibers 152 of optical fiber array 112 receive optical signals 138 (e.g., in the second wave format).

This disclosure contemplates antenna array 116 including any suitable number of antennas. In certain embodiments, antenna array 116 is part of a MIMO antenna system or massive MIMO antenna system. In certain embodiments, antenna array 116 converts a guided wave output by photodiodes 160 (and possibly amplified by power amplifiers 166) into free space propagating waves for transmission as transmission signals 168 by antennas of antenna array 116.

Transmission signals 168 are the signals that include the data of data signals 130 that are in a format suitable for transmission over the air by antennas of antenna array 116. In certain embodiments, transmission signals have the plane wave format analogous to the second wave format 150 of optical signals 138.

System 100 may be implemented in a variety of environments, including but not limited to a base station in a base station or repeater for cellular communications (e.g., 4G, 5G, etc.), PMP backhauling, fixed wireless broadband access, passive electromagnetic sensing, and other suitable communication technologies.

In certain embodiments, the elements of system 100 may be distributed, such as across multiple geographic locations or otherwise between different functional blocks of system 100. For example, certain embodiments of system 100 may be a part of a distributed base station. In such a distributed architecture, a remote radio unit (RRU) (e.g., the radio function unit) is separated from a baseband unit (BBU) (e.g., the digital function unit) by a connector, such as a fiber connection. As a particular example installation, the RRU can be installed on a tower or building close to the antennas and the BBU can be installed remotely, such as meters or even miles away and connected to the RRU by the connector.

In an example embodiment of system 100, switch matrix 106, optical lens 110, optical fiber array 108, optical fiber array 112, and antenna array 116 are located in an RRU, and optical signal 132 is received by switch matrix 106 from a BBU via an optical fiber (e.g., optical fiber 134). In another example embodiment of system 100, switch matrix 106, optical lens 110, optical fiber array 108, and optical fiber array 112 are located in a BBU, and signal conversion circuitry 114 and antenna array 116 are located in an RRU.

In operation of an example embodiment of system 100, first optical source generator 102a generates first optical source signal 124a having a first wavelength and generates a first optical reference signal 126a having a second wavelength. In certain embodiments, first optical source signal 124a and first optical reference signal 126a are phase locked to one another. First optical source generator 102a may correspond to a first frequency band (e.g., band A), and a difference between the first wavelength of first optical source signal 124a and the second wavelength of first optical reference signal 126a may define the first frequency band (e.g., band A) that corresponds to first optical source generator 102a. First optical source generator 102a transmits first optical source signal 124a to first data modulator 104a1 and transmits first optical reference signal 126a to an optical fiber 136 of first optical fiber array 108.

First data modulator 104a1 receives first optical source signal 124a from first optical source generator 102a and receives first data signal 130a1. In certain embodiments, first data signal 130a1 is an electrical signal. First data signal 130a1 may be for transmission in a first transmission spatial sector of an antenna array 116. In certain embodiments, first data signal 130a1 includes data destined for a single user in the first transmission spatial sector. In certain other embodiments, first data signal 130a1 includes data destined for multiple users in the first transmission spatial sector. For example, as will be described below with reference to FIGS. 7A-7B, a data encoder 702 may have received data destined for multiple users and encoded the data destined for each of the users such that first data signal 130a1 includes the data destined for each of the users.

First data modulator 104a1 may generate a first optical signal 132a1. For example, first data modulator 104a1 may generate first optical signal 132a1 by modulating first optical source signal 124a with first data signal 130a1. First data modulator 104a1 may transmit first optical signal 132a1 to switch matrix 106 via optical fiber 134 (e.g., optical fiber 134a1).

Switch matrix 106 receives, at a first input port, first optical signal 132a1 generated from first data signal 130a1. First optical signal 132a1 is for transmission in a first transmission spatial sector of an antenna array 116.

Switch matrix 106 directs, via a first output port, a first optical signal 132a1 to a first optical fiber 136 of first optical fiber array 108. The first output port of switch matrix 106 is coupled to the first optical fiber 136 of first optical fiber array 108. The first optical fiber 136 of first optical fiber array 108 corresponds to the first transmission spatial sector of antenna array 116.

In certain embodiments, switch matrix 106 directs, via the first output port, the first optical signal 132a1 to the first optical fiber 136 of first optical fiber array 108 based on a control signal 142 received from controller 140. As described above, control signal 142 instructs switch matrix 106 as to which output port of switch matrix 106 an optical signal 132 received on an input port of switch matrix 106 should be directed. The instruction provided by control signal 142 may be based on any suitable information, as described above. Among other features, the operation of switch matrix 106, in conjunction with control signal 142, may allow the mappings between input ports and output ports of switch matrix 106 to be changed, as desired, which may allow switch matrix 106 to be reconfigured.

Switch matrix 106 outputs, via the first output port, a second optical signal 138. The second optical signal 138 is based at least in part on first optical signal 132a1. In certain embodiments, second optical signal 138 is substantially the same, if not identical, to first optical signal 132a1. In certain other embodiments, second optical signal 132a1 includes some or all of first optical signal 132a1 but also includes some or all of other optical signals 132 received at one or more other input ports of switch matrix 106. In the latter scenarios, switch matrix 106 may combine the optical signals 132 from the different input ports of switch matrix 106 into the second optical signal 138. The first optical fiber 136 emits the second optical signal 138 in a first wave format 148 (e.g., in a spherical wave format), in a direction of optical lens 110 for example.

A second optical fiber 136 of optical fiber array 108 receives the first optical reference signal 126 generated by optical source generator 102a. In certain embodiments, the first optical reference signal 126 may have been combined by a combiner 120 with one or more other optical reference signals 126 generated by other optical source generators 102 to form a combined optical reference signal 128. For purposes of the remainder of this example, the optical reference signal received by the second optical fiber 136 will be referred to as combined optical reference signal 128. The second optical fiber 136 of optical fiber array 108 emits combined optical reference signal 128 in a first wave format 148 (e.g., in a spherical wave format), in a direction of optical lens 110 for example.

Optical lens 110 transforms second optical signal 138 of the first optical fiber 136 of optical fiber array 108 from first wave format 148 to second wave format 150 (e.g., a plane wave format). Optical lens 110 transforms combined optical reference signal 128 of the second optical fiber 136 of optical fiber array 108 from first wave format 148 to second wave format 150 (e.g., a plane wave format).

Optical fibers 152 of second optical fiber array 112 receive the second optical signal 138 in second wave format 150 from optical lens 110. For example, optical fibers 152 of second optical fiber array 112 may pick up the second optical signal 138 (in the second wave format 150) propagating in the free space between optical lens 110 and second optical fiber array 112. In certain embodiments, one or more lenslets 154 positioned between the optical fibers 152 of second optical fiber array 112 and the free space between optical lens 110 and second optical fiber array 112, facilitate receipt of the second optical signal 138 in second wave format 150 by optical fibers 152 of second optical fiber array 112.

Optical fibers 152 of second optical fiber array 112 receive combined optical reference signal 128 in second wave format 150 from optical lens 110. For example, optical fibers 152 of second optical fiber array 112 may pick up combined optical reference signal 128 (in second wave format 150) propagating in the free space between optical lens 110 and second optical fiber array 112. In certain embodiments, one or more lenslets 154 positioned between the optical fibers 152 of second optical fiber array 112 and the free space between optical lens 110 and second optical fiber array 112, facilitate receipt of combined optical reference signal 128 in second wave format 150 by optical fibers 152 of second optical fiber array 112.

Optical fibers 152 of second optical fiber array 112 provide respective third optical signals 156 to signal conversion circuitry 114. For each optical fiber 152 of second optical fiber array 112, the third optical signal 156 for that optical fiber 152 is based at least in part on the second optical signal 138 in second wave format 150 as received by that optical fiber 152 and the combined optical reference signal 128 in second wave format 150 as received by that optical fiber 152. In certain embodiments, that optical fiber 152 of second optical fiber array 112 is adapted to combine at least a portion of the combined optical reference signal 128 with the second optical signal 138 to generate the third optical signal 156.

Signal conversion circuitry 114 (e.g., including photodiodes 160) converts the third optical signals 156 to first transmission signals for transmission in the first transmission spatial sector by antennas of antenna array 116. As a particular example, each optical fiber 152 of second optical fiber array 112 may be coupled to a corresponding photodiode 160 (either directly, or indirectly via one or more other processing elements of signal conversion circuitry 114, such as amplifiers 162 and/or attenuators 164), and the photodiode 160 for a given optical fiber 152 may convert the third optical signal 156 present on that optical fiber to one or more transmission signals 168 for transmission in the first transmission spatial sector by antennas of antenna array 116. In certain embodiments, transmission signals 168 are formatted as one or more RF signals.

As described above, third optical signals 156 may include optical signal 138 (in second wave format 150) and combined optical reference signal 128 (in second wave format 150). The presence of combined optical reference signal 128 may allow signal conversion circuitry 114 (e.g., photodiodes 160) to generates transmission signals 168 (e.g., RF signals) that have a suitable frequency and phase for transmission by antennas of antenna array 116.

As described above, signal conversion circuitry 114 may include additional components that are configured to tune and/or amplify either third optical signal 156 or the transmission signal to which the third optical signal 156 is converted prior to transmission of transmission signals 168. Antennas of antenna array 116 transmit transmission signals 168 to the first transmission spatial sector.

Characteristics of the optical signals in the second wave format 150 (e.g., the angle of the plane waves of the received optical signals, including the received optical signal 138 and the received combined optical reference signals 128 in second wave format 150) affect characteristics of the generated transmission signals 168, allowing transmissions signals 168 to be generated with a suitable frequency and phase and for transmission by antennas of antenna array 116 to a suitable transmission spatial sector that matches the intended transmission spatial sector. The angles of the plane waves are affected by which optical fiber 136 of first optical fiber array 108 emits the optical signals (including the received optical signal 138 and the received combined optical reference signals 128) in the first wave format 148 in the direction of optical lens 110, due to the position of that optical fiber 136 relative to optical lens 110.

For simplicity, the above-described example of the operation of system 100 was described primarily with reference to a single data signal 130a1 propagating through system 100 for transmission in the first transmission spatial sector associated with data signal 130a1. This disclosure, however, contemplates system 100 processing multiple data signals 130, potentially simultaneously. These additional data signals 130 may be associated with the same or a different frequency band as data signal 130a1. Additionally or alternatively, these additional data signals 130 may be associated with the same or a different user as data signal 130a1. Additionally or alternatively, these additional data signals 130 may be associated with the same or a different transmission spatial sector as data signal 130a1. A few example scenarios are described below.

As a first example, switch matrix 106 may receive, at a second input port, another optical signal 132 (which will be referred to as a fourth optical signal 132b2) generated from a second data signal 130b2. In certain embodiments, the first optical signal 132a1 is associated with a first frequency band (e.g., band A), the first optical signal 132a1 having been formed by modulating first optical source signal 124a having a first wavelength with first data signal 130a1, and the fourth optical signal 132b2 is associated with a second frequency band (e.g., band B), the fourth optical signal 132b2 having been formed by modulating a second optical source signal 124b having a second wavelength with second data signal 130b2. In this example, the fourth optical signal 132b2 is for transmission in the first transmission spatial sector of antenna array 116.

Continuing with the first example, in one scenario, switch matrix 106 directs, via the first output port, the fourth optical signal 132b2 to the first optical fiber 136 of first optical fiber array 108. Switch matrix 106 may output, via the first output port, a fifth optical signal 138 that is based at least in part on fourth optical signal 132b2. In other words, despite fourth optical signal 132b2 being associated with a separate frequency band (e.g., band B), being generated from different input data 130 than first optical signal 132a1, and being received at different input ports of switch matrix 106, switch matrix 106 directs (e.g., based on control signal 142) both fourth optical signal 132b2 and first optical signal 132a1 to the same output port of switch matrix 106, which will feed antennas of antenna array 116 for transmission to the first transmission spatial sector. In certain embodiments, switch matrix 106 combines the first optical signal 132a1 and the fourth optical signal 132b2 such that the second optical signal 138 is based at least in part on both the first optical signal 132a1 and the fourth optical signal 132b2 and the fifth optical signal 138 in this scenario is the same as the second optical signal 138.

As a second example, switch matrix 106 may receive, at a second input port, another optical signal (which will be referred to as fourth optical signal 132b2) generated from a second data signal 130b2. In certain embodiments, the first optical signal 132a1 is associated with a first frequency band (e.g., band A), the first optical signal 132a1 having been formed by modulating a first optical source signal 124a having a first wavelength with first data signal 130a1, and the fourth optical signal 132b2 is associated with a second frequency band (e.g., band B), the fourth optical signal 132b2 having been formed by modulating a second optical source signal 124b having a second wavelength with second data signal 130b2. In this example, the fourth optical signal 132b2 is for transmission in a second transmission spatial sector of antenna array 116.

Continuing with the second example, in one scenario, switch matrix 106 directs, via a second output port, the fourth optical signal 132b2 to a second optical fiber 136 of first optical fiber array 108. The second optical fiber 136 of first optical fiber array 108 corresponds to the second transmission spatial sector of antenna array 116. Switch matrix 106 may output, via a second output port, a fifth optical signal 138 that is based at least in part on the fourth optical signal 132b2. In an example, optical lens 110 transforms the fifth optical signal 138 of the second optical fiber 136 of first optical fiber array 108 from first wave format 148 to second wave format 150. In certain embodiments, optical fibers 152 of second optical fiber array 112 receive the fifth optical signal 138 in second wave format 150 and provide respective sixth optical signals 156 to signal conversion circuitry 114. The respective sixth optical signals 156 are based at least in part on the fifth optical signal 138, as recited in second wave format 150 by the respective optical fibers 152. Signal conversion circuitry 114 is configured to convert the sixth optical signals 156 to second transmission signals 168 for transmission in the second transmission spatial sector by antennas of antenna array 116.

As a third example, switch matrix 106 may receive, at first input port, another optical signal 132 (which will be referred to as a fourth optical signal 132a2) generated from a second data signal 130a2, the first optical signal 132a1 and the fourth optical signal 132a2 being associated with the same frequency band (e.g., band A). In this third example, fourth optical signal 132a2 is for transmission in a second transmission spatial sector of antenna array 116. In this third example, switch matrix 106 may direct, via a second output port of switch matrix 106, fourth optical signal 132a2 to a second optical fiber 136 of first optical fiber array 108. Switch matrix 106 may output, via the second output port, a fifth optical signal 138 that is based at least in part on fourth optical signal 132a2. The second output port of switch matrix 106 is coupled to the second optical fiber 136 of first optical fiber array 108, and the second optical fiber 136 of first optical fiber array 108 corresponds to the second transmission spatial sector of antenna array 116.

Certain embodiments of system 100, therefore, support beamforming of transmission signals in multiple bands, which may be achieved in part by providing multiple optical source generators. Furthermore, in certain embodiments, switch matrix 106 allows signals received on any input port of switch matrix 106 to be routed to any output port of switch matrix 106, potentially in combination with other signals received at other input ports of switch matrix 106, for transmission in a transmission spatial sector associated with that output port.

Additionally, the above-described example implementation is a multi-band capable implementation. It should be understood that this disclosure contemplates a single band implementation. In certain embodiments, such a single-band implementation of system 100 may include a single optical source generator 102, a single set of data modulators 104 (e.g., data modulators 104a1-104aM), and a single reference signal 126 (e.g., without a signal combiner 120 such that the single reference signal 126 is a non-combined reference signal). Additionally or alternatively, in certain embodiments, such a single-band implementation may include additional components (e.g., those illustrated in FIGS. 1A-1B, such as one or more additional optical source generators 102, one or more additional sets of data modulators 104, and one or more additional signal combiners 120) for processing multiple bands, but may be programmed to use those for a single band.

Figure 2:
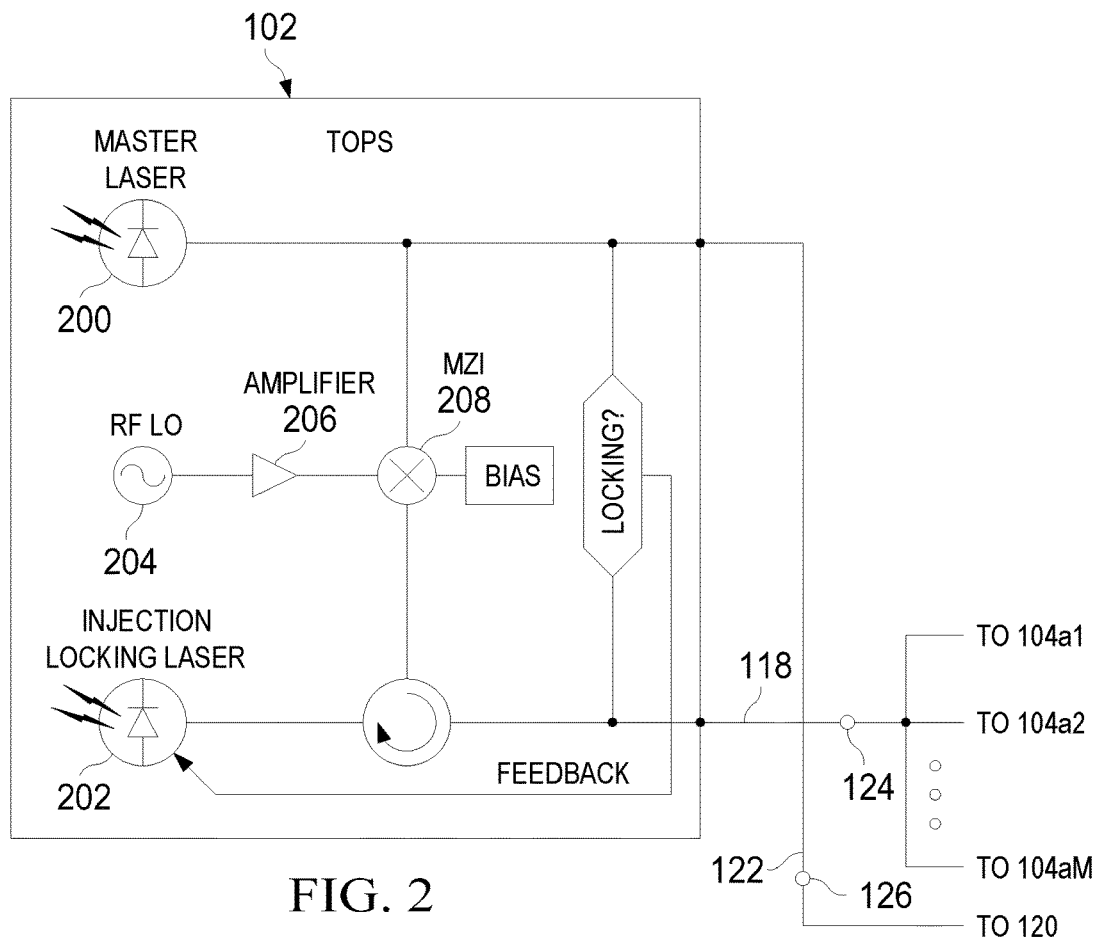
FIG. 2 illustrates an example optical source generator, according to certain embodiments of this disclosure.

FIG. 2 illustrates an example optical source generator 102, according to certain embodiments of this disclosure. Optical source generator 102 also may be referred to as a tunable optical paired-laser source (TOPS). FIG. 2 provides just one example implementation of optical source generator 102, and this disclosure contemplates optical source generator 102 being implemented in other ways. Optical source generator 102 corresponds to an RF band, which may be distinct from RF bands to which other optical source generators 102 correspond, if appropriate.

In the illustrated example, optical source generator 102 includes a first light source 200 and a second light source 202. In certain embodiments, lights sources 200 and 202 are implemented as lasers. This disclosure, however, contemplates light sources being implemented using any suitable type of light source for use in an optical circuit. Light source 200 may be referred to as a master laser, and light source 202 may be referred to as an injection locking laser. In general, optical source generator 102 phase locks light source 200 and light source 202 using modulation-sideband injection locking. This phase locking makes light sources 200 and 202 mutually coherent (up to a certain distance) so that when the two light sources 200 and 202 are mixed on a photodetector, the optical contributions to the phase noise (e.g., originating in the laser sources) cancel out and a high quality RF signal is generated.

In the illustrated example, optical source generator 102 includes an RF local oscillator 204, which provides a local oscillator signal to an amplifier 206. Light emitted by light source 200 is electrically modulated by a modulator 208, which in certain embodiments is a high-speed electro-optic (EO) modulator, with a comb of RF harmonics produced by an amplifier 206, which may be a saturated RF amplifier, from an RF local oscillator signal (or other reference signal) provided by local oscillator 204. In certain embodiments, modulator 208 is a Mach-Zehnder-Interferometer (MZI) modulator. The resultant upper and lower optical sidebands can be injected into an injection locking laser to produce an injection locked, or phase-locked, laser signal. By intentionally tuning the optical wavelengths of the injection locking laser to the upper or lower sideband, the resultant injection-locked laser signal can be mixed with the master-laser signal at the photodetector (e.g., photodetector 160) to generate a pure RF tone (e.g., for transmission as transmission signal 168). In certain embodiments, optical source generator 102 can achieve a sub-hertz linewidth RF with 100 GHz tunability, although this disclosure is not limited to such embodiments.

Optical source generator 102 has then generated optical source signal 124 and optical reference signal 126, which may be phase-locked to one another. Optical source generator 102 provides optical source signal 124 to one or more data modulators 104 via optical fibers 118. In the illustrated example, this is shown as optical fibers 118 split (or fanned out) into multiple channels, each directed to a data modulator 104 (data modulator 104a1, data modulator 104a2, . . . , data modulator 104aM for purposes of illustration).

To the extent system 100 includes multiple optical source generators 102, each optical source generator 102 may then provide optical reference signal 126 via optical fiber 122 to combiner 120 for combining with optical reference signals 126 from other optical source generators 102. In embodiments in which system 100 includes only one optical source generator 102 (or to the extent appropriate for embodiments that include multiple optical source generators 102), optical source generator 102 may provide optical reference signal 126 via optical fiber 122 to an appropriate optical fiber 136 of optical fiber array 108.

Figure 3:
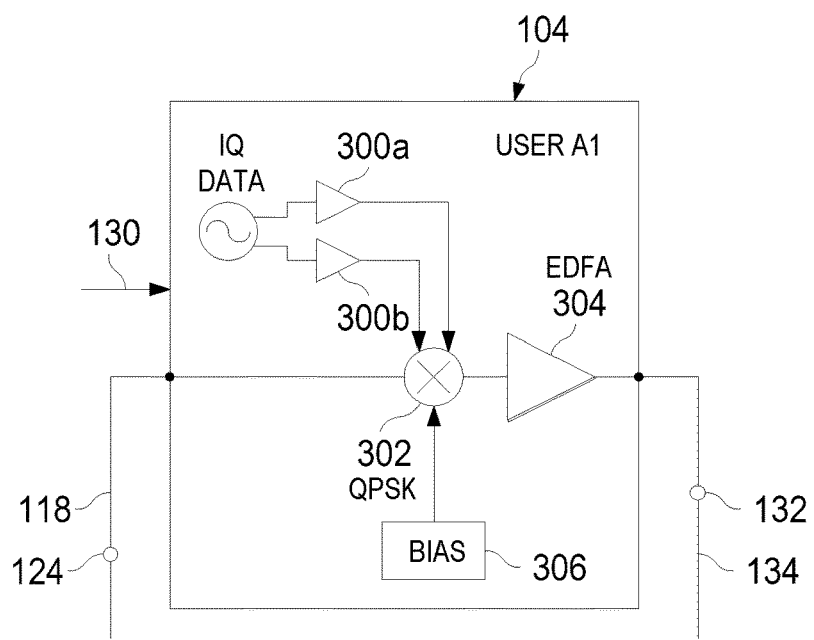
FIG. 3 illustrates an example data modulator, according to certain embodiments of this disclosure.

FIG. 3 illustrates an example data modulator 104, according to certain embodiments of this disclosure. FIG. 3 provides just one example implementation of data modulator 104, and this disclosure contemplates data modulator 104 being implemented in other ways. In certain embodiments, data modulator 104 may be considered an in-phase (I) and quadrature (Q) (IQ) modulator. Although in the illustrated example, data modulator 104 is shown as being specific to a user (User A1), this disclosure contemplates data modulator 104 being specific to other users (e.g., other Users A2, etc. or other Users B1, etc.) or to sectors, as will be described with reference to FIGS. 7A-7B.

In the illustrated example, each data modulator 104 includes a pair of driving amplifiers 300a and 300b, a data modulator 302 (e.g., an IQ modulator, which in the illustrated example is shown as a quadrature phase-shift keying (QPSK) modulator), and a pre-amplifier 304 (e.g., shown as an EDFA pre-amplifier). Data modulator 302 is biased, using bias 306, to achieve a suppressed carrier and one of the sidebands.

Using these components, data modulator 104 modulates optical source signal 124 with data 130, using a modulator that is biased by bias 306, and amplified (e.g., using amplifier 304) to generate optical signal 132, which is transmitted via optical fiber 134 (e.g., for sending to switch matrix 106.

Figure 4:
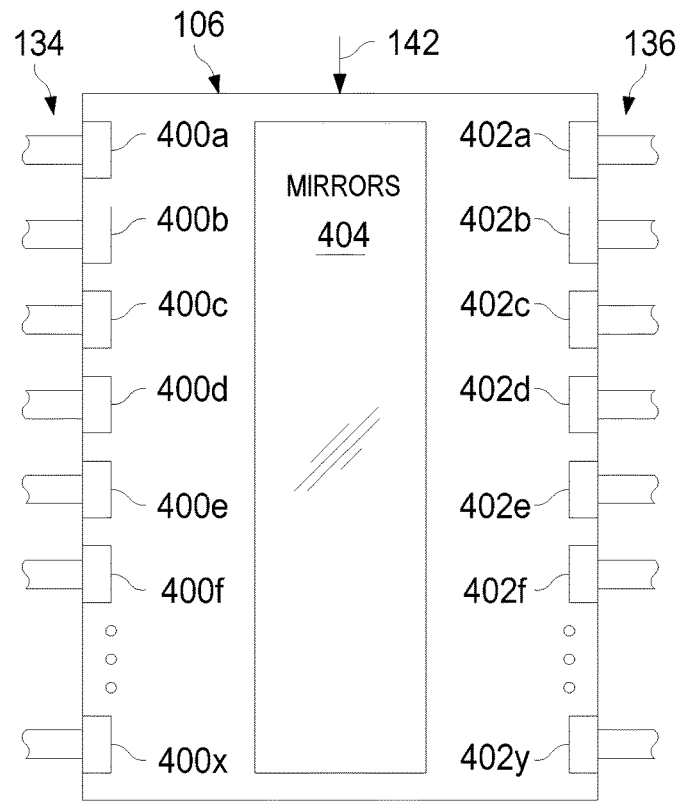
FIG. 4 illustrates an example optical switch matrix, according to certain embodiments of this disclosure.

FIG. 4 illustrates an example switch matrix 106, according to certain embodiments of this disclosure. FIG. 4 provides just one example implementation of switch matrix 106, and this disclosure contemplates switch matrix 106 being implemented in other ways. In certain embodiments, switch matrix 106 is implemented as an N×M non-blocking switch matrix. The variables N and M for characterizing switch matrix 106 as an N×M non-blocking switch matrix might or might not correspond to other uses of the variables N and M throughout this disclosure.

Switch matrix 106 includes input ports 400. Input ports 400 are coupled to optical fibers 134, which couple respective data modulators 104 to switch matrix 106. Additionally, switch matrix 106 receives optical signals 132 at input ports 400 via optical fibers 134. This disclosure contemplates switch matrix 106 including any suitable number of input ports 400. In certain embodiments, switch matrix 106 includes at least as many input ports 400 as optical fibers 134. In certain embodiments, switch matrix includes at least one additional input port 400 for receiving a reference signal, such as combined optical reference signal 128 (or possibly a non-combined reference signal in the case of a single-band implementation).

Switch matrix 106 includes output ports 402. Output ports 402 are coupled to optical fibers 136, which are arranged in optical fiber array 108. Additionally, switch matrix 106 directs optical signals 138 to optical fibers 138 via output ports 402. This disclosure contemplates switch matrix 106 including any suitable number of output ports 402. In certain embodiments, switch matrix 106 includes at least as many output ports 402 as optical fibers 136 (plus one potentially to which to direct a reference signal, such as combined optical reference signal 128).

Switch matrix 106 includes mirrors 404 for directing optical signals from input ports 400 to output ports 402. In certain embodiments, mirrors 404 are arranged in one or more mirror arrays. In certain embodiments, based on control signal 142 received from controller 140, mirrors 404 of switch matrix 106 may be adjusted to direct optical signals 132 received on optical fibers 134 via input ports 400 (and possibly combine signals 132 received on different optical fibers 134 via different input ports 400) to one or more appropriate optical fibers 136 via output ports 402 corresponding to those optical fibers 136.

Although switch matrix 106 is described as including mirrors 404 for directing optical signals from input ports 400 to output ports 402, this disclosure contemplates switch matrix 106 including additional and/or different components for directing optical signals from input ports 400 to output ports 402. For example, switch matrix may include optical fibers or optical waveguides that route optical signals from input ports 400 to appropriate output ports 402 (e.g., based on control signal 142).

As described above with reference to FIGS. 1A-1B, controller 140 may be a part of or separate from switch matrix 106. Thus, in certain embodiments, switch matrix 106 may further include controller 140 and control signal 142 may be generated by controller 140 internally to switch matrix 106. Although a signal control signal 142 is described, this disclosure contemplates controller 140 generating (and switch matrix 106 receiving) a suitable number of control signals 142, potentially simultaneously. The multiple control signals may allow switch matrix 106 to direct multiple input signals (e.g., optical signals 132) simultaneously. Additionally or alternatively, a single control signal 142 may include instructions for directing multiple input signals (e.g., optical signals 132).

In certain embodiments, the optical signals 132 received by switch matrix 106 can be destined for multiple users and multiple bands (and, as described with reference to FIGS. 7A-7B, potentially multiple users in multiple different sectors). Switch matrix 106 can route those optical signals 132 (or combinations of those optical signals 132) to any output port 402 of switch matrix 106, allowing different optical signals 132 (potentially destined for different bands and different users) to be independently and simultaneously routed to any output port 402 (and thereby to the associated optical fiber 136 coupled to the output port 402). Switch matrix 106 may combine optical signals 132 (e.g., by combining light) from different input ports 400.

Figure 5:
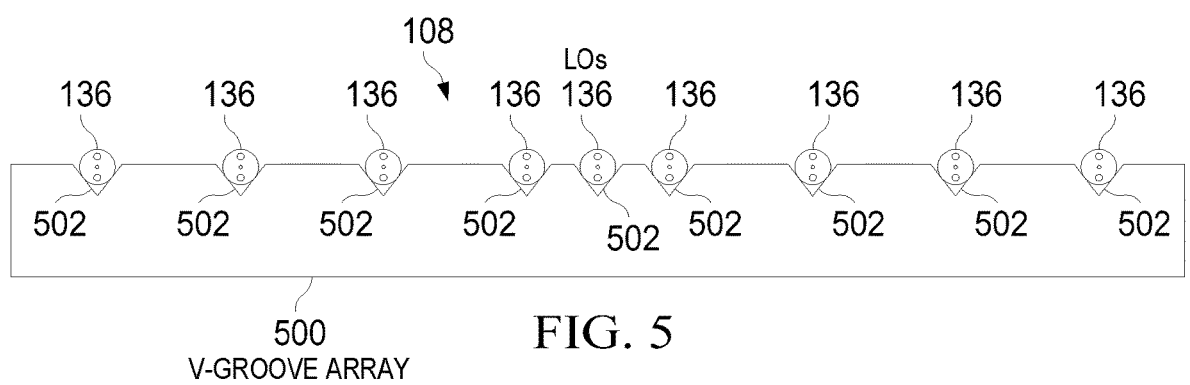
FIG. 5 illustrates an example optical fiber array, according to certain embodiments of this disclosure.

FIG. 5 illustrates an example optical fiber array 108, according to certain embodiments of this disclosure. Although described with reference to optical fiber array 108 of FIGS. 1A-1B, optical fiber array 112 of FIGS. 1A-1B could be implemented in a similar way. FIG. 5 provides just one example implementation of optical fiber array 108, and this disclosure contemplates optical fiber array 108 being implemented in other ways.

In certain embodiments, optical fiber array 108 is implemented using a V-groove array assembly 500 that includes slots 502. Slots 502 appear as v-shaped grooves in the illustrated example. Slots 502 are adapted to receive and collectively organize optical fibers 136 of optical fiber array 108. Thus, optical fibers 136 of optical fiber array 108 are positioned in slots 502.

In certain embodiments, at least one of optical fibers 136 provides optical reference signal 128. In the illustrated example, a central optical fiber 136 (marked with the label "LO") provides optical reference signal 128. Although a central optical fiber 136 is illustrated as providing optical reference signal 128, this disclosure contemplates any optical fiber 136 providing optical reference signal 128, according to particular implementations. In an embodiment for implementing optical fiber array 112, a slot 502 for an optical fiber 152 for carrying an optical reference signal might be omitted.

Figure 6A:
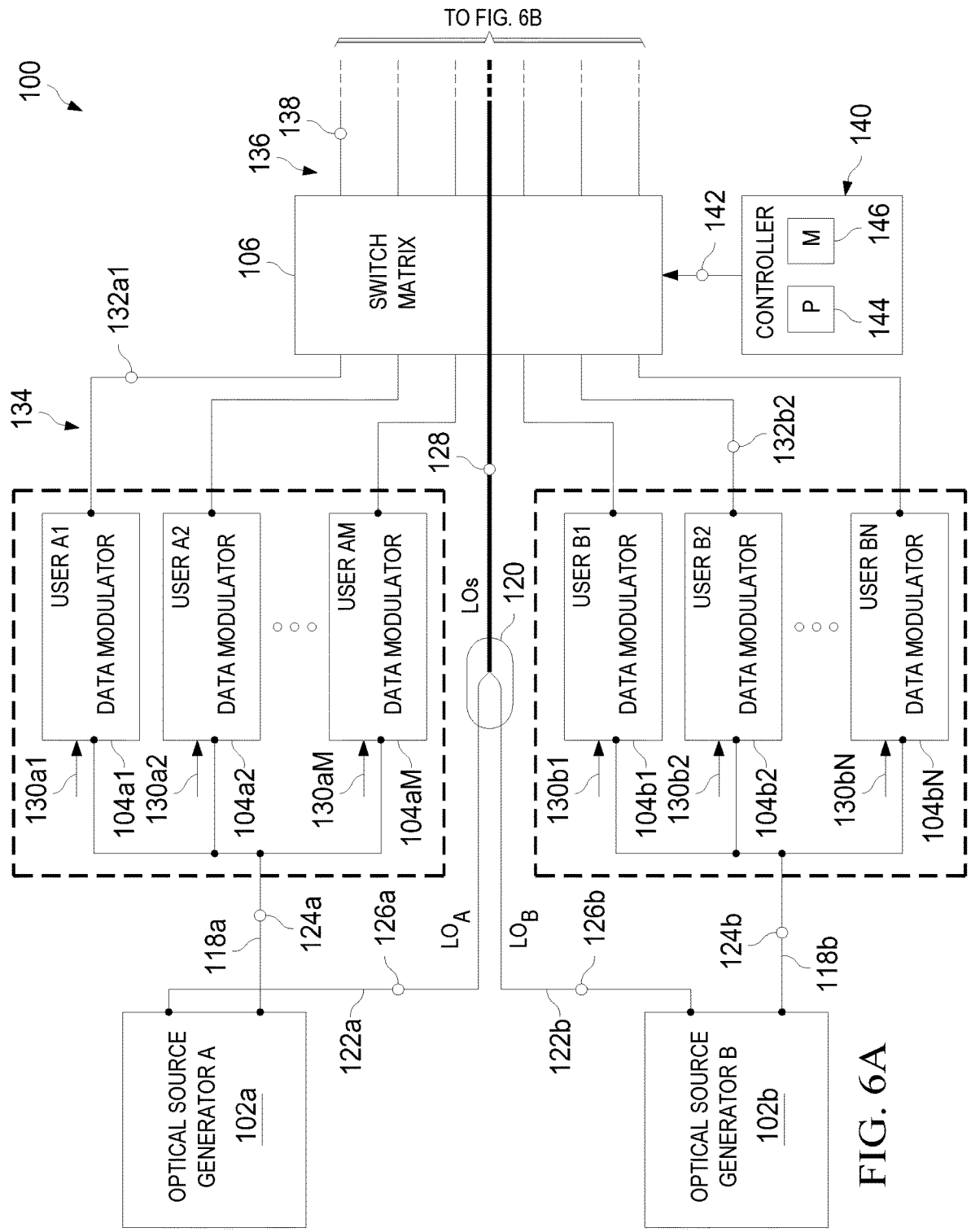
FIGS. 6A-6B illustrate an example system that incorporates the example details of FIGS. 2-5, according to certain embodiments of this disclosure.
Figure 6B:
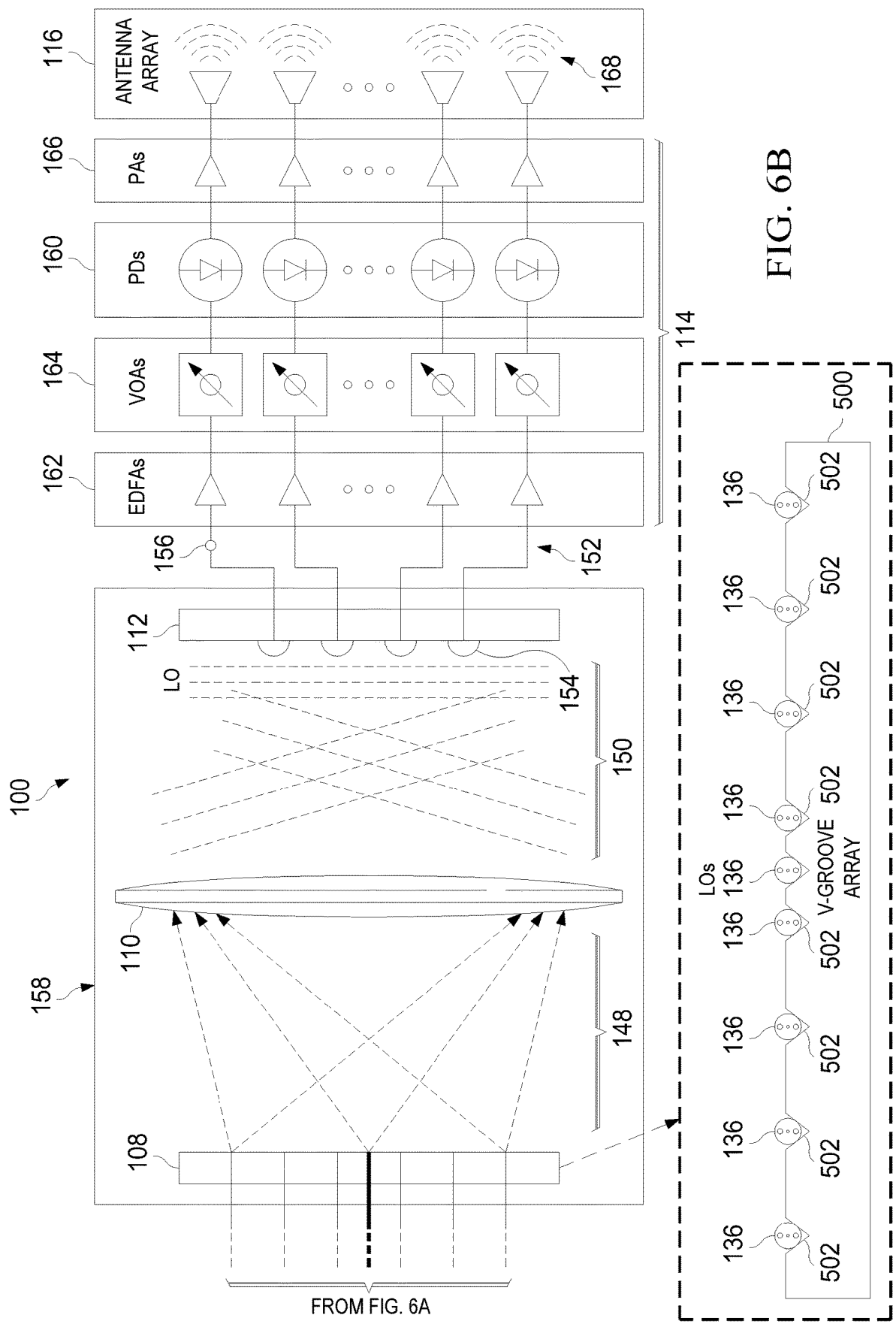

FIGS. 6A-6B illustrate an example system 100 that incorporates the example details of FIGS. 2-5, according to certain embodiments of this disclosure. FIGS. 6A-6B are included to provide a more detailed view of an embodiment that includes the example details of FIGS. 1-5. The details of the components of FIGS. 6A-6B and example operation of those components is described in detail with respect to at least FIGS. 1-5 and will not be reproduced for FIGS. 6A-6B. Those details are incorporated by reference into the description of FIGS. 6A-6B.

Figure 7A:
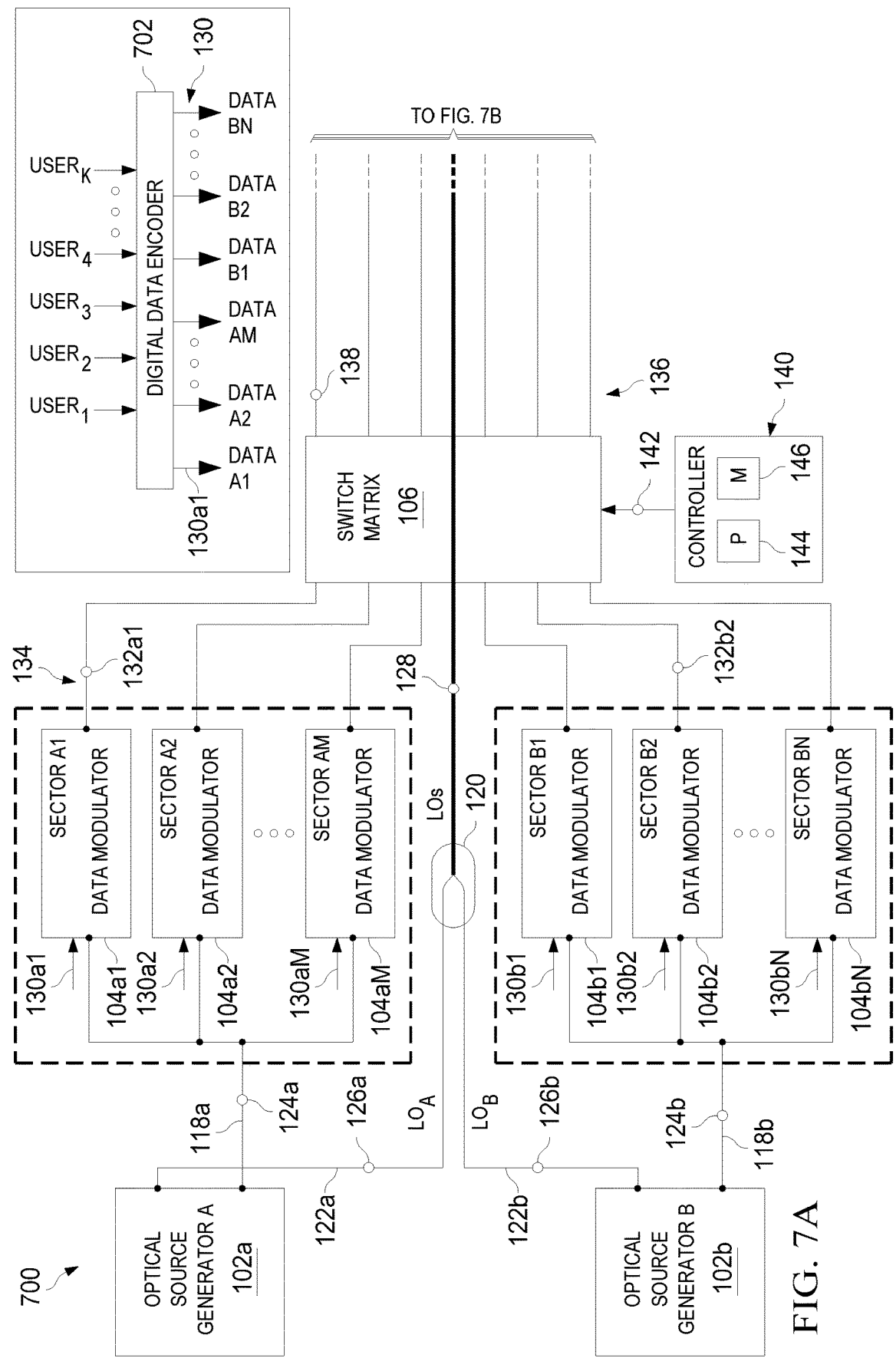

FIGS. 7A-7B illustrate an example embodiment of system 700 for transmitting signals using an optical lens as a beamformer, according to certain embodiments of this disclosure. In the illustrated example, system 700 is generally analogous to system 100 illustrated in FIGS. 1 and 6; however, system 700 includes a digital data encoder 702, which, in certain embodiments, introduces additional capabilities to system 700, as will be described below.

Digital data encoder 702 is configured to receive data for multiple users and encode that data into data streams that are provided to data modulators 104 as input data 130. The data streams generated by digital data encoder 702 may include data for one or more users. Digital data encoder 702 may receive data for each of multiple users and encode the data for the multiple users into a single data stream, which may be provided as input data 130 to an appropriate data modulator 104. For example, digital data encoder 702 may receive data for each of multiple users (for two or more of User1 through UserK) and encode the data for the multiple users into a single data stream, which may be provided as input data 130$a$1 to data modulator 104$a$1. Since input data 130 may include data for multiple users in a sector, data modulator 104 (which receives input data 130) may process data for multiple users in a sector, potentially simultaneously. Furthermore, since input data 130 may include data associated with multiple users, the optical signal 132 (generated by data modulator 104 from input data 130) output by the data modulator 104 and ultimately received by switch matrix 106 may include data for multiple users. Thus, because optical signals 132 may include data for multiple users in a sector in the system 700, inclusion of digital data encoder 702 may allow system 700 to process signals for multiple users per sector, potentially simultaneously.

Digital data encoder 702 may be positioned to provide input data 130 to appropriate data modulators 104. In the illustrated example, the input data 130 output from digital data encoder 702 correspond to input data 130 for particular data modulators 104. For example, the input data 130 output from digital data encoder 702 are marked Data A1 (which correspond to input data 130$a$1 of data modulator 104$a$1), Data A2 (which correspond to input data 130$a$2 of data modulator 104$a$2), Data AM (which correspond to input data 130$a$M of data modulator 104$a$M), Data B1 (which correspond to input data 130$b$1 of data modulator 104$b$1), Data B2 (which correspond to input data 130$b$2 of data modulator 104$b$2), and Data BN (which correspond to input data 130$b$N of data modulator 104$b$N).

Figure 8A:
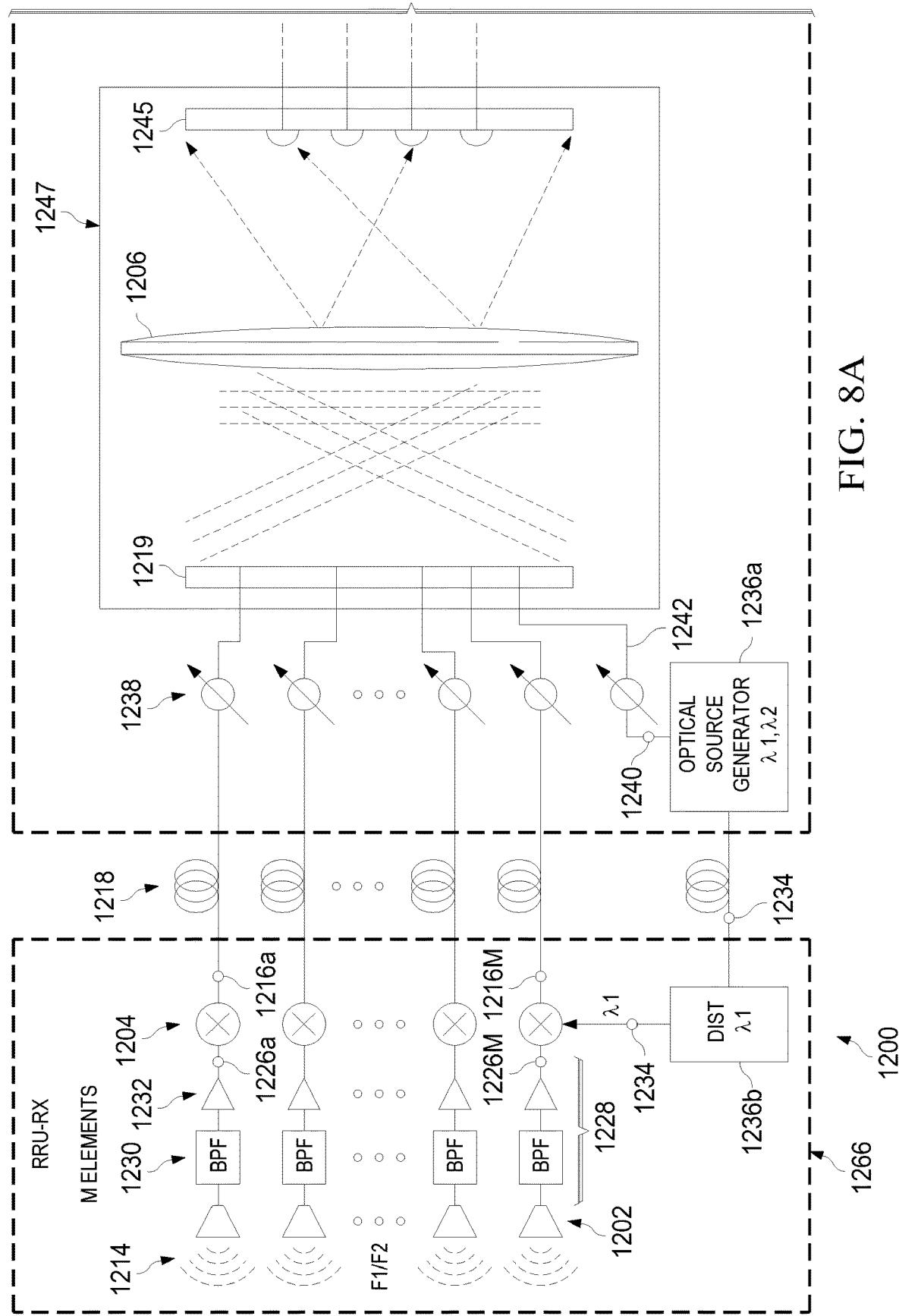
Figure 8B:
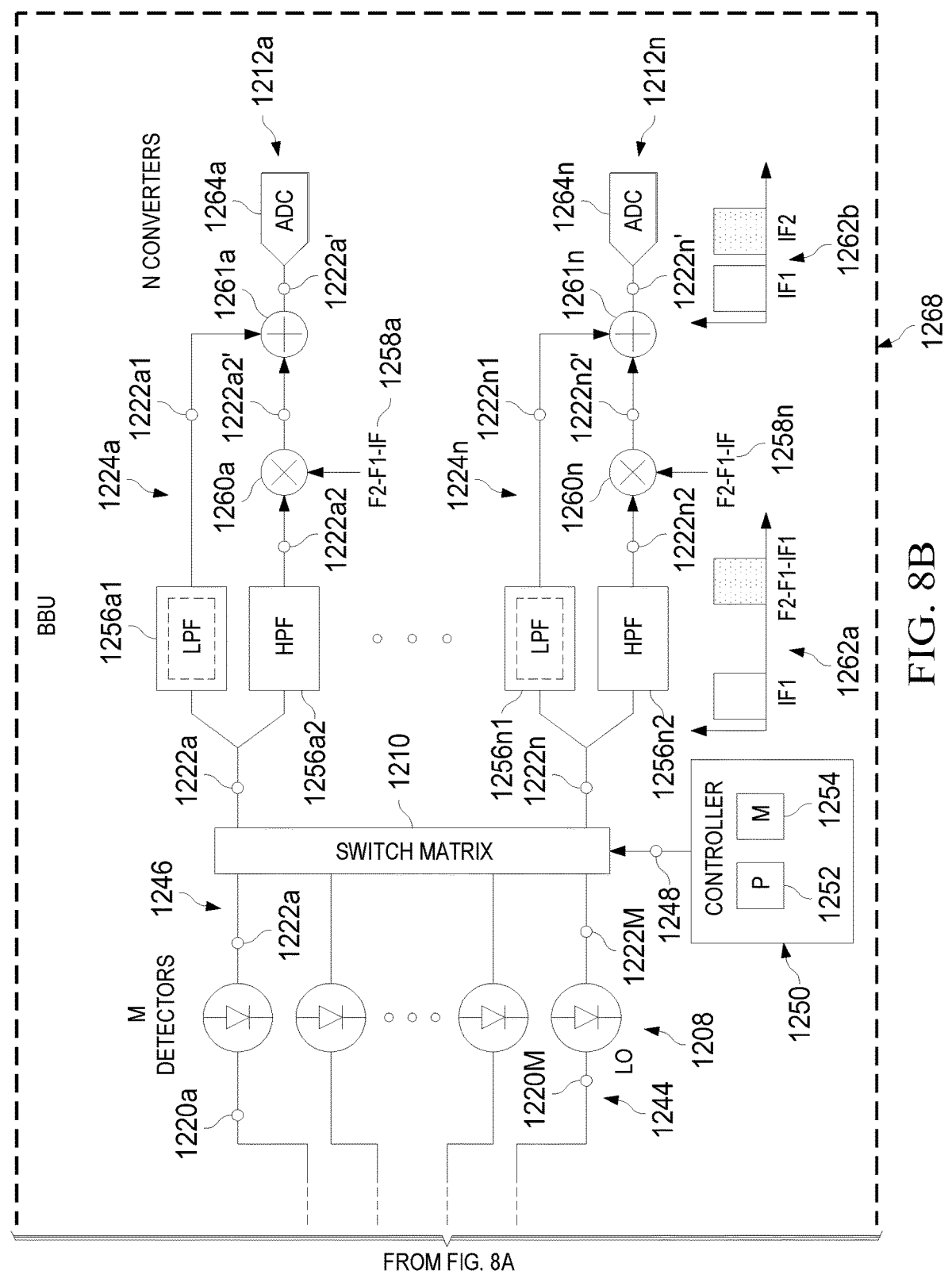

FIGS. 8A-8B illustrate an example receiver system 1200, according to certain embodiments of this disclosure. In the illustrated example, receiver system 1200 includes antenna array 1202, modulators 1204, lens 1206, signal conversion circuits 1208, switch matrix 1210, and multiple signal conversion paths 1212$a$ through 1212$n$.

In general, modulators 1204 are configured to convert a transmission signal 1214 received at antennas of antenna array 1202 to optical signals 1216 that are transported by optical fibers 1218 to lens 1206. In one example, an optical signal 1216 includes a first signal portion in a first frequency band and a second signal portion in a second frequency band. Lens 1206 converts optical signals 1216 from a first format to a second format, and the optical signals 1220 in the second format are received by one or more signal conversion circuits (e.g., photodiodes) 1208, which convert the optical signals 1220 into respective electrical signals 1222.

Switch matrix 1210 receives, at an input port, a first electrical signal 1222, which was generated from an optical signal 1220 that corresponds to the transmission signal 1214 received at the antennas of antenna array 1202. In one example, the transmission signal 1214 corresponds to a first transmission spatial sector of antenna array 1202. In one example, the first electrical signal 1222 includes a first signal portion in a first frequency band and a second signal portion in a second frequency band. Switch matrix 1210 directs, via an output port and in accordance with a control signal, the first electrical signal 1222 to a first signal conversion path 1212.

Frequency band isolation circuitry 1224 in the first signal conversion path 1212 separates the first electrical signal 1222 into the first signal portion in the first frequency band and the second signal portion in the second frequency band, modulates a reference signal with the second signal portion to generate a frequency-shifted second signal portion, and combines the first signal portion and the frequency-shifted second signal portion to generate a modified first electrical signal that corresponds to the transmission signal 1214 received at the antennas of antenna array 1202.

Example features of receiver system 1200 are described in greater detail below.

Antenna array 1202 includes multiple antennas, and the antennas of antenna array 1202 are adapted to receive transmission signals 1214. In certain embodiments, antenna array 1202 is part of a MIMO antenna system or massive MIMO antenna system. This disclosure contemplates antenna array 1202 including any suitable number of antennas. In the illustrated example, system 1200 (e.g., antenna array 1202 of system 1200) includes M antennas.

Transmission signals 1214 are wireless signals that include data to be processed in some manner by receiver system 1200 or by another system connected to receiver system 1200. Transmission signals 1214 may be transmitted by a UE, for example, although this disclosure contemplates transmission signals 1214 being transmitted by any suitable device that is capable of transmitting wireless signals. In certain embodiments, transmission signals 1214 are RF signals, although this disclosure contemplates transmission signals 1214 having other suitable frequencies.

A transmission signal 1214 may include information corresponding to a single user or multiple users, a single transmission spatial sector or multiple transmission spatial sectors, and a single frequency band or multiple frequency bands (e.g., F1 being the transmission frequency for band 1 and F2 being the transmission frequency for band 2). As an example, a first particular transmission signal 1214 may correspond to a single user in a single transmission spatial sector and at a single frequency band. As another example, a second particular transmission signal 1214 may correspond to multiple users in a single transmission spatial sector, each user corresponding to a different frequency band. As another example, a third particular transmission signal 1214 may correspond to multiple users, with each user in a different transmission spatial sector and transmitting in a same or different frequency band. Transmission signals 1214 (or portions of a single transmission signal 1214) that correspond to different transmission spatial sectors are received by antenna array 1202 at different angles.

A transmission signal 1214 that is received by antenna array 1202 may be received by multiple antennas of antenna array 1202, including potentially all antennas of antenna array 1202. Thus, each antenna of antenna array 1202 may receive transmission signal 1214, although the version of transmission signal 1214 received by each antenna may differ in certain respects (e.g., differ in phase).

For each antenna of antenna array 1202, transmission signals 1214 may be transported as electrical signals 1226 via electrical signaling links 1228, which can include any suitable transport mechanism for transporting electrical signals. In certain embodiments, system 1200 includes a same quantity of electrical signaling links 1228 as antennas of antenna array 1202 (e.g., in the illustrated example, M electrical signaling links 1228). A particular transmission signal 1214 may be received by multiple (and potentially all) antennas of antenna array 1202, and a resulting electrical signal 1226 for each of the receiving antennas may be transported by the electrical signaling link 1228 that corresponds to the receiving antenna. Thus, multiple electrical signaling links 1228 may carry electrical signals 1226 that correspond to the particular transmission signal 1214 received by the multiple (and potentially all) antennas of antenna array 1202.

In certain embodiment, prior to modulators 1204 using electrical signals 1226 for modulation, electrical signals 1226 may be filtered (e.g., using one or more bandpass filters 1230) and amplified (e.g., using one or more amplifiers 1232). Bandpass filters 1230 may be used to reduce or eliminate unwanted portions of transmission signals 1214, and amplifiers 1232 may boost electrical signals 1226 for processing in system 1200.

Modulators 1204 convert electrical signals 1226 into optical signals 1216. For example, modulators 1204 modulate an optical source signal 1234 having a first wavelength (shown as $\lambda 1$) with electrical signals 1226 to generate optical signals 1216, each corresponding to a respective antenna of antenna array 1202. Each modulator 1204 corresponds to a respective antenna of antenna array 1202, and modulates optical source signal 1234 with the version of transmission signal 1214 (as reflected in electrical signal 1226) that is received by the antenna corresponding to that modulator 1204. Optical source signal 1234 may be provided by a distributed portion of optical source generator 1236a, shown as distributed element 1236b. Optical source generator 1236a is described in greater detail below. The modulation performed by modulators 1204 may be an analog modulation. In certain embodiments, modulators 1204 are electro-optic phase modulators. This disclosure, however, contemplates modulators 1204 being implemented in any suitable manner.

Optical signals 1216 may be transported to optical lens 1206 via optical fibers 1218. In certain embodiments, a quantity of optical fibers 1218 is at least the same as a quantity of electrical signaling links 1228 (e.g., M). An additional optical fiber 1218 may be used to transport optical source signal 1234 from optical source generator 1236a to distributed element 1236b. In certain embodiments, some or all of optical fibers 1218 are arranged in an optical fiber array 1219, which may be implemented as a V-groove array assembly for example.

Optical fibers 1218 emit optical signals 1216 into the free space between optical fiber array 1219 and optical lens 1206, in the direction of optical lens 1206. In certain embodiments, phase shifters 1238 may process optical signals 1216 prior to optical signals 1216 being emitted by optical fibers 1218. Phase shifters 1238 may be used to address possible issues that may arise due to transmission of optical signals 1216 via optical fibers 1218, which may help to ensure the integrity of optical signals 1216.

Optical source signal 1234 and optical reference signal 1240 may be generated by optical source generator 1236a. Optical source generator 1236a may be similar to optical source generators 102, described above with reference to FIGS. 1 and 2 for example. In certain embodiments, optical source signal 1234 and optical reference signal 1240 are phase locked to one another.

In a distributed implementation of receiver 1200, optical source generator 1236a may provide optical source signal 1234 to distributed element 1236b via an optical fiber 1218, with distributed element 1236b then providing optical source signal 1234 to modulators 1204. In an embodiment in which optical source generator 1236a is co-located with modulators 1204, optical source generator 1236a may provide optical source signal 1234 directly to modulators 1204.

Optical lens 1206 receives optical signals 1216 transported via optical fibers 1218 and emitted by optical fibers 1218. Optical lens 1206 also may receive optical reference signal 1240 transported via and emitted by optical fiber 1242. If appropriate, a phase shifter 1238 may process optical reference signal 1240 prior to optical reference signal 1240 being received by optical lens 1206.

As optical signals 1216 are emitted from optical fibers 1218 toward optical lens 1206, optical signals 1216 have a first wave format, which may be similar to second wave format 150 described above with reference to FIG. 1. In certain embodiments, the first wave format in which optical signals 1216 are emitted from optical fibers 1218 is a plane wave format, although this disclosure contemplates optical signals 1216 emitted from optical fibers 1218 having any suitable format, according to particular implementations.

Optical lens 1206 may operate similarly to optical lens 110, described above with reference to FIGS. 1A-1B. That is, optical lens 1206 transforms optical signals from one wave format to another wave format. In certain embodiments, the transformation performed by optical lens 1206 is a Fourier transform in the optical domain. In this example, optical lens 1206 transforms optical signals 1216 from a first wave format (e.g., from a plane wave format) to a second wave format. In certain embodiments, the second wave format into which the emitted optical signals 1216 are transformed is a spherical wave format, although this disclosure contemplates optical lens 1206 transforming optical signals 1216 from the first wave format to any suitable second wave format, according to particular implementations.

Regarding optical reference signal 1240, as optical reference signal 1240 is emitted from optical fiber 1242 in the free space between optical fiber array 1219 and optical lens 1206, in the direction of optical lens 1206, optical reference signal 1240 may have the second wave format. That is, as optical reference signal 1240 has a spherical wave format, for example, in the free space between optical fiber array 1219 and optical lens 1206. In the illustrated example, optical reference signal 1240 in the second wave format is shown as diverging dashed lines in the space between optical fiber array 1219 and lens 1206 and originating at optical fiber 1242. Although the second wave format is primarily described as a spherical wave format, this disclosure contemplates optical reference signal 1240 emitted from optical fiber 1242 having any suitable format, according to particular implementations.

Optical lens 1206 also may transform optical reference signal 1240 from one wave format to another wave format. For example, optical lens 1206 may transform optical reference signal 1240 from the second wave format (e.g., a spherical wave format) to the first wave format (e.g., a plane wave format). In the illustrated example, optical reference signal 1240 in the first wave format is shown as vertical lines labeled LO to the right of optical lens 1206.

In certain embodiments, optical reference signal 1240 in the second wave format (e.g., as emitted from optical fiber 1242 in the direction of optical lens 1206) originates at the focal plane of optical lens 1206. That is, the position of optical fiber 1242 may be such that optical reference signal 1240 is emitted in the second wave format from optical fiber 1242 placed at approximately the focal plane of optical lens 1206. Positioning optical fiber 1242 at approximately the focal plane of optical lens 1206 may allow multiple (and possibly all) optical fibers 1244 (and their associated signal conversion circuits 1208) to receive the optical reference signal 1240 in the first wave format, after conversion of optical reference signal 1240 by lens 1206 from the second wave format to the first wave format.

After transformation by optical lens 1206, optical signals 1216 and optical reference signal 1240 may be received as optical signals 1220 by optical fibers 1244. In certain embodiments, some or all of optical fibers 1244 are arranged in an optical fiber array 1245, which may be implemented as a V-groove array assembly for example. Each of signals 1220 may include a combination (e.g., a linear combination) of optical signals 1216. Furthermore, each of signals 1220 may include optical reference signal 1240. Each transmission signal 1214 is distributed among electrical signals 1226 and, consequently, among optical signals 1216, such that each of signals 1220 corresponds to the respective transmission signal(s) 1214 received by the multiple antennas of antenna array 1202.

Taking the example in which the first wave format is a plane wave format and the second wave format is a spherical wave format, each optical plane wave emitted by optical fiber array 1219 corresponds to a respective RF plane wave carrying one of transmission signals 1214. A result of the transformation of optical signals 1216 from the first wave format to the second wave format by lens 1206 is a set of spherical converging waves that correspond to the transmission signal 1214 received by antennas of antenna array 1202 and represented by optical signals 1216. Each of the spherical converging waves converges on a respective optical fiber 1244. Furthermore, optical reference signal 1240 (e.g., the local oscillator signal, or LO), as transformed into the first wave format (e.g., the plane wave format), may be substantially evenly distributed in phase across optical fibers 1244.

This disclosure contemplates any suitable tuning and/or amplification of optical signals 1216 prior to their conversion to the second wave format, or after their conversion to the second wave format where they are captured as optical signals 1220 by optical fibers 1244 of optical fiber array 1245, and before the receipt of optical signals 1220 by signal conversion circuits 1228.

Certain embodiments include feedback signals for controlling and reducing drift in the phases of optical signals 1216 received on optical fibers 1218. Such drift can depend on thermal gradient, acoustic interference, mechanical vibration or other factors. An example of a feedback loop that may be implemented in certain embodiments of the this disclosure is described in U.S. Pat. No. 7,965,435.

Optical fiber array 1219, lens 1206, and optical fiber array 1245 may be referred to collectively as optical wave transformation module 1247. In certain embodiments, optical wave transformation module 1247 is a chamber or other enclosure, which provides an environment that facilitates emission of optical signals from optical fiber array 1219, transformation of optical signals from one wave format to another wave format (e.g., by lens 1206), and receipt of optical signals based on the wave format (that results from the transformation by lens 1206) by optical fibers 1244 of optical fiber array 1245.

Although system 1200 is described as including optical lens 1206 to transform optical signals 1216 from the first wave format to the second wave format, this disclosure contemplates system 1200 transforming optical signals 1216 and optical reference signal 1240 from the one wave format to the another wave format in any suitable manner, according to particular implementations.

Optical fibers 1244 transport optical signals 1220 to signal conversion circuits 1208. Signal conversion circuits 1208 receive optical signals 1220 via optical fibers 1244. Signal conversion circuits 1208 are configured to transform optical signals 1220 into electrical signals (e.g., electrical signals 1222 on electrical signaling links 1246). In certain embodiments, signal conversion circuits 1208 are photodiodes.

In the illustrated example, each signal conversion circuit 1208 is positioned on a respective optical fiber 1244 and thus receives the optical signal 1220 received by that optical fiber 1244. System 1200 may include any suitable number of signal conversion circuits 1208. As just one example, the number of signal conversion circuits 1208 (e.g., photodiodes) corresponds to the resolution of the angles of arrival that are detectable by receiver system 1200. In certain embodiments, the number of signal conversion circuits 1208 exceeds the number of resolvable angular sectors to provide for redundancy.

In certain embodiments, although a particular signal conversion circuit 1208 corresponds to the angle of arrival of the transmission signal(s) 1214, more than one signal conversion circuit 1208 may receive portions (e.g., be illuminated by) of optical signals 1216 in the second wave format. Even in such a scenario, the appropriate signal conversion circuit 1208 that actually corresponds to the angle of the plane waves generated by optical signals 1216 in the second wave format should receive a stronger signal. In certain embodiments, as described in greater detail below, switch matrix 1210 may implement thresholding to identify the appropriate signal 1222 from the appropriate signal conversion circuit 1208.

Signal conversion circuits 1208 output electrical signals 1222 on electrical signaling links 1246 and provide those electrical signals 1222 to switch matrix 1210.

Switch matrix 1210 is an electrical switch that includes a number of input ports and a number of output ports. Switch matrix 1210 receives electrical signals 1222 at input ports and directs, via output ports, those electrical signals 1222 to signal conversion paths 1212. For example, switch matrix 1210 may receive, at a first input port, a first electrical signal 1222. The first electrical signal 1222 corresponds to a transmission signal 1214 received at the antennas of antenna array 1202. The transmission signal 1214 corresponding to first electrical signal 1222 may correspond to a first transmission spatial sector of antenna array 1202. In certain embodiments, electrical signal 1222 includes data for a single frequency band. In another embodiment, electrical signal 1222 includes signal portions for multiple frequency bands (e.g., a first signal portion in a first frequency band and a second signal portion in a second frequency band). Switch matrix 1210 may direct, via a first output port, the first electrical signal 1222 to a first signal conversion path 1212a of a plurality of signal conversion paths 1212a through 1212n.

In certain embodiments, switch matrix 1210 directs an electrical signal 1222 received at an input port to a particular output port based on a control signal 1248 received from a controller 1250. Controller 1250 is configured to provide a control signal 1248 to switch matrix 1210. Although controller 1250 is illustrated separately from switch matrix 1210, this disclosure contemplates controller 1250 being part of or separate from switch matrix 1210, according to particular implementations.

Control signal 1248 instructs switch matrix 1210 as to which output port of switch matrix 1210 (and thereby which signal conversion path 1212) an electrical signal 1222 received on an input port of switch matrix 1210 should be directed. The instruction provided by control signal 1248 may be based on any suitable information. In certain embodiments, controller 1250 has access to information related to which signal conversion path 1212 is available to process electrical signal 1222.

Controller 1250 may include a processor 1252 and a memory 1254.

Processor 1252 includes any combination of hardware, firmware, and software that operates to control and process information. Processor 1252 may be a programmable logic device, a central processing unit, a microcontroller, a microprocessor, a digital signal processor, a field programmable gate array, an application specific integrated circuit, any processing device, or any combination of the preceding. Processor 1252 may be configured to read and process instructions stored in memory 1254. Although illustrated as a single functional unit, this disclosure contemplates system 1200 including any suitable number of processors.

Memory 1254 stores, either permanently or temporarily, data, operational instructions (e.g., software), or other information for access and/or execution by processor 1252. Memory 1254 includes any one or a combination of volatile or non-volatile local or remote devices for storing information. For example, memory 1254 may include static or dynamic RAM, ROM, magnetic storage devices, optical storage devices, hard disks, SIM cards, memory sticks, SD memory cards, or any other information storage device or a combination of these devices. In certain embodiments, at least a portion of memory 1254 is non-transitory. Although a single memory 1254 is illustrated, system 1200 may include any number of memories 1254. Among other potential data, memory 1254 stores programming for execution by the processor 1254 to cause processor 1254 to perform operations associated with switch matrix 1210.

In certain embodiments, switch matrix 1210 implements thresholding to identify signals 1222 from signal conversion circuits 1208 to be directed to a signal conversion path 1212. In such embodiments, for the received electrical signals 1222, switch matrix 1210 may compare a signal strength of a received electrical signal 1222 (from a particular signal conversion circuit 1208 (e.g., photodiode)) to a signal threshold, and direct, via an output port of switch matrix 1210, the received electrical signal 1222 to a signal conversion path 1212 based at least in part in response to the signal strength of the received electrical signal 1222 exceeding the signal threshold. In other words, in certain embodiments, switch matrix 1210 may pass electrical signals 1222 to signal conversion paths 1212 if those electrical signals 1222 meet or exceed the signal threshold. The signal threshold may be based on any suitable factors, such as signal strength.

Each signal conversion path 1212a includes frequency band isolation circuitry 1224. In general, frequency band isolation circuitry 1224 is able to separate the portions of an electrical signal 1222 for each band reflected in electrical signal 1222. An electrical signal 1222 that includes signal portions for different frequency bands may include data for different users in a same transmission spatial sector of antenna array 1202. For example, the signal portion for the first frequency band may be associated with a first user in a first transmission spatial sector of antenna array 1202, and the signal portion for the second frequency band may be associated with a second user in a first transmission spatial sector of antenna array 1202.

In certain embodiments, the frequency band isolation circuitry 1224 in a particular signal conversion path 1212 is configured to separate a received electrical signal 1222 into a first signal portion 1222a1 in the first frequency band and a second signal portion 1222a2 in a second frequency band. For example, frequency band isolation circuitry 1224 may include a first filter 1256a1 (shown as a low pass filter (LPF)) configured to separate first signal portion 1222a1 in the first frequency band from the received electrical signal 1222 and a second filter 1256a2 (shown as a high pass filter (HPF)) configured to separate the second signal portion 1222a2 in the second frequency band from the received electrical signal 1222.

Frequency band isolation circuitry 1224 may modulate a reference signal 1258a with one of the signal portions of electrical signal 1222 (in this example, second signal portion 1222a2) to generate a frequency-shifted second signal portion 1222a2'. For example, frequency band isolation circuitry 1224 may include a modulator 1260 that modulates reference signal 1258a with one of the signal portions of electrical signal 1222 (in this example, second signal portion 1222a2) to generate a frequency-shifted second signal portion 1222a2'. In certain embodiments, reference signal 1258a is a local oscillator signal (shown in this example as being F2-F1-IF, where F2 is the transmission frequency of band 2, F1 is the transmission frequency of band 1, and IF is an intermediate frequency for band 1).

Frequency band isolation circuitry 1224 may combine first signal portion 1222a1 and frequency-shifted second signal portion 1222a2' to generate a modified electrical signal 1222' that corresponds to the transmission signal 1214 received at the antennas of antenna array 1202 and from which electrical signal 1222 ultimately was generated. For example, frequency band isolation circuitry 1224 may include a summer 1261 that combines first signal portion 1222a1 and frequency-shifted second signal portion 1222a2' to generate a modified electrical signal 1222' by adding the first signal portion 1222a1 and the frequency-shifted second signal portion 1222a2'.

As shown at 1262a (which provides a representations of the relative frequencies of first signal portion 1222a1 and second signal portion 1222a2 prior to modulation of reference signal 1258a with second signal portion 1222a2) and at 1262b (which provides a representations of the relative frequencies of first signal portion 1222a1 and second signal portion 1222a2 after modulation of reference signal 1258a with second signal portion 1222a2), the modulation of reference signal 1258a with second signal portion 1222a2 moves the relative frequencies of the first and second signal portions closer together in modified electrical signal 1222', which may provide certain benefits, such as reducing the sample rate of the analog-to-digital converters described below.

Although frequency band isolation circuitry 1224 is shown as including a particular number of filters, this disclosure contemplates frequency band isolation circuitry 1224 including any suitable number of filters for separating the portions for each frequency band reflected in electrical signals 1222.

Furthermore, in some instances, a particular electrical signal 1222 might include a signal portion for only one frequency band even though system 1200 is capable of processing electrical signals 1222 that include signal portions for more than one frequency band. In such an instance, frequency band isolation circuitry 1224 may output the signal portion for the frequency band included in the particular electrical signal 1222. For example, a first filter of frequency band isolation circuitry 1222 (the filter corresponding to the frequency band of the signal portion of the particular electrical signal 1222) may output the signal portion, while the other filter(s) of frequency band isolation circuitry 1222 do not output data for the particular electrical signal 1222 of this instance.

Each signal conversion path 1212 includes an analog-to-digital (ADC) converter 1264. Analog-to-digital converter 1264 converts the modified first electrical signal (e.g., modified first electrical signal 1222' for signal analog-to-digital converter 1264a to a digital format.

In certain embodiments, switch matrix 1210 allows receiver 1200 to be implemented with a reduced number of or signal conversion paths 1212 (e.g., with a reduced number of ADCs 1264). For example, switch matrix 1210 can direct all of the electrical signals 1222 for a same user to a same signal conversion path 1212. In an implementation without switch matrix 1210, an ADC 1264 for each signal conversion circuit 1208 may be included. Switch matrix 1210 allows receiver to direct electrical signals 1222a to particular signal conversion paths (e.g., to particular ADCs 1264), which may allow the quantity of ADCs 1264 in receiver 1200 to be reduced. In some situations, reducing the number of ADCs is desirable because ADCs can be expensive and/or because ADCs consume power. In certain embodiments, reducing the number of ADCs may reduce costs for and/or power consumption in receiver 1200.

Thus, in certain embodiments, switch matrix 1210 allows the number of ADCs 1264 to be reduced to a desired number. For example, in certain embodiments, it may be desirable to limit the number of ADCs 1264 to the number of active users to be handled simultaneously by receiver 1200. Thus, in certain embodiments, system 1200 may have a greater number of antennas (in antenna array 1202) and signal conversion circuits 1208 than ADCs 1264.

In a first example scenario, optical signals 1216, as transformed by optical lens 1206 into a set of spherical converging waves in the free space between optical lens 1206 and optical fiber array 1245, may include a first signal portion that corresponds to a portion of transmission signal 1214 that is received by the antennas with a first receive angle (and thereby corresponds to a first transmission spatial sector) and a second signal portion that corresponds to a portion of transmission signal 1214 that is received by the antennas with a second receive angle (and thereby corresponds to a first transmission spatial sector). At least two different optical fibers 1244 (and their corresponding signal conversion circuits 1208) of optical fiber array 1245 acquire optical signals 1220, with one of the at least two signal conversion circuits 1208 adapted to process the signal portion for the first transmission spatial sector and the other of the at least two signal conversion circuits adapted to process the signal portion for the second transmission spatial sector In certain embodiments, system 1200 includes at least two signal conversions paths 1212 (e.g., ADCs 1264) to process the electrical signals 1222 that result from those optical signals 1244 simultaneously.

In another example scenario, a received transmission signal 1214 may include a first signal portion corresponding to a first user in a first frequency band and a second signal portion corresponding to a second user in a second frequency band. In certain embodiments, a single optical signal 1220 will include the signals of both frequency bands. In other words, optical signal 1220 is a multiband signal. A particular optical fiber 1244/signal conversion circuit 1208 acquires optical signal 1220, and the particular signal conversion circuit 1208 generates an electrical signal 1222 that includes the signals of both frequency bands. The frequency band isolation circuitry 1224 of a particular signal conversion path 1212 can separate the signals for each band, which allows each signal conversion path 1212 (and associated ADC 1264) to handle multiband signals.

System 1200 may be implemented in a variety of environments, including but not limited to a base station in a base station or repeater for cellular communications (e.g., 4G, 5G, etc.), PMP backhauling, fixed wireless broadband access, passive electromagnetic sensing, and other suitable communication technologies.

In certain embodiments, the elements of system 1200 may be distributed, such as across multiple geographic locations or otherwise between different functional blocks of system 1200. For example, certain embodiments of system 1200 may be a part of a distributed base station. In such a distributed architecture, a remote radio unit (RRU) (e.g., the radio function unit) 1266 is separated from a baseband unit (BBU) (e.g., the digital function unit) 1268 by a connector, such as optical fibers 1218. As a particular example installation, RRU 1266 can be installed on a tower or building close to antenna array 1202 and BBU 1268 can be installed remotely, such as meters or even miles away and connected to the RRU 1266 by the connector (e.g., optical fibers 1218).

In the illustrated example, certain components are shown as being located in RRU 1266 and certain components are shown as being located in BBU 1268. For example, antenna array 1202 and modulators 1204 are shown as being located at RRU 1266, and optical lens 1206, signal conversion circuits 1208, switch matrix 1210, and the components of signal conversion paths 1212 are shown as being located at BBU 1268. Although this particular division of components is illustrated and described, this disclosure contemplates a different division of components between RRU 1266 and BBU 1268.

In operation of an example embodiment of receiver system 1200, antennas of antenna array 1202 receive transmission signal 1214 (e.g., an RF signal). Each antenna of antenna array 1202 may receive transmission signal 1214, although the version of transmission signal 1214 received by each antenna may differ in certain respects (e.g., differ in phase). For each antenna of antenna array 1202, a received transmission signal 1214 may be transported as an electrical signal 1226.

For purposes of this example, it will be assumed that the received transmission signal 1214 includes data for a first user operating in a first transmission spatial sector of antenna array 1202 and data for a second user operating in the first transmission spatial sector, and that the data for the first user is in a first frequency band and the data for the second user is in a second frequency. In certain embodiments, the received transmission signal 1214 may include data corresponding to a first transmission spatial sector and a second transmission spatial sector. As will be seen below, system 1200 is capable of receiving and processing transmission signals in multiple bands and multiple transmission spatial sectors, substantially simultaneously.

Optical source generator 1236 generates optical source signal 1234 and optical reference signal 1240. In certain embodiments, optical source signal 1234 and optical reference signal 1240 are phase locked to one another. In a distributed implementation of receiver 1200 (or in other implementations, if desired), optical source generator 1236a may provide optical source signal 1234 to distributed element 1236b via an optical fiber 1218, with distributed element 1236b then providing optical source signal 1234 to modulators 1204. In an embodiment in which optical source generator 1236a is co-located with modulators 1204 (or in other implementations, if desired), optical source generator 1236a (which might be implemented without distributed element 1236b in such an embodiment) may provide optical source signal 1234 directly to modulators 1204.

Modulators 1204 modulate optical source signal 1234 with transmission signals 1214 to generate first optical signals 1216. For example, modulators 1204 may receive electrical signals 1226 that are based on the received transmission signal 1214. Modulators 1204 may modulate optical source signal 1234 with those electrical signals 1226a to generate respective first optical signals 1216, each corresponding to an antenna of antenna array 1202. In certain embodiments, processing (e.g., filtering, amplification, or any combination of these or other suitable processing) is performed on transmission signals 1214 (or electrical signals 1226 resulting from transmission signals 1214), prior to modulators 1204 modulating optical signal 1234 with transmission signals 1214 (or electrical signals 1226 resulting from transmission signals 1214) to generate the respective first optical signals 1216.

At this point, each optical signal 1216a through 1216M may include what is essentially an optical representation of the transmission signal 1214 received at the antenna corresponding to the modulator 1204 that generated that optical signal 1216. After modulation, optical fibers 1218 may transport optical signals 1216 toward optical lens 1206 for transformation, as described below.

Optical fibers 1218 of optical fiber array 1219 emit respective first optical signals 1216 having a first wave format (e.g. a plane wave format). For example, as first optical signals 1216 are emitted by respective optical fibers 1218, first optical signals 1216 may have the first wave format in the free space between optical fiber array 1219 and optical lens 1206. In certain embodiments, optical fibers 1218 correspond to respective antennas of antenna array 1202. An optical fiber 1218 of optical fiber array 1219 emits optical reference signal 1240 with a second wave format (e.g. a spherical wave format). For example, as optical reference signal 1240 is emitted by optical fiber 1218, optical reference signal 1240 may have the second wave format in the free space between optical fiber array 1219 and optical lens 1206.

Optical lens 1206 transforms first optical signals 1216 from the first wave format (e.g., a plane wave format) to a second wave format (e.g., a spherical wave format). For example, as first optical signals 1216 pass through optical lens 1206, optical lens 1206 may transform first optical signals 1216 from a plane wave format to a set of spherical converging waves that correspond to the transmission signal 1214 received by antennas of antenna array 1202 and represented by optical signals 1216. The spherical converging waves converge on at least one optical fiber 1244, as described below. Optical lens 1206 transforms optical reference signal 1240 (e.g., the local oscillator signal, or LO) from the second wave format (e.g., a spherical wave format) to the first wave format (e.g., a plane wave format). For example, as optical reference signal 1240 passes through optical lens 1206, optical lens 1206 may transform optical reference signal 1240 from a spherical wave format to a plane wave format.

A particular optical fiber 1244 of optical fiber array 1245 receives a second optical signal 1220 (e.g., optical signal 1220a). Second optical signal 1220 is based at least in part on first optical signals 1216, as transformed into the second wave format (e.g., the converging spherical waves) by optical lens 1206 and acquired from the free space between optical lens 1206 and optical fiber array 1245 by the particular optical fiber 1244. For example, optical lens 1206 transforming optical signals 1216 from the first wave format (e.g., a plane wave format) to the second wave format (e.g., a spherical wave format) may focus optical signals 1216 in the second wave format to the particular optical fiber 1244 for receipt by a particular signal transformation circuit 1208 (e.g., a particular photodetector).

As described above, each signal conversion circuit 1208 may correspond to a particular transmission spatial sector, which may correspond to a particular angle of arrival of possible for transmission signals 1214. Thus, in the above-described example in which the transformation performed by optical lens 1206 focuses optical signals 1216 in the second wave format to a particular optical fiber 1244 (which is coupled to a particular signal transformation circuit 1208), the received optical signals 1216 (and second optical signal 1220) may have been generated from a transmission signal 1214 in a single transmission spatial sector (and have a single angle of arrival).

Additionally or alternatively, a transmission signal 1214 may correspond to multiple transmission spatial sectors, and the received optical signals 1216 (and second optical signal 1220) generated from that transmission signal 1214 may include information for multiple transmission spatial sectors (and have multiple angles of arrival). In such a scenario, the transformation performed by optical lens 1206 focuses optical signals 1216 in the second wave format to multiple optical fibers 1244, which are coupled to respective signal transformation circuits 1208. In particular, the transformation performed by optical lens 1206 focuses optical signals 1216 in the second wave format to those optical fibers 1244 that correspond to the signal conversion circuits for the multiple transmission spatial sectors associated with the received transmission signal 1214. Thus, receiver 1200 also may be used to process multisector transmission signals 1214.

Additionally or alternatively, regardless of whether an optical signal 1216 represents a transmission signal 1214 for a single transmission spatial sector or multiple transmission spatial sectors, it is possible that some optical fibers 1244 (and associated signal conversion circuits 1208) other than those that correspond to the transmission spatial sector or sectors of the received transmission signal 1214 may acquire a second optical signal 1220 that is based on some portion of optical signal 1216 in the second wave format. These second optical signals 1220 acquired by optical fibers 1244 (and associated signal conversion circuits 1208) other than those that correspond to the transmission spatial sector or sectors of the received transmission signal 1214 may be considered "spillage," which can be ignored by applying some thresholding (e.g., in switch matrix 1210 for example).

Second optical signal 1220 also is based on reference signal 1240, as transformed into the first wave format (e.g., the plane wave format) by optical lens 1206 and acquired from the free space between optical lens 1206 and optical fiber array 1245 by the particular optical fiber 1244. In certain embodiments, optical reference signal 1240, as transformed into the first wave format (e.g., the plane wave format), may be substantially evenly distributed in phase across some or all optical fibers 1244 of optical fiber array 1245.

A signal conversion circuit 1208 corresponding to the particular optical fiber 1244 receives the second optical signal 1220 via the particular optical fiber 1244. For the remainder of the description of this example operation of receiver 1200, for ease of reference it will be assumed that the top-most optical fiber 1244 is the particular optical fiber 1244 that receives a second optical signal 1220 (optical signal 1220*a* in the illustrated example) and that the signal conversion circuit 1208 that receives optical signal 1220*a* is the top-most signal conversion circuit. If multiple optical fibers 1244 received respective second optical signals 1220 (e.g., because transmission signal 1214 corresponds to multiple transmission spatial sectors), then multiple signal conversion circuits 1208 (each corresponding to an optical fiber 1244 of the multiple optical fibers that received respective second optical signals 1220) receive a respective second optical signal 1220.

The signal conversion circuit 1208 converts second optical signal 1220*a* into an electrical signal 1222*a*. Thus, electrical signal 1222*a* is generated from second optical signal 1220*a*. Furthermore, electrical signal 1222*a* represents multiple, and possibly all, optical signals 1216. If multiple signal conversion circuits 1208 received respective second optical signals 1220 (e.g., because transmission signal 1214 corresponds to multiple transmission spatial sectors), then multiple signal conversion circuits 1208 (each corresponding to an optical fiber 1244 of the multiple optical fibers 1244 that received respective second optical signals 1220) convert a respective second optical signal 1220 to a respective electrical signal 1222.

Switch matrix 1210 receives, at a first input port, electrical signal 1222*a*. Electrical signal 1222*a* corresponds to the transmission signal 1214 received at the antennas of antenna array 1202. The transmission signal 1214 (or at least a portion of transmission signal 1214) corresponds to a first transmission spatial sector of antenna array 1202 and to a first frequency band and a second frequency band. In this example, the electrical signal 1222 includes a first signal portion in a first frequency band and a second signal portion in a second frequency band. This disclosure, however, contemplates receiving electrical signal 1222 that include only a single signal portion that corresponds to a single frequency band (e.g., if the transmission signal 1214 to which electrical signal 1222 is in a single frequency band) or receiving electrical signals 1222 that include signal portions for more than two frequency bands (e.g., if the transmission signal 1214 to which electrical signal 1222 includes more than two frequency bands). While, as described above, multiple optical fibers 1244 of optical fiber array 1245 may detect respective second optical signals 1220, the remainder of the description of the example operation of receiver 1200 will focus on the receipt and subsequent processing of a second optical signal 1220*a* in one of optical fibers 1244.

Switch matrix 1210 directs, via a first output port, first electrical signal 1222*a* to a first signal conversion path 1212*a* of signal conversion paths 1212. As described above, in certain embodiments, switch matrix 1210 directs electrical signal 1222*a* received at an input port to a particular output port (and thereby to a particular signal conversion path 1212 (signal conversion path 1212*a* in this example) based on control signal 1248 received from controller 1250.

In certain embodiments, switch matrix 1210 compares a signal strength of first electrical signal 1222*a* to a signal threshold and directs, via the first output port, first electrical signal 1222*a* to first signal conversion path 1212*a* at least in part in response to the signal strength of first electrical signal 1222*a* exceeding the signal threshold.

Frequency band isolation circuitry 1224*a* in first signal conversion path 1212*a* receives first electrical signal 1222*a*. Frequency band isolation circuitry 1224*a* separates first electrical signal 1222*a* into first signal portion 1222*a*1 in the first frequency band and second signal portion 1222*a*2 in the second frequency band. For example, frequency band isolation circuitry 1224 may include a first filter 1256*a*1 (shown as an LPF) configured to separate first signal portion 1222*a*1 in the first frequency band from the received electrical signal 1222 and a second filter 1256*a*2 (shown as an HPF) configured to separate the second signal portion 1222*a*2 in the second frequency band from the received electrical signal 1222.

Frequency band isolation circuitry 1224*a* modulates reference signal 1258*a* with second signal portion 1222*a*2 to generate frequency-shifted second signal portion 1222*a*2'. For example, frequency band isolation circuitry 1224 may include a modulator 1260 that modulates reference signal 1258*a* with one of the signal portions of electrical signal 1222 (in this example, second signal portion 1222*a*2) to generate a frequency-shifted second signal portion 1222*a*2'.

Frequency band isolation circuitry 1224*a* combines first signal portion 1222*a*1 and frequency-shifted second signal portion 1222*a*2' to generate modified first electrical signal 1222*a*', using summer 1261 for example. Modified first electrical signal 1222*a*' corresponds to the transmission signals 1214 received at antennas of antenna array 1202 and from which electrical signal 1222 was generated. Analog-to-digital converter 1264*a* in first signal conversion path 1212*a* converts modified first electrical signal 1222*a*' to a digital format. In certain embodiments, each signal path 1212 includes an ADC 1264 for each portion of electrical signal 1222 (e.g., for each frequency band corresponding to electrical signal 1222). In such a scenario, the above-described combining, performed by summer 1261 for example, may be omitted.

Figure 9A:
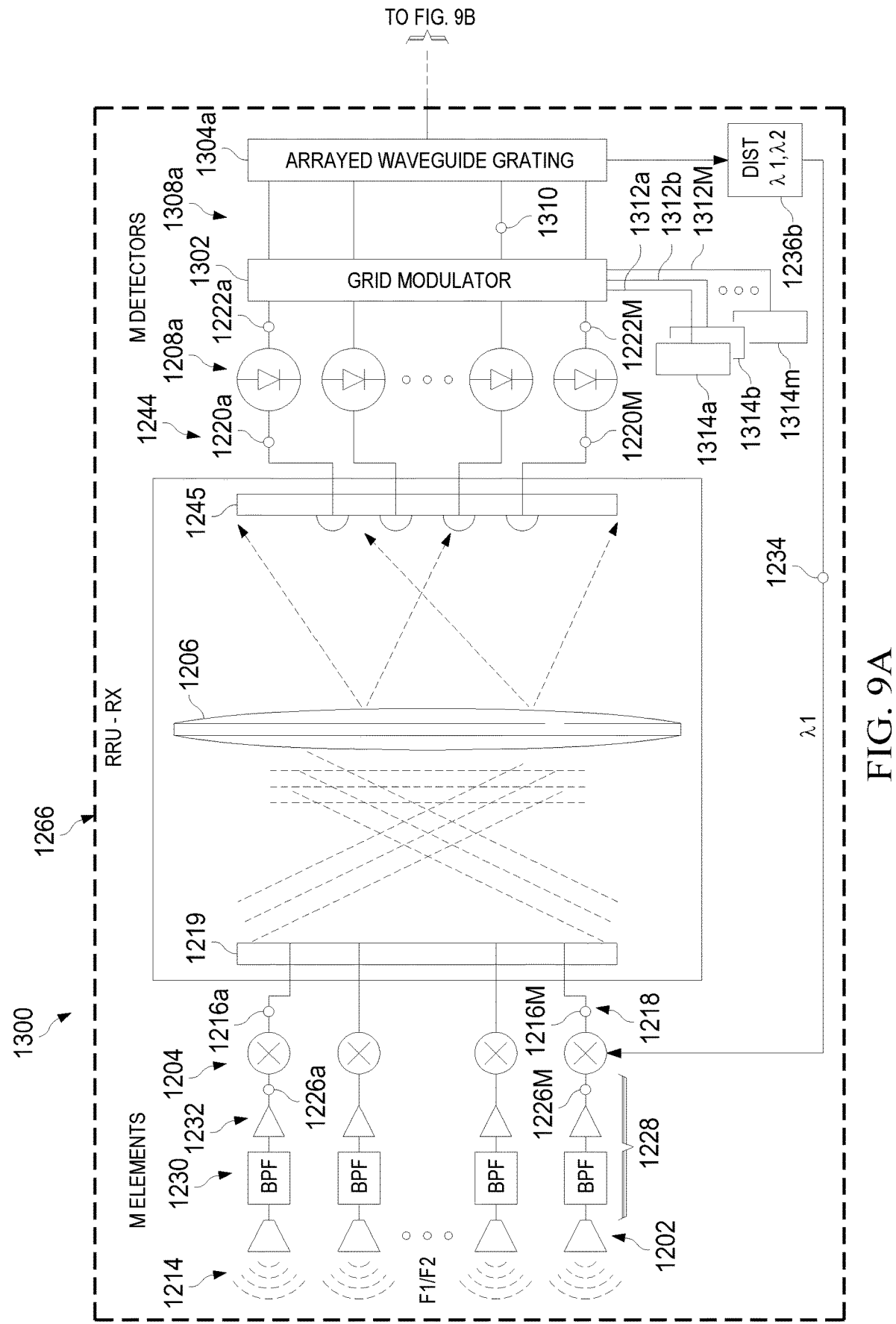
FIGS. 9A-9B illustrate another example receiver system, according to certain embodiments of this disclosure.
Figure 9B:
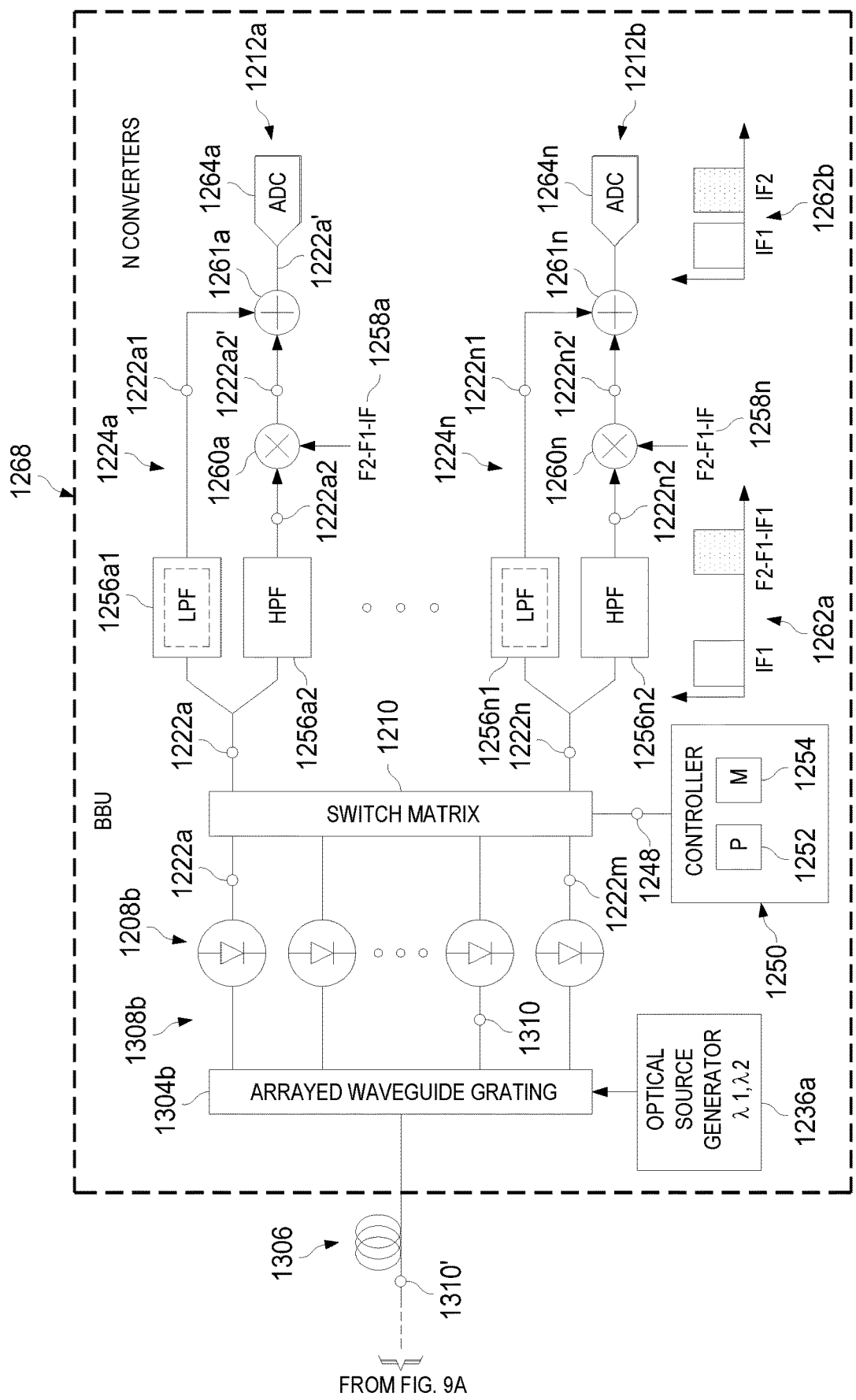

FIGS. 9A-9B illustrate another example receiver system 1300, according to certain embodiments of this disclosure. Receiver system 1300 includes many similar components and operates in much the same way as receiver system 1200 of FIGS. 8A-8B. Thus, the description of those components and operations will not be reproduced in the description of example receiver system 1300. The description of those components and operations is incorporated by reference into the description of receiver system 1300. Furthermore, to reduce clutter in FIGS. 9A-9B, the example details of optical lens 1206 are not shown but may be similar to the details shown in FIGS. 8A-8B.

Example receiver system reduces the number of optical fibers used to communicate between RRU 1266 and BBU 1268. In certain embodiments, whereas receiver system 1200 of FIGS. 12A-12B includes an optical fiber 1218 for each antenna of antenna array 1202 (and possible another optical fiber 1218 for communication of optical source signal 1234), receiver system 1300 reduces the number of optical fibers used to communicate between RRU 1266 and BBU 1268.

In FIGS. 9A-9B, optical lens 1206 is located at RRU 1266 rather than BBU 1268 (as was the case with system 1200). Additionally, a first set of signal conversion circuits (e.g., photodiodes) 1208*a* are located at RRU 1266 and a second set of signal conversion circuits (e.g., photodiodes) 1208*b* are located at BBU 1268.

Between signal conversion circuits 1208a and signal conversion circuits 1208b are a set of components for reducing the number of optical fibers used to transmit signals between RRU 1266 and BBU 1268. In particular, system 1300 includes a grid modulator 1302 (located at RRU 1266), a first arrayed waveguide grating element 1304a (located at RRU 1266), optical fiber(s) 1306, and a second arrayed waveguide grating element 1304b (located at BBU 1268).

Grid modulator 1302 receives electrical signals 1222 from signal conversion circuits 1208a. Grid modulator 1302 also receives optical signals 1312 from an array of optical sources 1314. The optical sources 1314 and optical signals 1312 are enumerated as 1314a through 1314M and 1312a through 1312M, respectively, in correspondence with the electrical signals 1222a through 1222M Grid modulator 1302 modulates each of the optical signals 1312 with electrical signals 1222 to generate corresponding optical signals 1310. Each of the optical signals 1312a through 1312M, corresponding to the respective each of the electrical signals 1222, may have a distinct wavelength.

First arrayed waveguide grating element 1304a receives optical signals 1310 via optical fibers 1308a and multiplexes optical signals 1310 into a multiplexed optical signal 1310' for transmission via one or more optical fibers 1306 such that optical signals 1310 may be transmitted together over fewer optical fibers (optical fibers 1306) between RRU 1266 and BBU 1268. Optical fibers 1306 may include one or more optical fibers but generally include fewer optical fibers that the number of optical fibers 1308a. In general, a quantity of the one or more optical fibers 1306 is less than a quantity of the plurality of optical signals 1310 prior to modulation by arrayed waveguide grating element 1304a.

Second arrayed waveguide grating element 1304b is configured to receive, via the one or more optical fibers 1306, multiplexed optical signal 1310'. Second arrayed waveguide grating element 1304b demultiplexes multiplexed optical signal 1310' into optical signals 1310 onto optical fibers 1308b. Optical signals 1310 output by second arrayed waveguide grating element 1304b are for conversion, by respective signal conversion circuits 1208b, into the plurality electrical signals 1222 to which the plurality of optical signals 1310 correspond.

In certain embodiments, optical fibers 1308b correspond to optical fibers 1308a. In one example, arrayed waveguide grating element 1304a receive optical signals 1310 on respective optical fibers of optical fibers 1308a and multiplexes the received optical signals for transmission via a single optical fiber 1306 (or at least a reduced number of optical fibers 1306). Continuing with this example, arrayed waveguide grating element 1304b receives the multiplexed optical signals 1310 via the single optical fiber 1306 (or at least the reduced number of optical fibers 1306) and demultiplexes the multiplexed optical signals 1310 for further transmission on the optical fibers of optical fibers 1308b that correspond to the optical fibers 1308a on which the respective optical signals 1310 were received by arrayed waveguide grating element 1304a.

Thus, in certain embodiments, receiver system 1300 may include fewer optical fibers between RRU 1266 and BBU 1268 (including as few as one optical fiber) than receiver system 1200. This disclosure contemplates system 1300 including any suitable number of optical fibers 1306 between RRU 1266 and BBU 1268.

Reducing the number of optical fibers connecting an RRU to a BBU may be desirable, to reduce costs for example, and may even be a requirement of certain implementations. In certain embodiments, system 1300 provides a technique for reducing or minimizing the number of optical fibers between an RRU and a BBU, potentially to one optical fiber if appropriate.

Figure 10:
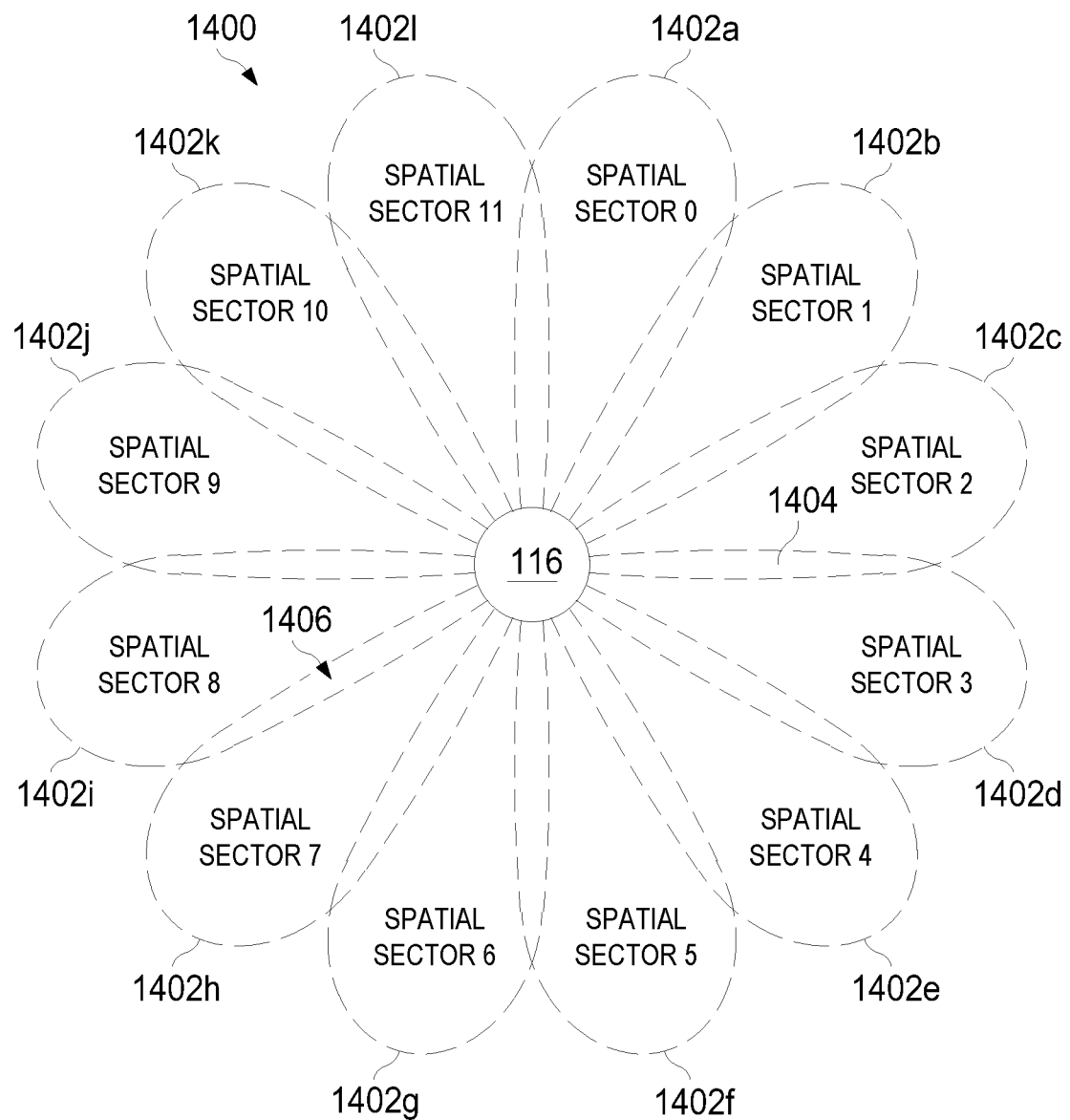
FIG. 10 illustrates an example transmission area that includes set of beams and sectors, according to certain embodiments of this disclosure.

FIG. 10 illustrates an example transmission area 1400 that includes spatial sectors 1402, according to certain embodiments of this disclosure. Transmission area 1400 is an example of a transmission area of antenna array 116, which is shown at the center of the figure. Although described as a transmission area of antenna array 116, the transmission area also could be a receive area of antenna array 1202.

Transmission area 1400 is divided into twelve spatial sectors 1402a-1402l (also labeled spatial sectors 0-11). A spatial sector 1402 may correspond to a specific antenna beam or pattern. In other words, in certain embodiments, a spatial sector 1402 could also be referred to as a beam. A transmission spatial sector may be a sector for antennas to transmit transmission signals (e.g., for antennas of antenna array 116 to transmit transmission signals 168), and a transmission spatial sector may be a sector for antennas to receive transmission signals (e.g., for antennas of antenna array 1202 to receive transmission signals 1214).

In the illustrated example, spatial sectors 0-11 cover the entire 360 degree area around antenna array 116. This disclosure also contemplates embodiments in which less than an entire area around an antenna array is covered. Furthermore, although transmission area 1400 is described as including twelve sectors, this disclosure contemplates a transmission area of antenna array 116 including any suitable number of sectors, according to particular implementations.

In the illustrated example, the spatial sectors 1402 overlap with adjacent spatial sectors 1402. As a particular example, spatial sectors 2 and 3 overlap, as shown at overlapping area 1404. As another particular example, spatial sectors 7 and 8 overlap, as shown at overlapping area 1406. Overlapping spatial sectors 1402 may provide a level of redundancy and potentially add to the reliability of embodiments of this disclosure.

As described above, a data signal 130 may be associated with (e.g., intended for) a particular mobile device in a particular spatial sector 1402 of antenna array 116. Switch matrix 106 may direct an optical signal 132 (generated from the input signal 130) received at an input port 400 of switch matrix 106 to an appropriate output port 402 of switch matrix 106 to result in transmission signals 168 being transmitted as a beam by antenna array 116 to the particular spatial sector 1402. As described above, the optical signal 132 might or might not be combined with other optical signals 132 that are associated with the same spatial sector 1402.

Figure 11:
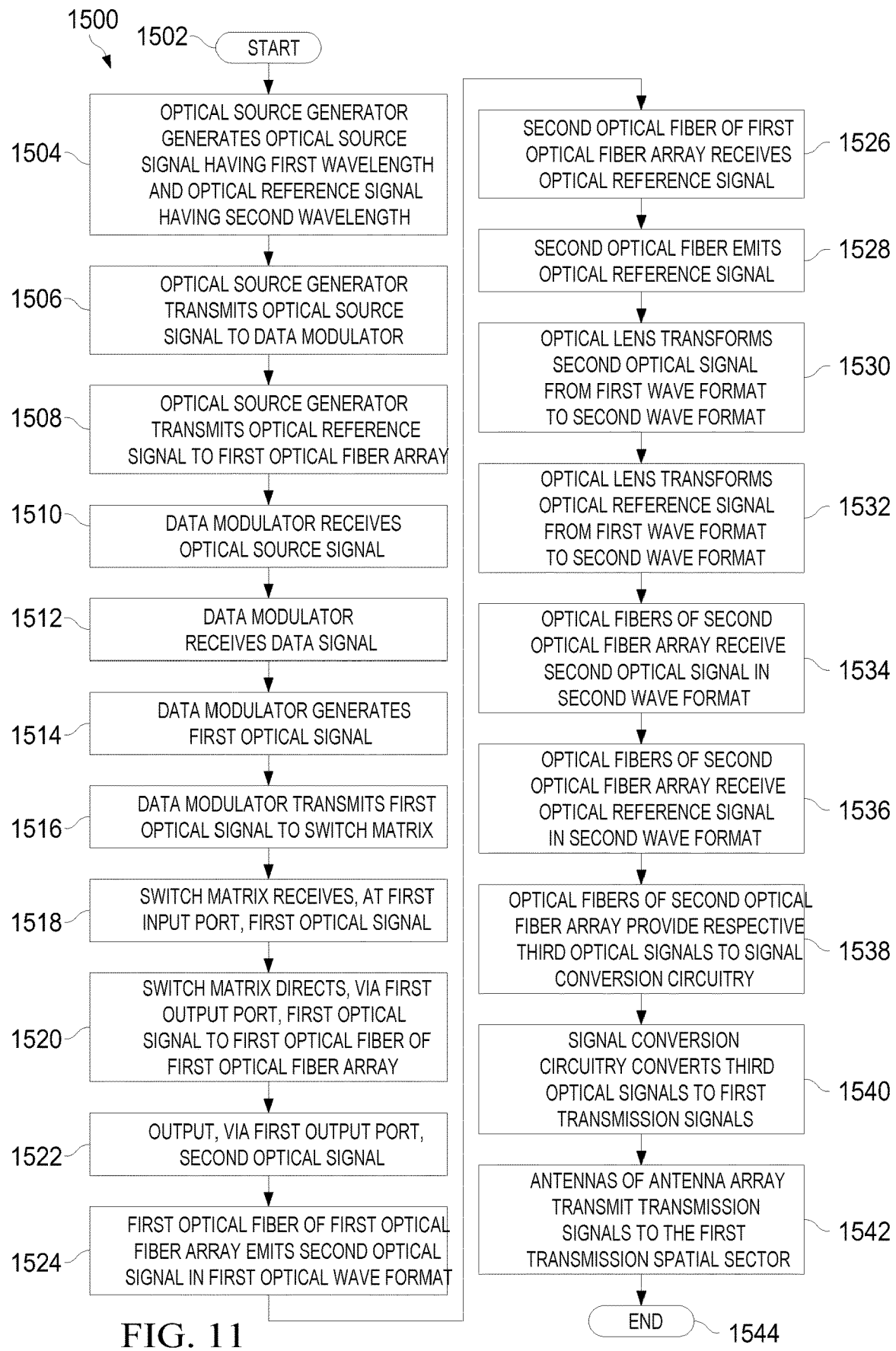
FIG. 11 illustrates an example method for transmitting signals using an optical lens as a beamformer, according to certain embodiments of this disclosure.

FIG. 11 illustrates an example method 1500 for transmitting signals using an optical lens as a beamformer, according to certain embodiments of this disclosure. Although described primarily with reference to system 100 and 700 of FIGS. 1, 6, and 7, this disclosure contemplates method 1500 being performed by any suitable transmitter, according to particular implementations. The method begins at step 1502.

At step 1504, first optical source generator 102a generates first optical source signal 124a having a first wavelength and generates a first optical reference signal 126a having a second wavelength. In certain embodiments, first optical source signal 124a and first optical reference signal 126a are phase locked to one another. First optical source generator 102a may correspond to a first frequency band (e.g., band A), and a difference between the first wavelength of first optical source signal 124a and the second wavelength of first optical reference signal 126a may define the first frequency band (e.g., band A) that corresponds to first optical source generator 102a.

As described above, in certain embodiments, first optical source generator 102a is one of multiple optical source generators (e.g., 102a, 102b, etc.) each of which is configured to generate a respective optical source signal 124 having a corresponding wavelength and a respective optical reference signal 126 having a corresponding wavelength. In an example with multiple optical source generators 102, the respective optical source signal 124 and the respective optical reference signal 126 of an optical source generator 102 are phase locked to one another and different than the respective optical source signals 124 and respective optical reference signals 126 generated by other optical source generators 102. In certain embodiments, the different optical source generators 102 correspond to different frequency bands (e.g., band A, band B, etc.), and for a given optical source generator 102, the difference between the wavelengths of the optical signals (e.g., optical source signals 124 and optical reference signals 126) generated by that optical source generator 102 defines the frequency band for that optical source generator 102.

At step 1506, first optical source generator 102a transmits first optical source signal 124a to first data modulator 104a.

At step 1508, first optical source generator 102a transmits first optical reference signal 126a to an optical fiber 136 of first optical fiber array 108.

At step 1510, first data modulator 104a1 receives first optical source signal 126a from first optical source generator 102.

At step 1512, first data modulator 104a1 receives first data signal 130a1. In certain embodiments, first data signal 130a1 is an electrical signal. First data signal 130a1 may be for transmission in a first transmission spatial sector of an antenna array 116. In certain embodiments, first data signal 130a1 includes data destined for a single user in the first transmission spatial sector. In certain other embodiments, first data signal 130a1 includes data destined for multiple users in the first transmission spatial sector. For example, in certain embodiments, a data encoder 702 may have received data destined for multiple users and encoded the data destined for each of the users such that first data signal 130a1 includes the data destined for each of the users. In certain embodiments, first data modulator 104a1 is one of multiple data modulators 104 for a first frequency band, each data modulator corresponding to a respective user. In certain other embodiments, first data modulator 104a1 is one of multiple data modulators 104 for a first frequency band, each data modulator 104 corresponding to a respective transmission spatial sector of a plurality of transmission spatial sectors of antenna array 116.

At step 1514, first data modulator 104a1 generates a first optical signal 132a1. For example, first data modulator 104a1 may generate first optical signal 132a1 by modulating first optical source signal 124a with first data signal 130a1.

At step 1516, first data modulator 104a1 transmits first optical signal 132a1 to switch matrix 106 via optical fiber 134 (e.g., optical fiber 134a1).

At step 1518, switch matrix 106 receives, at a first input port 400 (e.g., input port 400a), first optical signal 132a1 generated from first data signal 130a1. First optical signal 132a1 is for transmission in a first transmission spatial sector of an antenna array 116.

At step 1520, switch matrix 106 directs, via a first output port 402 (e.g., output port 402a), first optical signal 132a1 to a first optical fiber 136 of first optical fiber array 108. The first output port 402 is coupled to first optical fiber 136 of first optical fiber array 108. First optical fiber 136 of first optical fiber array 106 corresponds to the first transmission spatial sector of antenna array 116. In certain embodiments, switch matrix 106 is a non-blocking switch matrix.

In certain embodiments, switch matrix 106 directs, via the first output port 402 (e.g., output port 402a), first optical signal 132a1 to the first optical fiber 136 of first optical fiber array 108 based on a control signal 142 received from controller 140. As described above, control signal 142 instructs switch matrix 106 as to which output port 402 of switch matrix 106 an optical signal 132 received on an input port 400 of switch matrix 106 should be directed. The instruction provided by control signal 142 may be based on any suitable information. In certain embodiments, controller 140 has access to information related to a user associated with a particular optical signal 132 (and thereby associated with a data signal 130 from which that optical signal 132 was generated). As a particular example, controller 140 may have access to a location of the user (e.g., of the user equipment) associated with the particular optical signal 132. Knowing the location of the user allows controller 140 to select an appropriate output port of switch matrix 106 for directing an optical signal 132, so that the data of the data signal 130 from which the optical signal 132 was generated is transmitted to the appropriate transmission spatial sector of antenna array 116 for that data signal 130. Among other features, the operation of switch matrix 106, in conjunction with control signal 142, may allow the mappings between input ports 400 and output ports 402 of switch matrix 106 to be changed, as desired, which may allow switch matrix 106 to be reconfigured.

At step 1522, switch matrix 106 outputs, via first output port 402 (e.g., output port 402a), a second optical signal 138. Second optical signal 138 is based at least in part on first optical signal 132a1. In certain embodiments, second optical signal 138 is substantially the same, if not identical, to first optical signal 132a1. In certain other embodiments, second optical signal 132a1 includes some or all of first optical signal 132a1 but also includes some or all of other optical signals 132 received at one or more other input ports 400 of switch matrix 106. In the latter scenarios, switch matrix 106 may combine the optical signals 132 from the different input ports 400 of switch matrix 106 into the second optical signal 138.

At step 1524, the first optical fiber 136 emits the second optical signal 138 in a first wave format 148. For example, the first optical fiber 136 may emit the first optical signal 138 in a first wave format 148 in a direction of optical lens 110. In certain embodiments, first wave format is a spherical wave format.

At step 1526, a second optical fiber 136 of first optical fiber array 108 receives the first optical reference signal 126 generated by optical source generator 102a. In certain embodiments, the first optical reference signal 126 may have been combined by a combiner 120 with one or more other optical reference signals 126 generated by other optical source generators 102 to form a combined optical reference signal 128. For purposes of the remainder of this example, the optical reference signal received by the second optical fiber 136 will be referred to as combined optical reference signal 128.

At step 1528, the second optical fiber 136 emits combined optical reference signal 128. For example, the second optical fiber 136 may emit the combined optical reference signal 128 in first wave format 148 in a direction of optical lens 110. In certain embodiments, first wave format is a spherical wave format.

At step 1530, optical lens 110 transforms second optical signal 138 of the first optical fiber 136 of first optical fiber array 108 from first wave format 148 to second wave format 150. In certain embodiments, the second wave format 150 is a plane wave format.

At step 1532, optical lens 110 transforms combined optical reference signal 128 of the second optical fiber 136 of first optical fiber array 108 from first wave format 148 to second wave format 150. In certain embodiments, the second wave format 150 is a plane wave format.

At step 1534, optical fibers 152 of a second optical fiber array 112 receive the second optical signal 138 in second wave format 150 from optical lens 110. For example, optical fibers 152 of second optical fiber array 112 may pick up the second optical signal 138 (in the second wave format 150) in the free space between optical lens 110 and second optical fiber array 112. In certain embodiments, one or more lenslets 154 positioned between the optical fibers 152 of second optical fiber array 112 and the free space between optical lens 110 and second optical fiber array 112, facilitate receipt of the second optical signal 138 in second wave format 150 by optical fibers 152 of second optical fiber array 112.

At step 1536, optical fibers 152 of second optical fiber array 112 receive combined optical reference signal 128 in second wave format 150 from optical lens 110. For example, optical fibers 152 of second optical fiber array 112 may pick up combined optical reference signal 128 (in the second wave format 150) in the free space between optical lens 110 and second optical fiber array 112. In certain embodiments, one or more lenslets 154 positioned between the optical fibers 152 of second optical fiber array 112 and the free space between optical lens no and second optical fiber array 112, facilitate receipt of combined optical reference signal 128 in second wave format 150 by optical fibers 152 of second optical fiber array 112.

At step 1538, optical fibers 152 of second optical fiber array 112 provide respective third optical signals 156 to signal conversion circuitry 114. For each optical fiber 152 of second optical fiber array 112, the third optical signal 156 for that optical fiber 152 is based at least in part on the second optical signal 138 in second wave format 150 as received by that optical fiber 152 and the combined optical reference signal 128 in second wave format 150 as received by that optical fiber 152. In certain embodiments, that optical fiber 152 of second optical fiber array 112 is adapted to combine at least a portion of the combined optical reference signal 128 with the second optical signal 138 to generate the third optical signal 156.

At step 1540, signal conversion circuitry 114 converts the third optical signals 156 to first transmission signals for transmission in the first transmission spatial sector by antennas of antenna array 116. In certain embodiments, signal conversion circuitry 114 comprises photodiodes 160 configured to convert the third optical signals 156 to one or more transmission signals 168 for transmission in the first transmission spatial sector by antennas of antenna array 116. As a particular example, each optical fiber 152 of second optical fiber array 112 may be coupled to a corresponding photodiode 160 (either directly, or indirectly via one or more other processing elements of signal conversion circuitry 114, such as amplifiers 162 and/or attenuators 164), and the photodiode 160 for a given optical fiber 152 may convert the third optical signal 156 present on that optical fiber to one or more transmission signals 168 for transmission in the first transmission spatial sector by antennas of antenna array 116. In certain embodiments, transmission signals 168 are formatted as one or more RF signals.

As described above, third optical signals 156 may include optical signal 138 (in second wave format 150) and combined optical reference signal 128 (in second wave format 150). The presence of combined optical reference signal 128 may allow signal conversion circuitry 114 (e.g., photodiodes 160) to generates transmission signals 168 (e.g., RF signals) that have a suitable frequency and phase for transmission by antennas of antenna array 116.

In certain embodiments, signal conversion circuitry 114 includes additional components that are configured to tune and/or amplify either third optical signal 156 or the transmission signal to which the third optical signal 156 is converted prior to transmission of transmission signals 168. In one example, system 100 includes one or more optical signal amplifiers 162 and one or more optical attenuators 164 that are configured to amplify and attenuate third optical signal 156 prior to conversion of third optical signal 156. Additionally or alternatively, system 100 may include one or more power amplifiers 166 configured to amplify the transmission signals generated by photodiodes 160 (e.g. by converting third optical signal 156) prior to transmission of those transmission signals as transmission signals 168 by antennas of antenna array 116.

At step 1542, antennas of antenna array 116 transmit transmission signals 168 to the first transmission spatial sector.

At step 1544, method 1500 ends.

For simplicity, method 1500 has been described primarily with reference to a single data signal 130a1 propagating through system 100 for transmission in the first transmission spatial sector associated with data signal 130a1. This disclosure, however, contemplates system 100 processing multiple data signals 130, potentially simultaneously. These additional data signals 130 may be associated with the same or a different frequency band as data signal 130a1. Additionally or alternatively, these additional data signals 130 may be associated with the same or a different user as data signal 130a1. Additionally or alternatively, these additional data signals 130 may be associated with the same or a different transmission spatial sector as data signal 130a1. A few example scenarios are described below.

As a first example, switch matrix 106 may receive, at a second input port 400b, another optical signal 132 (which will be referred to as a fourth optical signal 132b2) generated from a second data signal 130b2. In certain embodiments, the first optical signal 132a1 is associated with a first frequency band (e.g., band A), the first optical signal 132a1 having been formed by modulating first optical source signal 124a having a first wavelength with first data signal 130a1, and the fourth optical signal 132b2 is associated with a second frequency band (e.g., band B), the fourth optical signal 132b2 having been formed by modulating a second optical source signal 124b having a second wavelength with the second data signal 130b2. In this example, the fourth optical signal 132b2 is for transmission in the first transmission spatial sector of antenna array 116.

Continuing with the first example, in one scenario, switch matrix 106 directs, via the first output port 402a, the fourth optical signal 132b2 to the first optical fiber 136 of first optical fiber array 108. Switch matrix 106 may output, via the first output port 402a, a fifth optical signal 138 that is based at least in part on fourth optical signal 132b2. In other words, despite fourth optical signal 132b2 being associated with a separate frequency band (e.g., band B), being generated from different input data 130 than first optical signal 132a1, and being received at different input ports 400a and 400b of switch matrix 106, switch matrix 106 directs (e.g., based on control signal 142) both fourth optical signal 132b2 and first optical signal 13201 to the same output port 402a of switch matrix 106, which will feed antennas of antenna array 116 for transmission to the first transmission spatial sector. In certain embodiments, switch matrix 106 combines the first optical signal 132a1 and the fourth optical signal 132b2 such that the second optical signal 138 is based at least in part on both the first optical signal 132a1 and the fourth optical signal 132b2 and the fifth optical signal 138 in this scenario is the same as the second optical signal 138.

As a second example, switch matrix 106 may receive, at a second input port 400b, another optical signal (which will be referred to as fourth optical signal 132b2) generated from a second data signal 130b2. In certain embodiments, the first optical signal 132a1 is associated with a first frequency band (e.g., band A), the first optical signal 132a1 having been formed by modulating a first optical source signal 124a having a first wavelength with the first data signal 130a1, and the fourth optical signal 132b2 is associated with a second frequency band (e.g., band B), the fourth optical signal 132b2 having been formed by modulating a second optical source signal 124b having a second wavelength with the second data signal 130b2. In this example, the fourth optical signal 132b2 is for transmission in a second transmission spatial sector of antenna array 116.

Continuing with the second example, in one scenario, switch matrix 106 directs, via a second output port (e.g., output port 402b), the fourth optical signal 132b2 to a second optical fiber 136 of first optical fiber array 108. The second optical fiber 136 of first optical fiber array 108 corresponds to the second transmission spatial sector of antenna array 116. Switch matrix 106 may output, via a second output port (e.g., output port 402b), a fifth optical signal 138 that is based at least in part on the fourth optical signal 132b2. In an example, optical lens no transforms the fifth optical signal 138 of the second optical fiber 136 of first optical fiber array 108 from first wave format 148 to second wave format 150. In certain embodiments, optical fibers 152 of second optical fiber array 112 receive the fifth optical signal 138 in second wave format 150 and provide respective sixth optical signals 156 to signal conversion circuitry 114. The respective sixth optical signals 156 are based at least in part on the fifth optical signal 138, as received in the second wave format 150 by the respective optical fibers 152. Signal conversion circuitry 114 is configured to convert the sixth optical signals 156 to second transmission signals 168 for transmission in the second transmission spatial sector by antennas of antenna array 116.

As a third example, switch matrix 106 may receive, at first input port 400a, another optical signal 132 (which will be referred to as a fourth optical signal 132a2) generated from a second data signal 130a2, the first optical signal 132a1 and the fourth optical signal 132a2 being associated with a same frequency band (e.g., band A). In this third example, fourth optical signal 132a2 is for transmission in a second transmission spatial sector of antenna array 116. In this third example, switch matrix 106 may direct, via a second output port 402 (e.g., output port 402c) of output ports 402, fourth optical signal 132a2 to a second optical fiber 136 of first optical fiber array 108. Switch matrix 106 may output, via the second output port 402 (e.g., output port 402c), a fifth optical signal 138 that is based at least in part on fourth optical signal 132a2. The second output port 402c is coupled to the second optical fiber 136 of first optical fiber array 108, and the second optical fiber 136 of first optical fiber array 108 corresponds to the second transmission spatial sector of antenna array 116.

Figure 12A:
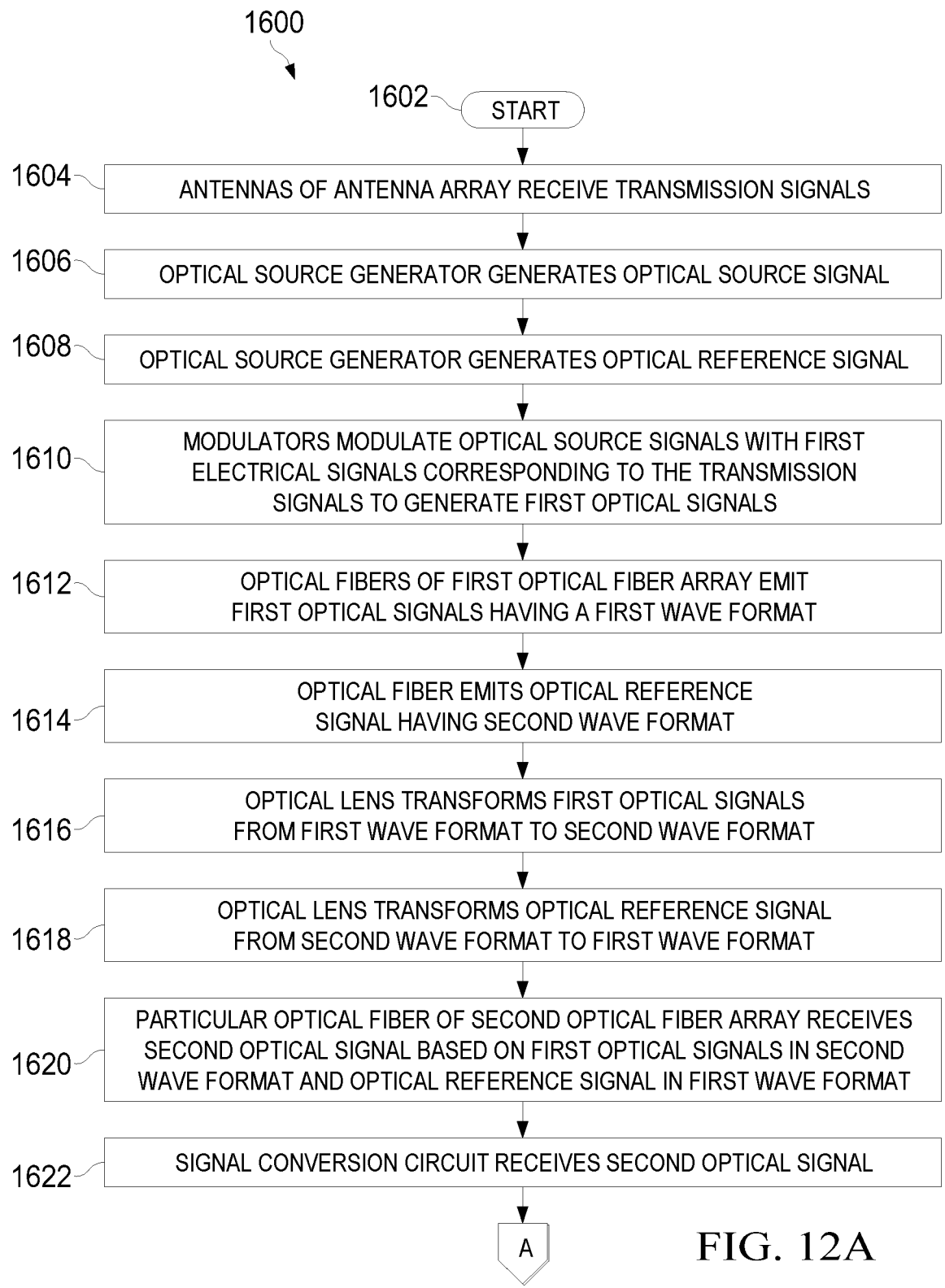
FIGS. 12A-12B illustrate an example method for receiving signals using an optical lens as a beamformer, according to certain embodiments of this disclosure.
Figure 12B:
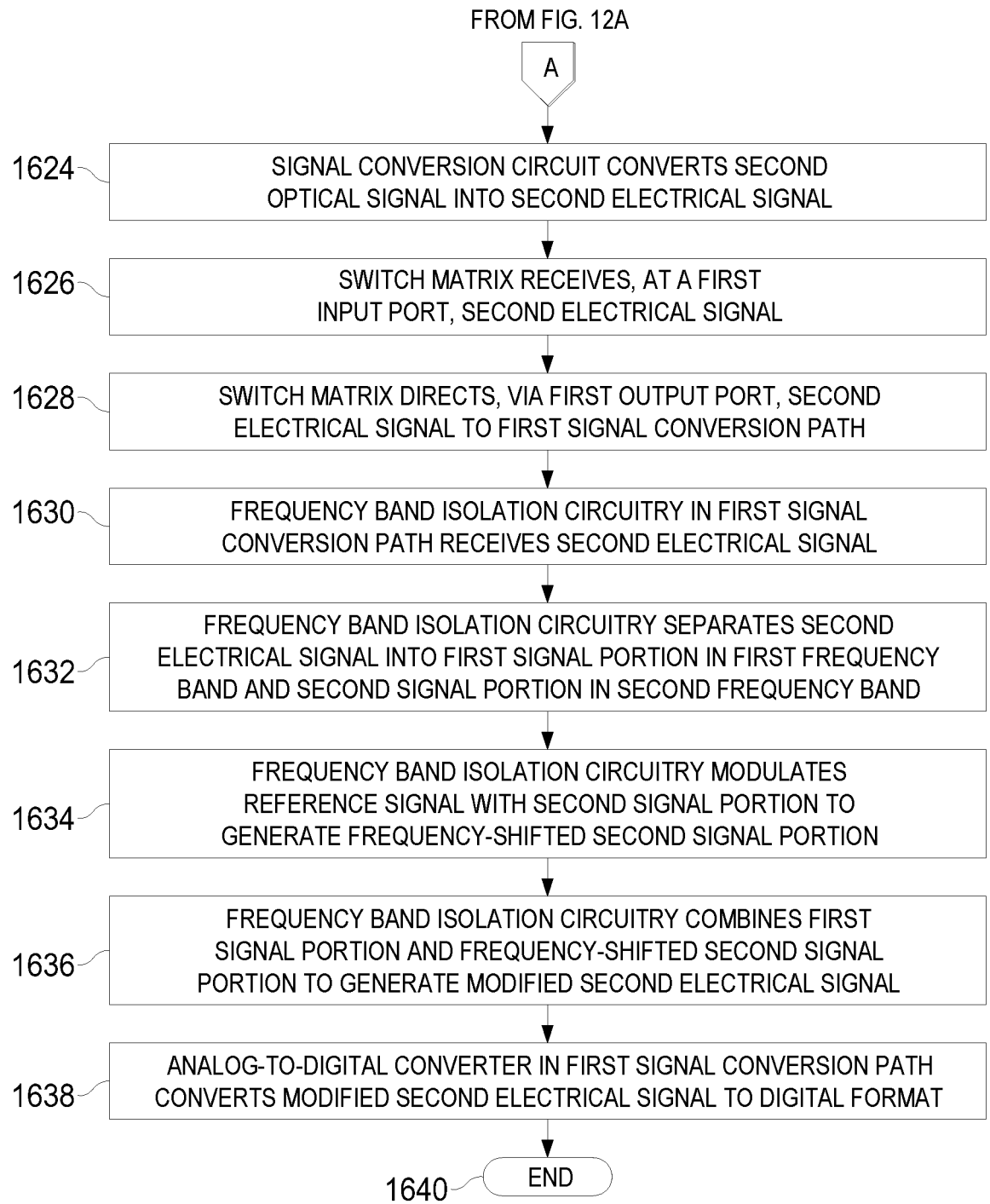

FIGS. 12A-12B illustrate an example method 1600 for receiving signals using an optical lens as a beamformer, according to certain embodiments of this disclosure. Example method 1600 is described with reference to receiver system 1200; however, method 1600 could incorporate features of system 1300 or other suitable receiver systems, if appropriate. The method begins at step 1602.

At step 1604, antennas of antenna array 1202 receive transmission signal 1214. In certain embodiments, transmission signal 1214 is an RF signal. For purposes of this example, it will be assumed that the received transmission signal 1214 includes data of a first user operating in a first transmission spatial sector of antenna array 1202 and data of a second user operating in the first transmission spatial sector, the data of the first user being in a first frequency band and the data of the second user being in a second frequency band. Thus, in this example, transmission signal 1214 is multi-user and multi-band. As will be seen below, system 1200 is capable of receiving and processing a transmission signal 1214 that is any combination of multi-user, multi-band, and multi-sector, substantially simultaneously. Each antenna of antenna array 1202 may receive transmission signal 1214, although the version of transmission signal 1214 received by each antenna may differ in certain respects (e.g., differ in phase). For each antenna of antenna array 1202, a received transmission signal 1214 may be transported as an electrical signal 1226.

At step 1606, optical source generator 1236 generates optical source signal 1234, and at step 1608, optical source generator 1236 generates optical reference signal 1240. In certain embodiments, optical source signal 1234 and optical reference signal 1240 are phase locked to one another. In a distributed implementation of receiver 1200 (or in other implementations, if desired), optical source generator 1236a may provide optical source signal 1234 to distributed element 1236b via an optical fiber 1218, with distributed element 1236b then providing optical source signal 1234 to modulators 1204. In an embodiment in which optical source generator 1236a is co-located with modulators 1204 (or in other implementations, if desired), optical source generator 1236a (which might be implemented without distributed element 1236b in such an embodiment) may provide optical source signal 1234 directly to modulators 1204.

At step 1610, modulators 1204 modulate optical source signal 1234 with transmission signals 1214 to generate first optical signals 1216. For example, modulators 1204 may receive electrical signals 1226 that are based on transmission signal 1214 received at step 1604. Modulators 1204 may modulate optical source signal 1234 with those electrical signals 1226 to generate respective first optical signals 1216, each corresponding to an antenna of antenna array 1202. In certain embodiments, processing is performed on transmission signals 1214 (or electrical signals 1226 resulting from transmission signals 1214), as received by each antenna of antenna array 1202, prior to modulators 1204 modulating optical signal 1234 with transmission signals 1214 (or electrical signals 1226 resulting from transmission signals 1214) to generate the respective first optical signals 1216. For example, the processing that is performed on transmission signals 1214 (or electrical signals 1226 resulting from transmission signals 1214) may include filtering (e.g., by bandpass filters 1230), amplification (e.g., by amplifiers 1232), or any combination of these or other suitable processing.

At this point, each optical signal 1216*a* through 1216M may include what is essentially an optical representation of the transmission signal 1214 received at the antenna corresponding to the modulator 1204 that generated that optical signal 1216. After modulation, optical fibers 1218 may transport optical signals 1216 toward optical lens 1206 for transformation, as described below.

At step 1612, optical fibers 1218 of optical fiber array 1219 emit respective first optical signals 1216 having a first wave format (e.g. a plane wave format). For example, as first optical signals 1216 are emitted by respective optical fibers 1218, first optical signals 1216 may have the first wave format in the free space between optical fiber array 1219 and optical lens 1206. In certain embodiments, optical fibers 1218 correspond to respective antennas of antenna array 1202.

At step 1614, an optical fiber 1218 of optical fiber array 1219 emits optical reference signal 1240 with a second wave format (e.g. a spherical wave format). For example, as optical reference signal 1240 is emitted by optical fiber 1218, optical reference signal 1240 may have the second wave format in the free space between optical fiber array 1219 and optical lens 1206.

At step 1616, optical lens 1206 transforms first optical signals 1216 from the first wave format (e.g., a plane wave format) to a second wave format (e.g., a spherical wave format). For example, as first optical signals 1216 pass through optical lens 1206, optical lens 1206 may transform first optical signals 1216 from a plane wave format to a set of spherical converging waves that correspond to the transmission signal 1214 received by antennas of antenna array 1202 and represented by optical signals 1216. The spherical converging waves converge on at least one optical fiber 1244, as described below.

At step 1618, optical lens 1206 transforms optical reference signal 1240 (e.g., the local oscillator signal, or LO) from the second wave format (e.g., a spherical wave format) to the first wave format (e.g., a plane wave format). For example, as optical reference signal 1240 passes through optical lens 1206, optical lens 1206 may transform optical reference signal 1240 from a spherical wave format to a plane wave format.

At step 1620, a particular optical fiber 1244 of optical fiber array 1245 receives a second optical signal 1220 (e.g., optical signal 1220*a*). Second optical signal 1220 is based at least in part on first optical signals 1216, as transformed into the second wave format (e.g., the converging spherical waves) by optical lens 1206 and acquired from the free space between optical lens 1206 and optical fiber array 1245 by the particular optical fiber 1244. For example, optical lens 1206 transforming optical signals 1216 from the first wave format (e.g., a plane wave format) to the second wave format (e.g., a spherical wave format) may focus optical signals 1216 in the second wave format to the particular optical fiber 1244 for receipt by a particular signal transformation circuit 1208 (e.g., a particular photodetector).

As described above, each signal conversion circuit 1208 may correspond to a particular transmission spatial sector, which may correspond to a particular angle of arrival for transmission signals 1214. Thus, in the above-described example in which the transformation performed by optical lens 1206 focuses optical signals 1216 in the second wave format to a particular optical fiber 1244 (which is coupled to a particular signal transformation circuit 1208), the received optical signals 1216 (and second optical signal 1220) may have been generated from a transmission signal 1214 in a single transmission spatial sector (and have a single angle of arrival).

Additionally or alternatively, a transmission signal 1214 may correspond to multiple transmission spatial sectors, and the received optical signals 1216 (and second optical signal 1220) generated from that transmission signal 1214 may include information for multiple transmission spatial sectors (and have multiple angles of arrival). In such a scenario, the transformation performed by optical lens 1206 focuses optical signals 1216 in the second wave format to multiple optical fibers 1244, which are coupled to respective signal transformation circuits 1208. In particular, the transformation performed by optical lens 1206 focuses optical signals 1216 in the second wave format to those optical fibers 1244 that correspond to the signal conversion circuits for the multiple transmission spatial sectors associated with the received transmission signal 1214. Thus, method 1600 also may be used to process multisector transmission signals 1214.

Additionally or alternatively, regardless of whether an optical signal 1216 represents a transmission signal 1214 for a single transmission spatial sector or multiple transmission spatial sectors, it is possible that some optical fibers 1244 (and associated signal conversion circuits 1208) other than those that correspond to the transmission spatial sector or sectors of the received transmission signal 1214 may acquire a second optical signal 1220 that is based on some portion of optical signal 1216 in the second wave format. These second optical signals 1220 acquired by optical fibers 1244 (and associated signal conversion circuits 1208) other than those that correspond to the transmission spatial sector or sectors of the received transmission signal 1214 may be considered "spillage," which can be ignored by applying some thresholding (e.g., in switch matrix 1210).

Second optical signal 1220 also is based on reference signal 1240, as transformed into the first wave format (e.g., the plane wave format) by optical lens 1206 and acquired from the free space between optical lens 1206 and optical fiber array 1245 by optical fibers 1244. In certain embodiments, optical reference signal 1240, as transformed into the second wave format (e.g., the plane wave format), may be substantially evenly distributed in phase across some or all optical fibers 1244 of optical fiber array 1245.

At step 1622, a signal conversion circuit 1208 corresponding to the particular optical fiber 1244 receives the second optical signal 1220 via the particular optical fiber 1244. In certain embodiments, signal conversion circuit 1208 is a photodiode, and may be one of multiple photodiodes. For the remainder of the description of method 1600, for ease of reference it will be assumed that the top-most optical fiber 1244 is the particular optical fiber 1244 that receives a second optical signal 1220 (optical signal 1220*a* in the illustrated example), and that the signal conversion circuit 1208 that receives optical signal 1220*a* is the top-most signal conversion circuit. If multiple optical fibers 1244 received respective second optical signals 1220 at step 1620 (e.g., because transmission signal 1214 corresponds to multiple transmission spatial sectors), then at step 1622 multiple signal conversion circuits 1208 (each corresponding to an optical fiber 1244 of the multiple optical fibers that received respective second optical signals 1220 at step 1620) receive a respective second optical signal 1220.

At step 1624, the signal conversion circuit 1208 converts second optical signal 1220*a* into an electrical signal 1222*a*. Thus, electrical signal 1222*a* is generated from second optical signal 1220*a*. Furthermore, electrical signal 1222*a* represents multiple, and possibly all, optical signals 1216. If multiple signal conversion circuits 1208 received respective second optical signals 1220 at step 1622 (e.g., because transmission signal 1214 corresponds to multiple transmission spatial sectors), then at step 1624 multiple signal conversion circuits 1208 (each corresponding to an optical fiber 1244 of the multiple optical fibers 1244 that received respective second optical signals 1220 at step 1620) convert a respective second optical signal 1220 to a respective electrical signal 1222.

At step 1626, switch matrix 106 receives, at a first input port, electrical signal 1222a. Electrical signal 1222a corresponds to the transmission signal 1214 received at the antennas of antenna array 1202. The transmission signal 1214 (or at least a portion of transmission signal 1214) corresponds to a first transmission spatial sector of antenna array 1202 and to a first frequency band and a second frequency band. In this example, the electrical signal 1222 includes a first signal portion in a first frequency band and a second signal portion in a second frequency band. This disclosure, however, contemplates receiving electrical signal 1222 that include only a single signal portion that corresponds to a single frequency band (e.g., if the transmission signal 1214 to which electrical signal 1222 is in a single frequency band) or receiving electrical signals 1222 that include signal portions for more than two frequency bands (e.g., if the transmission signal 1214 to which electrical signal 1222 includes more than two frequency bands). While, as described above, multiple optical fibers 1244 of optical fiber array 1245 may detect respective second optical signals 1220, the remainder of the description of method 1600 will focus on the receipt and subsequent processing of a second optical signal 1220a in one of optical fibers 1244.

At step 1628, switch matrix 106 directs, via a first output port, first electrical signal 1222a to a first signal conversion path 1212a of signal conversion paths 1212. As described above, in certain embodiments, switch matrix 1210 directs electrical signal 1222a received at an input port to a particular output port (and thereby to a particular signal conversion path 1212 (signal conversion path 1212a in this example) based on control signal 1248 received from controller 1250.

In certain embodiments, switch matrix 1210 compares a signal strength of first electrical signal 1222a to a signal threshold and directs, via the first output port, first electrical signal 1222a to first signal conversion path 1212a at least in part in response to the signal strength of first electrical signal 1222a exceeding the signal threshold.

At step 1630, frequency band isolation circuitry 1224a in first signal conversion path 1212a receives first electrical signal 1222a.

At step 1632, frequency band isolation circuitry 1224a separates first electrical signal 1222a into first signal portion 1222a1 in the first frequency band and second signal portion 1222a2 in the second frequency band. For example, frequency band isolation circuitry 1224 may include a first filter 1256a1 (shown as an LPF) configured to separate first signal portion 1222a1 in the first frequency band from the received electrical signal 1222 and a second filter 1256a2 (shown as an HPF) configured to separate the second signal portion 1222a2 in the second frequency band from the received electrical signal 1222.

At step 1634, frequency band isolation circuitry 1224a modulates reference signal 1258a with second signal portion 1222a2 to generate frequency-shifted second signal portion 1222a2'. For example, frequency band isolation circuitry 1224 may include a modulator 1260 that modulates reference signal 1258a with one of the signal portions of electrical signal 1222 (in this example, second signal portion 1222a2) to generate a frequency-shifted second signal portion 1222a2'.

At step 1636, frequency band isolation circuitry 1224a combines first signal portion 1222a1 and frequency-shifted second signal portion 1222a2' to generate modified first electrical signal 1222a'. For example, frequency band isolation circuitry 1224 may include a summer 1261 that combines first signal portion 1222a1 and frequency-shifted second signal portion 1222a2' to generate a modified electrical signal 1222' by adding the first signal portion 1222a1 and the frequency-shifted second signal portion 1222a2'. Modified first electrical signal 1222a' corresponds to the transmission signals 1214 received at antennas of antenna array 1202 and from which electrical signal 1222 was generated.

In certain embodiments, each signal path 1212 may include an ADC 1264 for each portion of electrical signal 1222 (e.g., for each frequency band corresponding to electrical signal 1222). In such a scenario, step 1636 (e.g., modulation with summer 1261) may be omitted.

At step 1638, analog-to-digital converter 1264a in first signal conversion path 1212a converts modified first electrical signal 1222a' to a digital format.

At step 1640, method 1600 ends.

Embodiments of this disclosure may provide one or more technical advantages. For example, certain embodiments provide a combined electrical-optical architecture that allows performing analog, hybrid, and/or digital beamforming, possibly while decoupling the beamforming from the specific frequency bands supported. Additionally or alternatively, certain embodiments provide multi-band, multi-sector, and multi-beam capabilities. Certain embodiments provide a photonically-enabled simultaneous multiband, multisector MIMO system using an optical lens as a beamformer.

In certain embodiments, adding an optical intermediate portion allows more degrees of freedom, which may support additional features through the use of optical processing. In certain embodiments, the optical portion of the architecture remains constant while an antenna array can be modified to accommodate the desired frequency bands to be supported. This may allow BTS construction to be more modular, as a core optical portion is the same regardless of frequency band. In contrast, all-RF solutions have components that are very much tuned to the frequency bands of operations, making it difficult and/or costly to support multiple bands and multiple sectors as a number of antennas to be used increases (e.g., with MIMO, Massive MIMO, etc.).

Certain embodiments apply to cellular communications (e.g., 4G, 5G, etc.), point-to-multipoint (PMP) backhauling, fixed wireless broadband access, passive electromagnetic sensing, and other suitable communication technologies. Certain embodiments provide a relatively cost-effective way of maintaining coherence, particularly for a large number of antennas, and reducing or eliminating random phase fluctuations induced by mechanical and thermal effects, particular examples of which are described in U.S. Pat. No. 7,965,435. This coherence and low phase noise may facilitate accurate beamforming.

Certain embodiments of this disclosure provide for simplified implementation and large scalability. For example, a lens-based transmission system may support multiple channels of input sectors feeding an output down-conversion to an antenna array. As another example, the data modulators are relatively efficient to implement, potentially leveraging chip-level photonic integration technologies, for example. The data modulators can be scaled to a large phased antenna array with large channel counts.

Certain embodiments of this disclosure provide for reduced system cost and complexity. For example, certain embodiments reduce or eliminate using separate optical source generators for each spatial sector. As another example, certain embodiments may be implemented without an optical switching network in a simplest embodiment where each optical fiber is served by a separate data modulator. In such an embodiment, the electronic signal fed to each of the data modulators may serve the UEs in the corresponding sector.

Certain embodiments of this disclosure provide for improved reliability. For example, the loss of a data modulator, or associated electronic/optical functionality serving a particular sector, might be compensated for by designing the transmission antenna array such that there is overlap between the beams produced by the array. If a beam, serving a particular sector, were lost, adjacent beams may still be able to partially or completely cover the sector served by the lost beam. In certain embodiments, providing this overlap would involve appropriately spacing the antennas and the optical fibers in their respective arrays.

Certain embodiments of this disclosure provide for reconfigurability and enhanced signal redundancy. For example, an appropriately-located optical switch matrix may provide redundancy in case of a data modulator loss. As a particular example, the output of a "spare" data modulator, or a data modulator not presently serving another sector, may be optically switched/routed into the position fed by the faulty data modulator. The electronic data signal provided as input to the faulty data modulator may be appropriately re-routed (in the electronic/digital domain) to feed the substitute data modulator.

Certain embodiments of this disclosure provide for enhanced radiation power and system linearity. The number of the transmitting optical fibers (e.g., a first optical fiber array) providing input signals (e.g., serving as point source) to the optical lens may, in certain embodiments, be different than the number of optical fibers (e.g., a second optical fiber array) receiving optical signals that have been passed through (e.g., and transformed by) the optical lens. As a particular example, by increasing the number optical fibers (e.g., the second optical fiber array) receiving optical signals that have been passed through the optical lens, optical power may be spread over a larger number of photo-diodes. This may allow increasing the total optical power, and thereby the total radiated RF power, while maintaining or reducing the RF gain of the individual RF power amplifiers serving the antenna array. In certain embodiments, this may lead to improved linearity of the transmitted signals. Such an approach may provide redundancy in case of a loss of an amplifier or a transmission antenna because the antenna array may be over-sampled, potentially by a large factor. Furthermore, in certain embodiments, the amount of optical power delivered to the (potentially large number of) photo-diodes may be sufficiently high to consider the elimination of RF power amplifiers, thereby simplifying the system architecture and possibly improving linear performance.

Certain embodiments of this disclosure provide a receiver that is able to receive and simultaneously process wireless (e.g., RF) signals in multiple frequency bands, and to reduce a number of signal conversion circuits (e.g., analog-to-digital converters) that are used by the receiver. In a distributed implementation of the receiver, certain embodiments provide an ability to reduce a number of optical fibers used to communicate signals between the distributed components of the receiver.

Certain embodiments of this disclosure may provide some, all, or none of the above advantages. Certain embodiments may provide one or more other technical advantages, one or more of which may be readily apparent to those skilled in the art from the figures, descriptions, and claims included in this disclosure.

Figure 13:
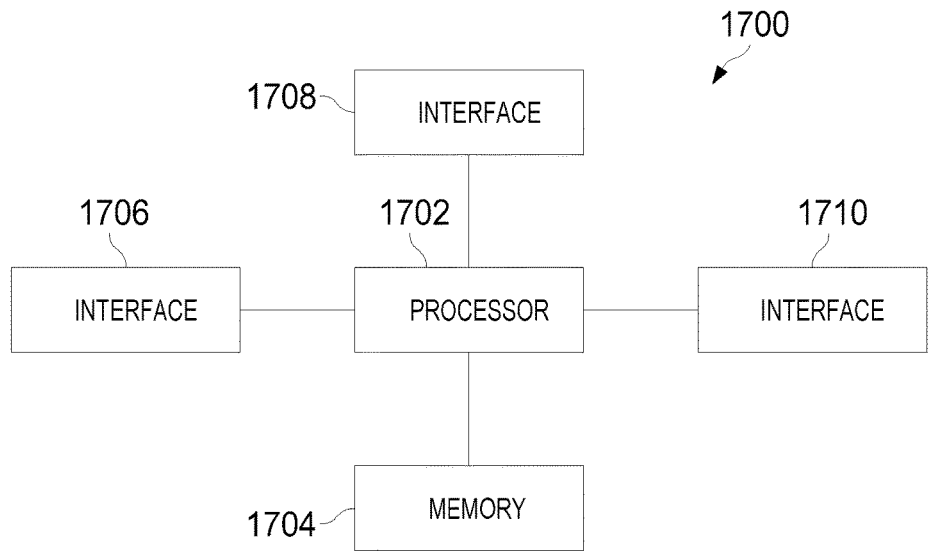
FIG. 13 illustrates a block diagram of an example processing system, according to certain embodiments of this disclosure.

FIG. 13 illustrates a block diagram of an example processing system 1700, according to certain embodiments of this disclosure. Processing system 1700 may be configured to perform methods described in this disclosure, and may be installed in a host device. As shown, processing system 1700 includes a processor 1702, a memory 1704, and interfaces 1706-1710, which may (or may not) be arranged as shown in FIG. 17. Processor 1702 may be any component or collection of components adapted to perform computations and/or other processing related tasks, and the memory 1704 may be any component or collection of components adapted to store programming and/or instructions for execution by processor 1702. In an embodiment, memory 1704 includes a non-transitory computer readable medium. The computer-readable non-transitory media includes all types of computer readable media, including magnetic storage media, optical storage media, and solid state storage media and specifically excludes signals. It should be understood that the software can be installed in and sold with the device. Alternatively, the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

In some embodiments, processing system 1700 is included in a network device that is accessing, or part otherwise of, a telecommunications network. In one example, processing system 1700 is in a network-side device in a wireless or wireline telecommunications network, such as a base station, a relay station, a scheduler, a controller, a gateway, a router, an applications server, or any other device in the telecommunications network. In other embodiments, processing system 1700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 14:
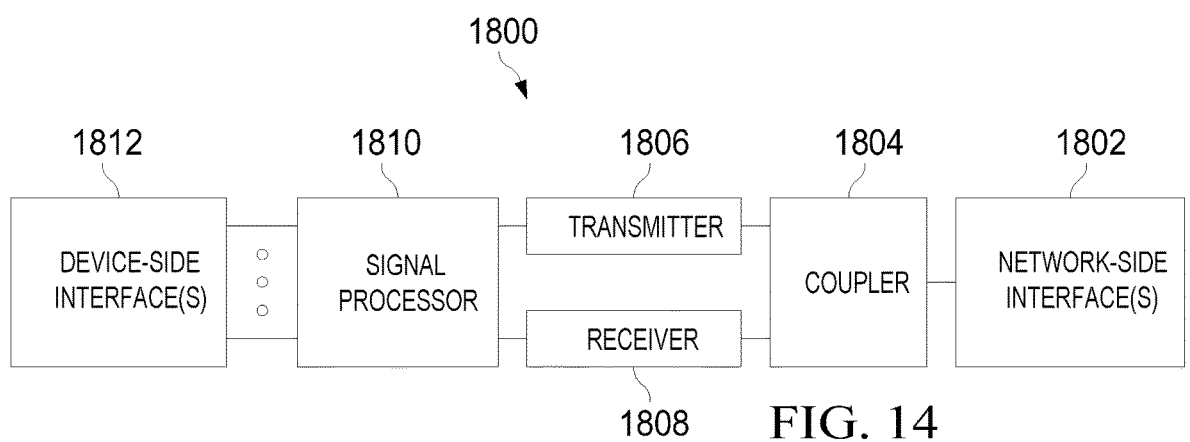
FIG. 14 illustrates a block diagram of an example transceiver, according to certain embodiments of this disclosure.

FIG. 14 illustrates a block diagram of an example transceiver 1800, according to certain embodiments of this disclosure. Transceiver 1800 is adapted to transmit and receive signals over a telecommunication network. In some embodiments, one or more of interfaces 1706, 1708, and 1710 shown in and described with reference to FIG. 13 connects processing system 1700 to a transceiver (e.g., transceiver 1800) adapted to transmit and receive signaling over the telecommunications network. The transceiver 1800 may be installed in a host device. As shown, transceiver 1800 comprises a network-side interface 1802, a coupler 1804, a transmitter 1806, a receiver 1808, a signal processor 1810, and a device-side interface 1812. Network-side interface 1802 may include any component or collection of components adapted to transmit or receive signaling over a wireless or wireline telecommunications network. Coupler 1804 may include any component or collection of components adapted to facilitate bi-directional communication over network-side interface 1802. Transmitter 1806 may include any component or collection of components (e.g., up-converter, power amplifier, etc.) adapted to convert a baseband signal into a modulated carrier signal suitable for transmission over network-side interface 1802. Receiver 1808 may include any component or collection of components (e.g., down-converter, low noise amplifier, etc.) adapted to convert a carrier signal received over network-side interface 1802 into a baseband signal. Signal processor 1810 may include any component or collection of components adapted to convert a baseband signal into a data signal suitable for communication over device-side interface(s) 1812, or vice-versa. Device-side interface(s) 1812 may include any component or collection of components adapted to communicate data-signals between signal processor 1810 and components within the host device (e.g., processing system 1700, LAN ports, etc.).

Transceiver 1800 may transmit and receive signaling over any type of communications medium. In some embodiments, transceiver 1800 transmits and receives signaling over a wireless medium. For example, transceiver 1800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., BLUETOOTH, near field communication (NFC), etc.). In such embodiments, network-side interface 1802 comprises one or more antenna/radiating elements. For example, network-side interface 1802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the various systems and components described throughout this disclosure are described and illustrated as including particular components arranged in a particular manner, this disclosure contemplates these systems and components including additional components, fewer components, different components, or a combination of these. Additionally, each of the systems and components described throughout this disclosure may be implemented using any suitable combination of hardware, firmware, and software.

Although this disclosure describes particular components as performing particular operations, this disclosure contemplates other components performing those operations. Additionally, although this disclosure describes or illustrates particular operations as occurring in a particular order, this disclosure contemplates any suitable operations occurring in any suitable order. Moreover, this disclosure contemplates any suitable operations being repeated one or more times in any suitable order. Although this disclosure describes or illustrates particular operations as occurring in sequence, this disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A communication apparatus, comprising:
   a switch matrix comprising a plurality of input ports and a plurality of output ports, the switch matrix configured to:
   receive, at a first input port of the plurality of input ports, a first electrical signal, the first electrical signal corresponding to a received signal at antennas of an antenna array, the received signal corresponding to a first transmission spatial sector of the antenna array, the first electrical signal having been generated from a first optical signal converted from the received signal; and
   direct, via a first output port of the plurality of output ports and in accordance with a first control signal, the first electrical signal to a first signal conversion path of a plurality of signal conversion paths; and
   frequency band isolation circuitry in the first signal conversion path, the frequency band isolation circuitry configured to:
   separate the first electrical signal into a first signal portion in a first frequency band and a second signal portion in a second frequency band;
   modulate a reference signal with the second signal portion to generate a frequency-shifted second signal portion; and
   combine the first signal portion and the frequency-shifted second signal portion to generate a modified first electrical signal that corresponds to the received signal at the antennas of the antenna array.

2. The communication apparatus of claim 1, wherein the frequency band isolation circuitry comprises:
   a first filter configured to separate the first signal portion in the first frequency band from the first electrical signal; and
   a second filter configured to separate the second signal portion in the second frequency band from the first electrical signal.

3. The communication apparatus of claim 1, wherein the frequency band isolation circuitry comprises:
   a modulator configured to modulate the reference signal with the second signal portion to generate the frequency-shifted second signal portion; and
   a summer configured to combine the first signal portion and the frequency-shifted second signal portion to generate the modified first electrical signal by adding the first signal portion and the frequency-shifted second signal portion.

4. The communication apparatus of claim 1, further comprising an analog-to-digital converter in the first signal conversion path, the analog-to-digital converter configured to convert the modified first electrical signal to a digital format.

5. The communication apparatus of claim 1, further comprising an optical lens configured to transform a plurality of second optical signals from a first wave format to a second wave format, each second optical signal corresponding to a respective antenna of the antenna array, the first optical signal being one of the plurality of second optical signals in the second wave format and comprising a combination of the plurality of second optical signals.

6. The communication apparatus of claim 5, wherein the plurality of second optical signals is emitted in the first wave format by respective first optical fibers of a first plurality of optical fibers, each optical fiber of the first plurality of optical fibers corresponding to a respective antenna of the antenna array.

7. The communication apparatus of claim 1, comprising a signal conversion circuit configured to:
receive the first optical signal via a first optical fiber of a second plurality of optical fibers; and
convert the first optical signal into the first electrical signal.

8. The communication apparatus of claim 1, comprising a plurality of modulators each corresponding to a respective antenna of the antenna array and configured to modulate an optical source signal with the received signal received by the respective antenna to generate a second optical signal.

9. The communication apparatus of claim 8, wherein the received signal is processed prior to received signal modulation with the optical source signal to generate the second optical signal.

10. The communication apparatus of claim 9, wherein the received signal processing comprises:
filtering the received signal;
amplifying the received signal; or
filtering and amplifying the received signal.

11. The communication apparatus of claim 1, wherein:
the switch matrix and the frequency band isolation circuitry are located in a baseband unit (BBU); and
the antenna array is located in a remote receiver unit (RRU).

12. The communication apparatus of claim 11, wherein second optical signals are communicated from the RRU to the BBU via respective optical fibers, the second optical signals corresponding to respective antennas of the antenna array.

13. The communication apparatus of claim 1, wherein the switch matrix is configured to:
compare a signal strength of the first electrical signal to a signal threshold; and
direct, via the first output port of the plurality of output ports, the first electrical signal to the first signal conversion path in accordance with at least one factor that includes response to the signal strength of the first electrical signal exceeding the signal threshold.

14. The communication apparatus of claim 13, further comprising an arrayed waveguide grating element configured to:
receive, via one or more optical fibers, a multiplexed optical signal; and
demultiplex the multiplexed optical signal into a plurality of optical signals for conversion, by respective signal conversion circuits, into a plurality of electrical signals each of which corresponds to a different one of the plurality of optical signals, the first electrical signal being one of the plurality of electrical signals.

15. The communication apparatus of claim 14, wherein a single optical fiber is provided to receive the multiplexed optical signal.

16. The communication apparatus of claim 13, wherein:
a grid modulator and a first arrayed waveguide grating element are located in a remote receiver unit (RRU); and
a second arrayed waveguide grating element is located in a baseband unit (BBU).

17. A method, comprising:
receiving, at a first input port of a plurality of input ports of a switch matrix, a first electrical signal, the first electrical signal corresponding to a received signal at antennas of an antenna array, the received signal corresponding to a first transmission spatial sector of the antenna array, the first electrical signal having been generated by one or more signal conversion circuits from a first optical signal converted from the received signal at the antennas of the antenna array;
directing, via a first output port of a plurality of output ports of the switch matrix and in accordance with a first control signal, the first electrical signal to a first signal conversion path of a plurality of signal conversion paths;
separating, by frequency band isolation circuitry in the first signal conversion path, the first electrical signal into a first signal portion in a first frequency band and a second signal portion in a second frequency band;
modulating, by the frequency band isolation circuitry in the first signal conversion path, a reference signal with the second signal portion to generate a frequency-shifted second signal portion; and
combining, by the frequency band isolation circuitry in the first signal conversion path, the first signal portion and the frequency-shifted second signal portion to generate a modified first electrical signal that corresponds to the received signal at the antennas of the antenna array.

18. The method of claim 17, further comprising:
separating, by a first filter of the frequency band isolation circuitry, the first signal portion in the first frequency band from the first electrical signal; and
separating, by a second filter of the frequency band isolation circuitry, the second signal portion in the second frequency band from the first electrical signal.

19. The method of claim 17, further comprising:
modulating, by a modulator of the frequency band isolation circuitry, the reference signal with the second signal portion to generate the frequency-shifted second signal portion; and
combining, by a summer of the frequency band isolation circuitry, the first signal portion and the frequency-shifted second signal portion to generate the modified first electrical signal by adding the first signal portion and the frequency-shifted second signal portion.

20. The method of claim 17, further comprising converting, by an analog-to-digital converter in the first signal conversion path, the modified first electrical signal to a digital format.

21. The method of claim 17, further comprising modulating, by each of a plurality of modulators that each correspond to a respective antenna of the antenna array, an optical source signal with the received signal received by the respective antenna to generate a second optical signal.

22. The method of claim 21, wherein the received signal processing comprises:
- filtering the received signal;
- amplifying the received signal; or
- filtering and amplifying the received signal.

23. The method of claim 17, further comprising:
- comparing, by the switch matrix, a signal strength of the first electrical signal to a signal threshold; and
- directing, by the switch matrix via the first output port of the plurality of output ports, the first electrical signal to the first signal conversion path in accordance with at least one factor that includes response to the signal strength of the first electrical signal exceeding the signal threshold.

24. The method of claim 17, further comprising:
- receiving, by a grid modulator, a plurality of electrical signals, each electrical signal in the plurality of electrical signals corresponding to a respective antenna of the antenna array, the first electrical signal being one of the plurality of electrical signals;
- modulating, by the grid modulator, each of the plurality of electrical signals to generate a corresponding plurality of optical signals; and
- multiplexing, by a first arrayed waveguide grating element, the corresponding plurality of optical signals into a multiplexed optical signal for transmission via one or more optical fibers, wherein a quantity of the one or more optical fibers is less than a quantity of the corresponding plurality of optical signals.

* * * * *